United States Patent [19]

Kimura et al.

[11] Patent Number: 5,701,160
[45] Date of Patent: Dec. 23, 1997

[54] IMAGE ENCODING AND DECODING APPARATUS

[75] Inventors: Junichi Kimura, Hachioji; Taizo Kinoshita, Tachikawa, both of Japan

[73] Assignee: Hitachi, Ltd., Tokyo, Japan

[21] Appl. No.: 504,661

[22] Filed: Jul. 20, 1995

[30] Foreign Application Priority Data

Jul. 22, 1994 [JP] Japan .................. 6-170699

[51] Int. Cl.⁶ .................. H04N 7/36; H04N 7/50
[52] U.S. Cl. .................. 348/413; 348/401
[58] Field of Search .................. 348/400, 401, 348/402, 412, 413, 416; H04N 7/36, 7/50

[56] References Cited

U.S. PATENT DOCUMENTS 5,379,070  1/1995  Retter .................. 348/408
5,510,842  4/1996  Phillips .................. 348/416
5,557,332  9/1996  Koyanagi .................. 348/416

Primary Examiner—Howard W. Britton
Attorney, Agent, or Firm—Antonelli, Terry, Stout & Kraus, LLP.

[57] ABSTRACT

An image encoding apparatus, image decoding apparatus, or image encoding and decoding apparatus having a circuit for dividing a screen into sub-areas to conduct an encoding or decoding operation for each sub-area includes an image dividing circuit for dividing an input image into sub-areas each having a predetermined contour, sub-encoders for encoding the sub-areas respectively related thereto, a code integrating circuit for integrating the codes of the respective sub-areas, and a shared memory for storing images locally decoded by the sub-encoders.

9 Claims, 32 Drawing Sheets

FIG.36A

P PICTURE(FIELD)

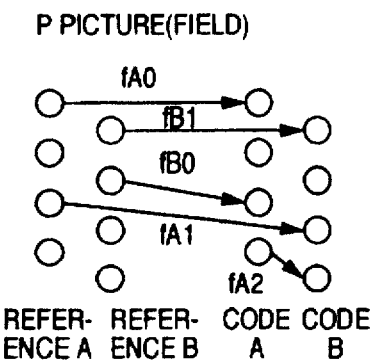

REFER- REFER- CODE CODE
ENCE A ENCE B   A    B

| MEMORY NAME | STORAGE SIGNAL | |
|---|---|---|
| | CODE A | CODE B |
| MEMORY3502 | R(A,fA0) | — |
| MEMORY3503 | R(B,fB0) | — |
| MEMORY3504 | — | R(B,fB1) |
| MEMORY3505 | — | R(A,fA2) |

FIG.36B

B PICTURE FORWARD/
P PICTURE(FRAME)

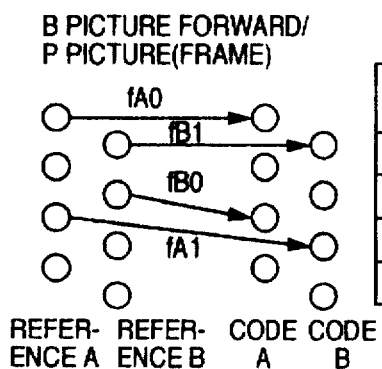

REFER- REFER- CODE CODE
ENCE A ENCE B   A    B

| MEMORY NAME | STORAGE SIGNAL |
|---|---|
| MEMORY3502 | R(A,fA0) |
| MEMORY3503 | R(B,fA0)orR(A,fB1) |
| MEMORY3504 | R(B,fB1) |
| MEMORY3505 | R(B,fB0) |

ESTIMATED SIGNAL

B PICTURE BACKWARD

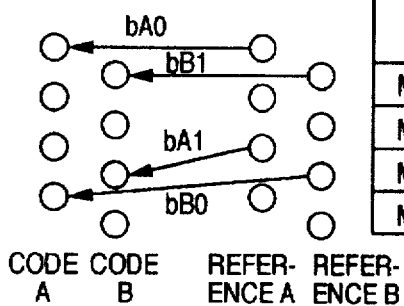

CODE CODE   REFER- REFER-
 A    B    ENCE A ENCE B

| MEMORY NAME | STORAGE SIGNAL |
|---|---|
| MEMORY3502 | R(A,bA0) |
| MEMORY3503 | R(B,bA0)orR(A,bB1) |
| MEMORY3504 | R(B,bB1) |
| MEMORY3505 | R(A,bA1) |

ESTIMATED SIGNAL

R(A,bA0) : R(B,bA0)

R(A,bB1) : R(B,bB1)

R(A,bA0) : R(A,bA1)

FIG.42
PREDICTED IMAGE 1  PREDICTED IMAGE 2
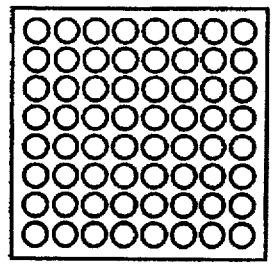 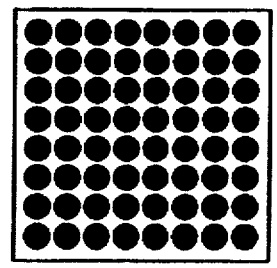
(1) INTERPOLATION PREDICTION
DUAL FIELD ESTIMATION
(2) SIMPLIFIED PREDICTION 1
PREDICTED IMAGE
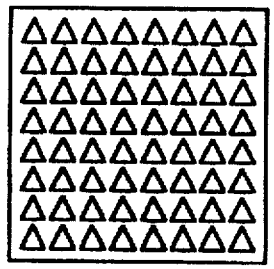
$\triangle = (\bigcirc + \bullet)/2$
PREDICTED IMAGE
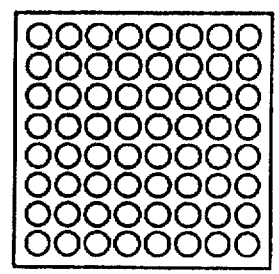
(3) SIMPLIFIED PREDICTION 2    (4) SIMPLIFIED PREDICTION 3    (4) SIMPLIFIED PREDICTION 4
PREDICTED IMAGE    PREDICTED IMAGE    PREDICTED IMAGE
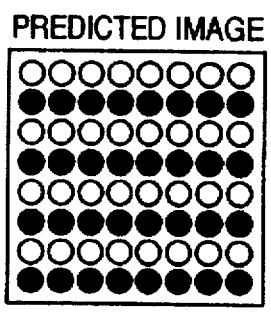 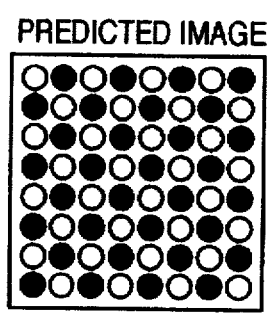 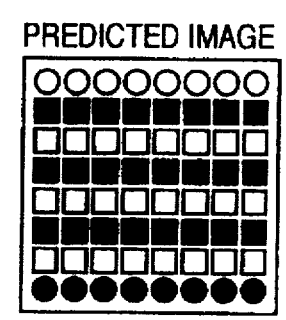
■ = (● + ○ INTERPOLATION)/2
□ = (○ + ● INTERPOLATION)/2

FIG.48A

ORDINARY EXAMPLE(SAME OFFSET)

| CODE IMAGE | 1 | 2 | 3 | 4 | 5 | 6 | 7 |
|---|---|---|---|---|---|---|---|

| REFERENCE IMAGE | 1A | 2A | 3A | 4A | 5A | 6A | 7A |
|---|---|---|---|---|---|---|---|
| | 1B | 2B | 3B | 4B | 5B | 6B | 7B |
| | 1C | 2C | 3C | 4C | 5C | 6C | 7C |

FIG.48B

EXAMPLE OF DIFFERENT OFFSET(MB)

| CODE IMAGE | 1 | | 2 | | 3 | |
|---|---|---|---|---|---|---|

| REFERENCE IMAGE | 1A | 2A | 1A' | 2A' | 3A | 2A" | 3A' | 4A | 3A" |
|---|---|---|---|---|---|---|---|---|---|
| | 1B | 2B | 1B' | 2B' | 3B | 2B" | 3B' | 4B | 3B" |
| | 1C | 2C | 1C" | 2C" | 3C | 2C" | 3C' | 4C | 3C" |

FIG.48C

EXAMPLE OF DIFFERENT OFFSET(4MB)

| CODE IMAGE | 1 | 2 | 3 | 4 | 5 | 6 | 7 |
|---|---|---|---|---|---|---|---|

| REFERENCE IMAGE | 1A | 2A | 3A | 4A | 5A | 4A' | 5A' | 6A | 7A |
|---|---|---|---|---|---|---|---|---|---|
| | 1B | 2B | 3B | 4B | 5B | 4B' | 5B' | 6B | 7B |
| | 1C | 2C | 3C | 4C | 5C | 4C" | 5C" | 6C | 7C |

IMAGE ENCODING AND DECODING APPARATUS

BACKGROUND OF THE INVENTION

The present invention relates to an image encoding apparatus, an image decoding apparatus, or an image encoding and decoding apparatus having the functions of these apparatuses and is, in particular, applied to an encoding and decoding unit of an image encoder or an image receiving terminal in a digital broadcasting system, a cable television system, or the like; a realtime code input device in an image accumulating apparatus, and a video communicating apparatus for video phone and teleconference systems.

When transmitting and/or storing digitalized video signals, there are required transmission paths and/or storage media applicable to a transmission speed of 100 megabits per second (Mbps) for ordinary television (TV) signals and a transfer rate of one gigabits per second (Gbps) for high-definition television (HDTV) signals. For this purpose, researches have been conducted for a high-performance encoding technology in which redundancy of video signals of an image is minimized to decrease the quantity of video information to from about $1/10$ to about $1/1000$ as compared with the conventional system. The International Organization for Standardization (ISO) has proposed representative technologies such as ISO/IEC 11172-2 (Nov., 92; Moving Picture Expert Group 1 (MPEG1)) and ISO/IEC CD 13818-2(Nov., 93; MPEG2), which is an extended version of MPEG1. Description will now be given of the conventional technology primarily in conjunction with MPEG1 and MPEG2, which will be collectively called MPEG herebelow. Details of MPEG1 and MPEG2 have been described in the ISO/IEC 11172-2 and ISO/IEC CD 13818-2 and hence only an outline thereof will be explained in the following description.

FIG. 1 shows in a block diagram a conventional encoder including MPEG1 and MPEG2. A digital image 2 inputted to the system is temporarily stored in a buffer 3 to be subdivided into processing units called macro-blocks including 16 by 16 pixels of luminance signals, 8 by 8 pixels of Red-Yellow (R-Y) color difference signals, and 8 by 8 pixels of Blue-Yellow (B-Y) color difference signals. Each macro-block is processed by a motion compensation (MC) and discrete cosine transform (DCT) circuit 4 to obtain the difference between the signal of the macro-block and a forecast signal subjected to correction of motion in a screen. A discrete cosine transform (DCT) is carried out for the resultant signal to obtain a DCT coefficient 8 represented in terms of frequency components. The DCT operation is accomplished for each of four blocks (8 pixels by 8 lines for chrominance and luminance signals) obtained by further partitioning or dividing the luminance signal of the macro-block. The DCT coefficient 8 and additional information such as a motion vector 9 attained in the MC/DCT process are inputted to a variable-length coding circuit 5 to be encoded into associated codes according to a predetermined sequence. The obtained codes are fed to a code buffer 6. The codes 7 are read from the code buffer 7 at a speed according to the read and processing speeds of an external storage and a transmitting apparatus, respectively. In the buffer 7, the amount of codes is calculated at a fixed interval or cycle to notify the amount of generated codes 10 to a code amount controller 212. To set the quantity of codes to a preset value, the control circuit 212 supervises a quantization step size 213 and the like and sends information of the control operation to the MC/DCT circuit 4.

FIG. 2 shows in detail the MC/DCT circuit of the prior art. Description will be given of a motion compensating operation of MPEG1 and MPEG2 by referring to FIG. 3 prior to explanation of operation of the system of FIG. 2. In MPEG1 and MPEG2, a television screen image is classified into three kinds of pictures including I, P, and B pictures to be then encoded. For the I picture, the screen image is divided into macro-blocks to obtain blocks described above such that DCT is conducted directly for these blocks. In consequence, one screen image can be reconstructed only from the I picture. This does not apply to the P and B pictures. On the other hand, for the P or B picture, a predicted image is created on the basis of a screen image beforehand encoded. DCT is carried out for the difference signals between the picture and the predicted image, thereby encoding the video signals.

FIG. 3 is a diagram for explaining a method of producing a predicted image for the B picture. In FIG. 3, a forward reference image and a backward reference image indicate images beforehand encoded. The forward and backward reference images respectively represent images advanced and delayed in time with respect to a screen to be encoded. When generating a predicted image for one encode macro-block of the pertinent screen, a search is made in the neighborhood of the same position in the forward and backward reference images for a portion most similar to the encode macro-block so as to create a predicted macro-block. In the screen, the difference in position between the encode macro-block and the predicted macro-block is called a motion vector. Methods of creating predicted signals include, for example, a forward predicted method utilizing a predicted macro-block of the forward reference image, a backward predicted method utilizing a predicted macro-block of the backward reference image, an interpolation predicted method in which these predicted signals are averaged for each pixel, and an intra-frame predicted method in which the predicted signals are set to a fixed value (128). In general, from the signals obtained according to the four modes of predicted, a signal having the lowest predicted error power is chosen as the predicted signal. For the P picture, only the forward and intra-frame predicted modes are available and the backward and interpolation predicting methods are inhibited. In this connection, a dual prime predicted method in which two forward predicted signals are predicted for each pixel is additionally employed for the P picture in MPEG2.

Only the I and P pictures are used for the forward and backward reference images. Between a pair of forward and backward reference images, there exists neither I picture nor P picture. Namely, only the P pictures are present therebetween in a successive manner. Furthermore, there may also be a case in which the B picture is missing. The interval between the I and P pictures can be set to an arbitrary value. In many cases, there is selected a fixed value indicating the interval of every third screen. In addition, the I picture is adopted as a reference point of random access operation or a restoration point at occurrence of errors. The interval of I pictures can also be set to an arbitrary value. In general, the I pictures is inserted at an interval of 0.5 second or less in a fixed fashion. That is, in many cases, the I picture is inserted at an interval of 12 or 15 frames. In MPEG, the period or cycle of I picture and those respectively of B and P pictures are represented by letters N and M, respectively. For example, description of N=12, M=13 denotes that each frame is encoded in a cycle as "BBIBBPBBPBBP". In the actual encoding operation, the frame of the third I picture is first encoded. This frame is followed by the first and second frames, the frame of the sixth P picture, and the fourth and fifth frames. In the operation, the sixth P picture frame is predicted according to the third I picture frame and the fourth frame is fore-casted according to the third I picture frame and sixth P picture frame.

Returning to FIG. 2, description will be given of the MC/DCT circuit 4 of the prior art. A digital video signal 11 supplied to the system is first inputted to a video memory 201 to be re-arranged in the encoding sequence described above. On the other hand, the video signal 11 is simultaneously supplied to a motion detecting circuit 12 to detect a motion vector for each macro-block according to a reference image signal 202 beforehand encoded and stored in a reference image memory 200. In this regard, an image signal 214 delayed by the video or image memory 201 is inputted to the motion detector 12 to detect a backward predicted vector according to the reference image data 202. A signal delayed by a predetermined period of time through the video memory 201 is delivered as an encode video signal 203 to a motion compensation circuit 13. At the same time, according to a motion vector 9 sensed by the motion detector 12, the motion compensator 13 reads the reference video signal 202 from the reference video memory 200 to set the signal as a predicted signal. Incidentally, for the I picture, the reference video signal is not read from the memory 200. Namely, a fixed value is employed in place thereof. In the motion compensator 13, there is obtained discrepancy between the encode signal 203 and reference video signal 202 for each pair of corresponding pixels to produce a difference video signal 204. The signal 204 is converted into a DCT coefficient by a DCT circuit 205 to be quantized by a quantizing circuit 206 according to a preset quantizing step size 213. The resultant DCT coefficient 8 is fed to a variable-length encoder 5 together with the motion vector 9. In case where the image to be encoded is a B picture, although the process of the MC/DCT circuit is finished, the reference video signal 202 is required to be reproduced for an image subsequent thereto. The quantized DCT coefficient 8 is inversely quantized by an inverse-quantization circuit 207 according to the quantization step size adopted in the quantizing process. The obtained signal is then subjected to an inverse DCT by an inverse DCT circuit 208. The resultant signal, i.e., reproduced difference video signal 209 is added by an adder circuit 210 to a signal created by delaying the reference video signal 202 of the pertinent block by a predetermined period of time so as to obtain a reproduced video signal 211. The signal 211 is stored in the reference video memory 200 to be later used as a reference video signal in the encoding of a screen image.

In this connection, when reproducing images, the codes are first decoded such that the decoded codes is processed through operations ranging from the reverse quantization of the inverse-quantization circuit 207 to the storing operation of the reference video memory 200.

FIG. 4 shows in detail the configuration of the video memory 201, reference video memory 200, and motion detector circuit 12. Operation of the system of FIG. 4 is accomplished according to the timing chart of FIG. 5. FIGS. 4 and 5 correspond to cases in which M takes values of from 1 to 3, namely, from a mode (M=1) in which there is missing the B picture to a mode (M =3) in which two B pictures appear in a successive fashion. Description will next be given of the operation primarily in relation to the case of M=3. When the input image is a P picture, namely, when the frame number of FIG. 5 takes 3, 6, and 9, the vector detection is carried out by a vector detector 450-1 by referring to a reference image of a frame preceding the current frame by three frames and being stored in the reference video memory 200. The memory 200 includes two frame memories 410 and 411 respectively for the forward and backward reference images. A selector circuit 412 conducts a change-over operation between the memories 410 and 411 at a cycle of M frames to establish correspondences between reference video signals 202-1 and 202-2 and the forward and backward reference video signals, respectively. After the motion detection, the video signal is immediately encoded. Namely, the signal delayed through a frame memory 401 by the period of about one frame is selected by a selector 405 to be outputted therefrom as an encode video signal 203. The encoded and reproduced video signal 211 described above is stored through an overwriting operation in either one of the frame memories 410 and 411 of the reference video memory 200 containing the older reference signal. When the initiation time of encoding is slightly prior to that of motion detection in the same time area, the reference video signal of the first screen portion can be stored in the pertinent frame memory 410 or 411 by when the operation detecting process is started.

When the input image is an I picture, the vector detection is suppressed such that the signal is delayed by one frame to be outputted as the encode image signal 203 in a similar manner as for the P picture.

In case where the input image is a B picture, when the image is inputted, a motion vector is first detected for the forward reference image like in the process of the P picture. Next, when the period of three frames lapses thereafter, a motion vector is detected for the backward reference image. The number of delay frames is equivalent to the value of M. Cases of M=2 or M=3 is selected by the selecting circuit 406. For M=1, the B picture is missing and hence the backward predicted is unnecessary. The image is encoded immediately after the motion detection of the backward predicted block. That is, the signal delayed by about one frame in the frame memory 403 or 404 is selected by the selector circuit 405 according to the value of M to be then outputted as the encode video signal 203.

In a vector detecting circuits 450-1 and 450-2, the reference signals 202-1 and 202-2 respectively supplied thereto are respectively compared with the signals 11 and 214 respectively inputted thereto to obtain portions of the reference signals 202-1 and 202-2 respectively most analogous to the signals 11 and 214 so as to output the obtained vector values as signals 451-1 and 451-2. These signals 451-1 and 451-2 are collectively fed as a motion vector signal 9 through a bus.

FIG. 6 shows the simplified operation of the motion vector detecting circuit and FIG. 7 shows the operation timing chart thereof. In the example of FIG. 6, a search operation is conducted through a 6 (=W)×V (3 or more) reference screen image to obtain a portion thereof most similar to an encode block of 2×2 pixels as shown in the bottom portion of FIG. 7. In FIG.6, when the search is commenced, a switch 603 is in the state of selecting the input signal 11 or 214. For the signal 11 or 214, pixel data items A to D are inputted respectively at timing points of reference signals 0, 1, 6, an 7 to be delayed respectively by one clock by delay circuits 604-1 to 604-3 as shown in FIG. 7. At the same time, the video data items are stored in a random access memory (RAM) 603. After inputting one detection unit including four pixels, a change-over operation is conducted by the switch 603 to periodically input four input signals at a cycle of eight pixels. In the 8-pixel cycle, the period in which data is absent may be set to any value. On the other hand, when the input signal is supplied to the system, data in a search range of the reference image is immediately inputted as the reference signal 202. These signals are fed to detecting circuits 601-1 to 601-8 to determine degrees of similarity associated therewith. The same data is supplied to each of the detecting circuits 601-1 to 601-8, whereas the data items of input signals are fed thereto with a delay of one clock therebetween. As a result, as can be seen from FIG. 7, when a period of eight clocks passes after the initiation of the input operation, the degrees of similarity 614 are produced from detecting circuits 601-1 to 601-8, the similarity degrees 614 respectively associated with portions which are positionally different from each other by one pixel. In the period of one clock, the degree of similarity 614 is outputted only from one of the detecting circuits 601-1 to 601-8. Consequently, a minimum value selecting circuit 602 need only conduct one check for the minimum value in the period of one clock to detect the most analogous vector. The similarity degree 614 is also produced for a block on the boundary between reference screens (e.g., a block including pixels denoted as 5, 6, 11, and 12 in FIG. 7). The block above is not included in the processing of the minimum value selector 602. In the internal operation of the detecting circuit 601, there is obtained the difference between two signals by a difference circuit 610 and then the absolute value thereof is generated by an absolute value circuit 611 so as to add the obtained value to an accumulation value 614 beforehand stored in a register 613. Immediately before the addition of the first one of the four pixels, the register 613 is cleared to zero so that the accumulation value 614 represents the similarity degree with respect to the pertinent portion after four clocks. In FIGS. 6 and 7, the motion vector detection to be ordinarily conducted in the unit of 16×16 pixels is simplified to be conducted in the 2×2 pixel unit for simplification of description. When the operation is to be accomplished by the circuit of FIG. 6 in the 16×16 pixel unit, it is only required to increase the number of detection circuits (approximately W (reference screen width) ×16). To decrease the number of detection circuits, there has been known a method in which the number of detectors related to the portion in the boundary between the right and left reference screens is reduced to carry out the vector search by (w−16) ×16 detection circuits. Moreover, in addition to the method in which input signals are continually or intermittently supplied to the system, there has been known a method in which the successively received input signals are delayed by an internal circuit thereof.

Description has been given of an outline of the conventional video signal encoder circuit. The quantity of signals processed by the encoder is proportional to the number of pixels inputted thereto during a unitary period of time. Consequently, all processes of each pixel is required to be accomplished while one pixel is being inputted to the circuit. In other words, since the number of input pixels is about 15 mega-pixels per second when processing ordinary television signals, it is necessary to achieve the processing of each pixel in about 70 nanosecond (ns). In ordinary cases, the processing of 8×8 pixels is executed in four microseconds (µs) or the processing of 16×16 pixels is conducted in 16 micros in the pipeline processing procedure, thereby satisfying the condition above. On the other hand, HDTV signals are required to be processed at a processing rate which is about four times to about five times that of the ordinary television signals. When HDTV signals are to be processed in the pipeline processing scheme described above, it is necessary to employ operational elements or device having quite a high operation speed, which increases the production cost and circuit size of the system. To overcome this difficulty, it has been a common practice of HDTV processing to subdivide one screen into a plurality of sub-screens to assign a plurality of sub-encoders respectively to the sub-screens so that the HDTV signals are processed in a concurrent fashion.

FIG. 8 shows the configuration of a video signal encoder adopting the conventional screen subdivision. A video signal 2 inputted thereto is subdivided by a video signal dividing circuit 801 into four signals 805-1 to 805-4 in this example to be encoded respectively by four sub-encoders 1-1 to 1-4 to produce codes 806-1 to 806-4, respectively. The codes 806-1 to 806-4 are assembled by a code assembling circuit 803 into one group of codes 7. In this case, the sub-encoder can be constructed as shown in FIG. 1. When subdividing the screen, there may be used a method in which the screen is partitioned in the unit of several scan lines (for example, 1024 scan lines of one screen are subdivided into four partitions each including 256 scan lines) or a method in which the screen is subdivided by a vertical line and a horizontal line into four sub-screens.

FIG. 9 shows details of the video code subdividing circuit 801. A video signal 1 supplied thereto is transferred as either one of four signals via a switch 901 according to an instruction of a switch control circuit 902 producing a switching signal 903 according to the position of the image of the input video signal.

FIG. 10 shows in detail of the code assembling circuit 803 of FIG. 8. The codes 806 created by the respective encoders are stored in a first-in-first-out (FIFO) memories 1001. On the other hand, the FIFO memories 1001 initiate an operation to output its contents after all codes of the pertinent images are completely stored therein. The codes 1011 read from the memories 1001 are outputted as the code 7 via a switch 1003. When the codes of the image are completely delivered from the FIFO memory 1001-1, there is outputted a termination signal 1010-1. On receiving the termination signal 1010-1, the switch controller 1002 terminates the read operation of the FIFO memory 1001-1 and then starts a read operation of the FIFO memory 1001-2. Simultaneously, the switch 1004 is set to the output 1011-2. The operation above is achieved in a predetermined order to sequentially read the contents of four FIFO memories 1001-1 to 1001-4. When these operations are completed, the code read operation is again initiated for the next frame beginning at the FIFO memory 1001-1.

SUMMARY OF THE INVENTION

The image encoding apparatus using the conventional division described above is attended with two problems as follows. First, since each sub-encoder circuit to achieve the code or image division conducts the encoding operation in an independent manner, the encoding operation cannot be accomplished in the neighborhood of boundaries between the respective areas by fully using correlations in the screen and between screens. Consequently, the encoding efficiency is decreased when compared with the case in which the codes are encoded by a single encoding circuit. Particularly, in the method utilizing predicted between motion compensation frames, it is impossible to use images of the other areas as predicted images and hence the encoding efficiency is considerably deteriorated.

Second, since each sub-encoder circuit accomplishes the encoding operation in an independent fashion, the quantity of generated codes can be adjusted or regulated only in each sub-encoder circuit. In consequence, for example, when a large amount of information is created in a portion, the quantity of codes to be assigned to the processing sections after the sub-encoder associated with the large amount of information is decreased and hence the picture quality is decreased. In particular, the picture quality is remarkably lowered in boundary portions between the pertinent area and its peripheral areas.

It is therefore an object of the present invention to provide a small-sized low-cost image encoding apparatus, image decoding apparatus, and/or image encoding and decoding apparatus capable of solving the problems above.

To achieve the object above according to the present invention, there is provided means for dividing a screen image into a plurality of sub-images in which boundary areas or areas have overlapped portions therebetween and transmitting signals to be written in the overlapped regions to sub-encoders respectively associated thereto, thereby encoding the signals. Moreover, there are provided means for notifying the amount of generated information between the respective sub-encoders handling the adjacent areas and means for saving or absorbing a large amount of information transiently generated by one of the sub-encoders in the sub-encoders adjacent thereto.

According to an aspect of the present invention, there is provided an image encoding apparatus in which an input image is divided into a plurality of blocks, a predicted image of each block is created according to an image reproduced from beforehand encoded signals, a difference image is produced between the input image and the predicted image, and the difference image is encoded. The apparatus includes means for subdividing the input image into N (N≧2) sub-images of which adjacent areas are overlapped with each other, N encoding sections respectively disposed for the sub-images for achieving the predicted image creation, the encoding operation, and the image reproduction, a shared information processing section for distributing the image reproduced by the encoding section to the other encoding sections related thereto, and a code assembling section for combining with each other code strings produced respectively by the encoding sections into N or less encoded code strings.

Furthermore, in the image encoding apparatus, each of the encoding section includes means for notifying a quantity of codes generated by the encoding section to the other encoding sections and means for controlling the quantity of codes generated by the encoding section according to the quantity of code notified from one of the other encoding sections.

Moreover, according to the image encoding apparatus, the input image includes an image configured in an interlacing scanning structure, and the apparatus further includes means operative when conducting a predicted image creating method in which a predicted image undergone a motion compensation in a field unit is replaced with a predicted image undergone a motion compensation in a frame unit for generating a frame-unit motion vector from a motion compensation vector detected in the field unit.

The image encoding apparatus further includes means for inputting thereto two points of time and a quantity of codes to be generated between the two points of time, means for measuring a quantity of codes generated during a specified period of time, and means operative when the quantity of codes measured by the measuring means is unequal to the specified quantity of codes.

Additionally, in the image encoding apparatus, the encoding section includes means for inputting thereto a weight coefficient for a screen, means for setting distribution of a quantity of codes in the screen according to the weight coefficient and means for controlling the quantity of generated codes to obtain the specified quantity of codes.

Similarly, according to another aspect of the present invention, there is provided an image decoding apparatus in which codes supplied thereto are decoded to produce a difference image, a predicted image is created from an image decoded according to information separately specified by the input codes, and the difference image is added to the predicted image to produce a new decode image. The apparatus includes means for subdividing the input codes into M (M≧2) sets of codes, the sets, when decoded, including adjacent areas overlapped with each other, M decoding sections respectively disposed for the sets of codes for achieving the predicted image creation and the decoding operation, a shared decode information processing section for distributing the image decoded by the decoding section to the other encoding sections related thereto, and an image assembling section for combining with each other images decoded respectively by the decoding sections into one image.

Furthermore, in the image decoding apparatus, each of the decoding sections includes means for calculating an amount of progress in a decoding process, means for comparing the calculated amount of progress with a reference amount of progress, and means for simplifying the decoding process when the calculated amount of progress is less than the reference amount of progress.

In accordance with still another aspect of the present invention, there is provided an image encoding and decoding apparatus in which an input image supplied thereto is subdivided into a plurality of blocks, a predicted image of each block is created according to an image reproduced from beforehand encoded signals, a difference image is produced between the input image and the predicted image, and the difference image is encoded and in which codes supplied thereto are decoded to produce a difference image, a predicted image is created from an image decoded according to information separately specified by the input codes, the difference image is added to the predicted image to produce a new decode image. The apparatus includes N processing means having a function of subdividing the input image into N (N≧2) sub-images of which adjacent areas are overlapped with each other and a function of achieving for each of the sub-images the predicted image creation, the encoding operation, and the image reproduction, a shared information processing section for distributing the image reproduced by the processing means to the other processing means related thereto, and a code assembling section for combining with each other code strings produced respectively by the processing sections into N or less encoded code strings.

According to further another aspect of the present invention, there is provided an image encoding and decoding apparatus in which an input image supplied thereto is subdivided into a plurality of blocks, a predicted image of each block is created according to an image reproduced from beforehand encoded signals, a difference image is produced between the input image and the predicted image, and the difference image is encoded and in which codes supplied thereto are decoded to produce a difference image, a predicted image is created from an image decoded according to information separately specified by the input codes, the difference image is added to the predicted image to produce a new decode image. The apparatus includes M processing means having a function of subdividing the input codes into M (M≧2) sets of codes, the sets, when decoded, including adjacent areas overlapped with each other and a function of achieving for each of the sets of codes the predicted image creation and the decoding operation, a shared decode information processing section for distributing the image decoded by the processing means to the other processing means related thereto, and an image assembling section for combining with each other images decoded respectively by the processing means into one image.

Thanks to provision of the overlapped areas to be handled by the sub-encoders, the correlations in and between screen can be utilized also in the vicinity of boundary regions between the areas and hence it is possible to prevent the deterioration of the encoding operation as compared with the case of the encoding operation by a single encoder. In addition, since the quantity of generated information can be communicated between the sub-encoders, the deterioration of picture quality due to a large amount of information transiently produced can be dispersed in a wide range and hence the deterioration becomes less conspicuous.

Still further advantages of the present invention will become apparent to those of ordinary skill in the art upon reading and understanding the following detailed description of the preferred and alternative embodiments.

BRIEF DESCRIPTION OF THE DRAWINGS

The invention will be described in conjunction with certain drawings which are for the purpose of illustrating the preferred and alternative embodiments of the invention only, and not for the purposes of limiting the same, and wherein:

FIGS. 36A to 36C are diagrams for explaining operation of the motion compensating circuit of FIG. 35;

FIG. 42 is a diagram for explaining a method of simplifying the operation of generating a predicted image;

FIGS. 48A to 48C are diagrams for explaining operation of detecting motion vectors of FIG. 7.

DESCRIPTION OF THE PREFERRED EMBODIMENTS

Figure 8:
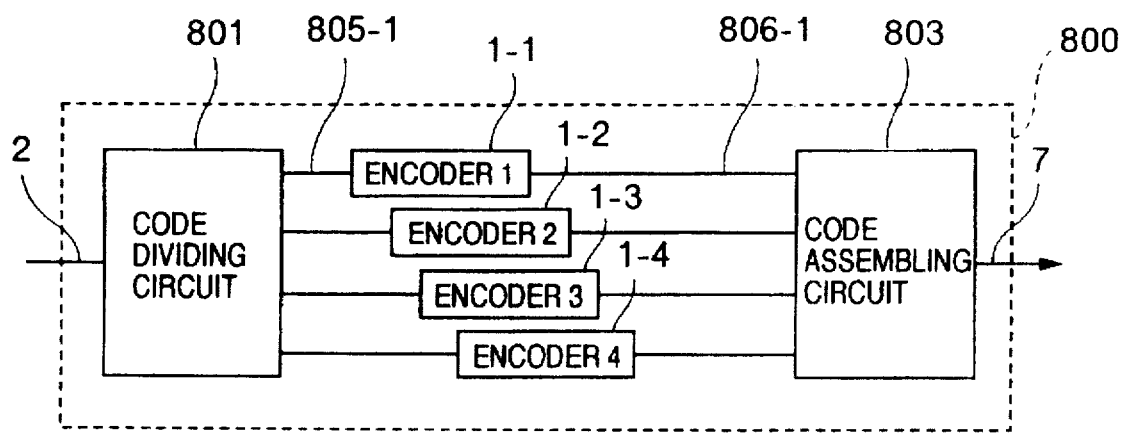
FIG. 8 is a diagram showing an image encoder employing a conventional image division.
Figure 9:
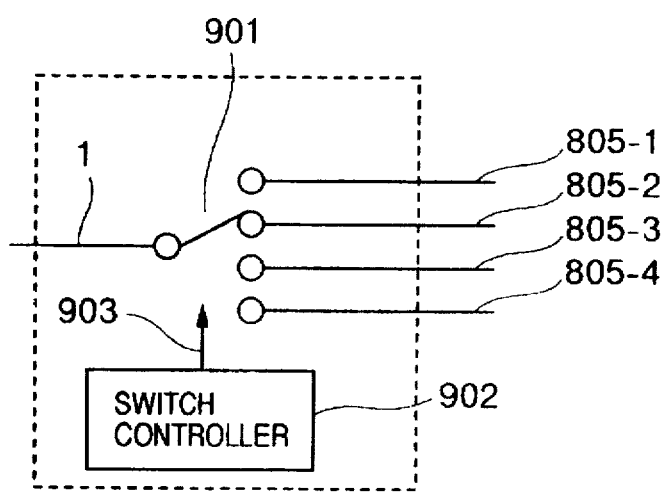
FIG. 9 is a diagram showing a code dividing circuit of the prior art.
Figure 10:
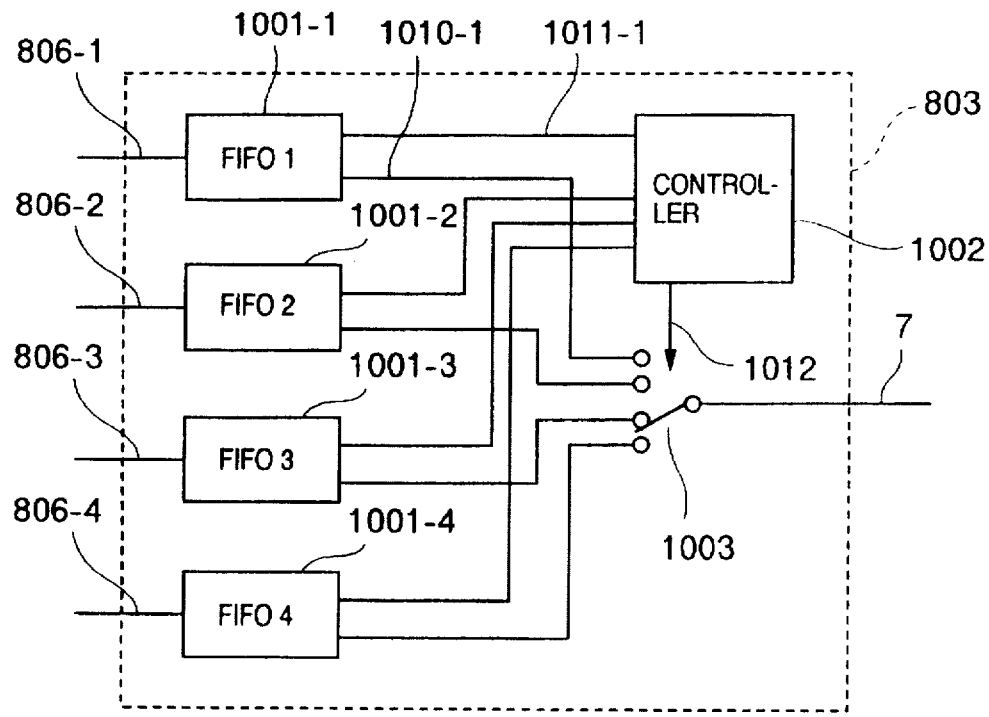
FIG. 10 is a block diagram showing a code assembling circuit of the prior art.
Figure 11:
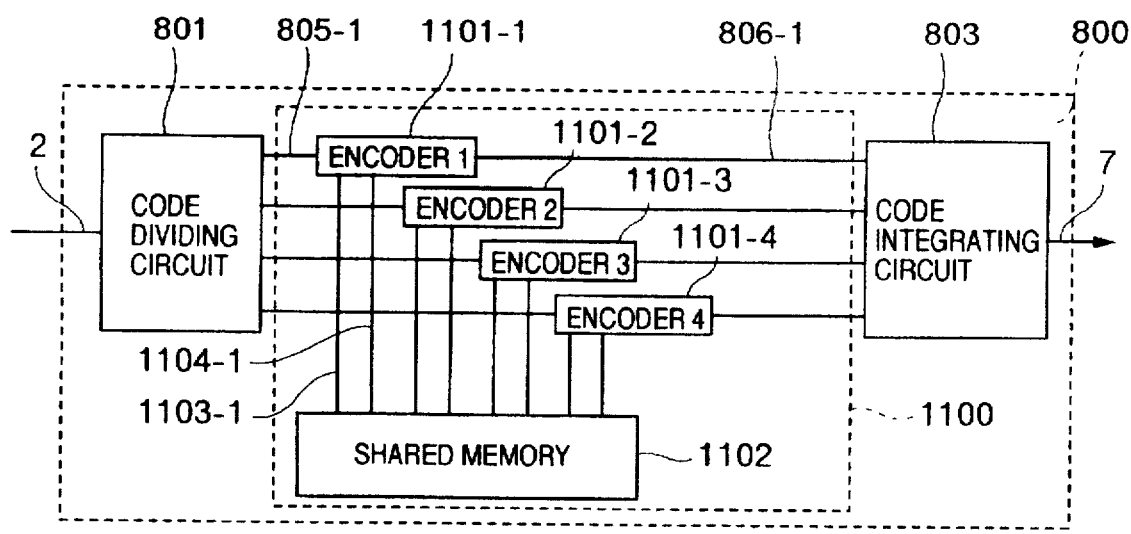
FIG. 11 is a diagram showing the configuration of an image encoding apparatus according to the present invention.

FIG. 11 shows an embodiment of an image encoder according to the present invention. In the example of FIG. 11, the present invention is applied to the image encoding apparatus shown in FIG. 8. In the diagram, a portion designated by a reference numeral 1100 is associated with the present invention. The other portions are functionally the same as those of FIG. 8 and hence description thereof will be dispensed with. Namely, description will be given primarily in relation to the section 1100.

In a sub-encoder 1101, a video signal 805 inputted thereto is encoded into a code 806. The encoder 1101 includes two memories of different types. The first memory is used to store therein an encode image and corresponds to the processing area of the pertinent sub-encoder. The second memory is employed to store therein a reference image and is associated with an area which is overlapped with an adjacent area and which is larger than the processing area of the pertinent sub-encoder. Like in the conventional system, the memory of the encode image is disposed in each sub-encoder 1101 and the reference memory is arranged in a shared memory circuit 1102. The encoder 1101 accesses the shared memory 1102 in response to an access signal 1103 and a read signal 1104.

Figure 1:
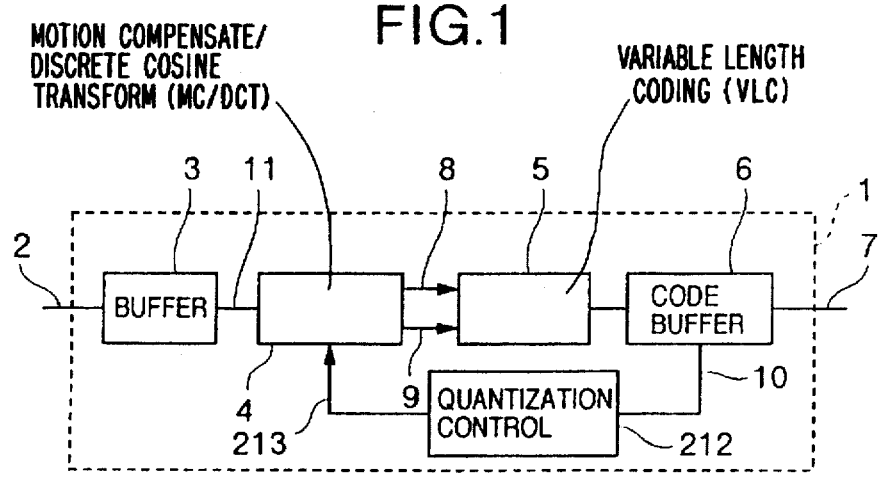
FIG. 1 is a block diagram for explaining a conventional signal encoder.
Figure 12:
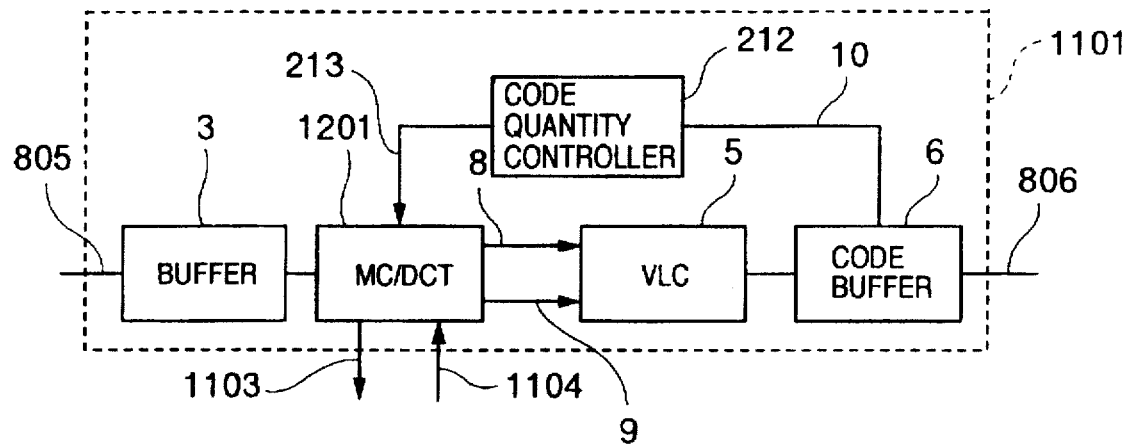
FIG. 12 is a block diagram showing a sub-encoder according to the present invention.

FIG. 12 shows details of the sub-encoder 1101. In operation, the encoder 1101 is substantially the same as the encoding apparatus 1 of FIG. 1. The discrepancy therebetween is that a write signal 1103 and a read signal 1104 of the shared memory 1102 are additionally disposed in the MC/DCT circuit 1201. In the circuit of FIG. 12, a predicted image memory is assigned to an overlapped area. Thanks to the provision, portions which are outside the pertinent area can also be used for the predicted according to motion compensation, which leads to an encoding efficiency substantially equal to that obtained by a single encoding apparatus.

Figure 13:
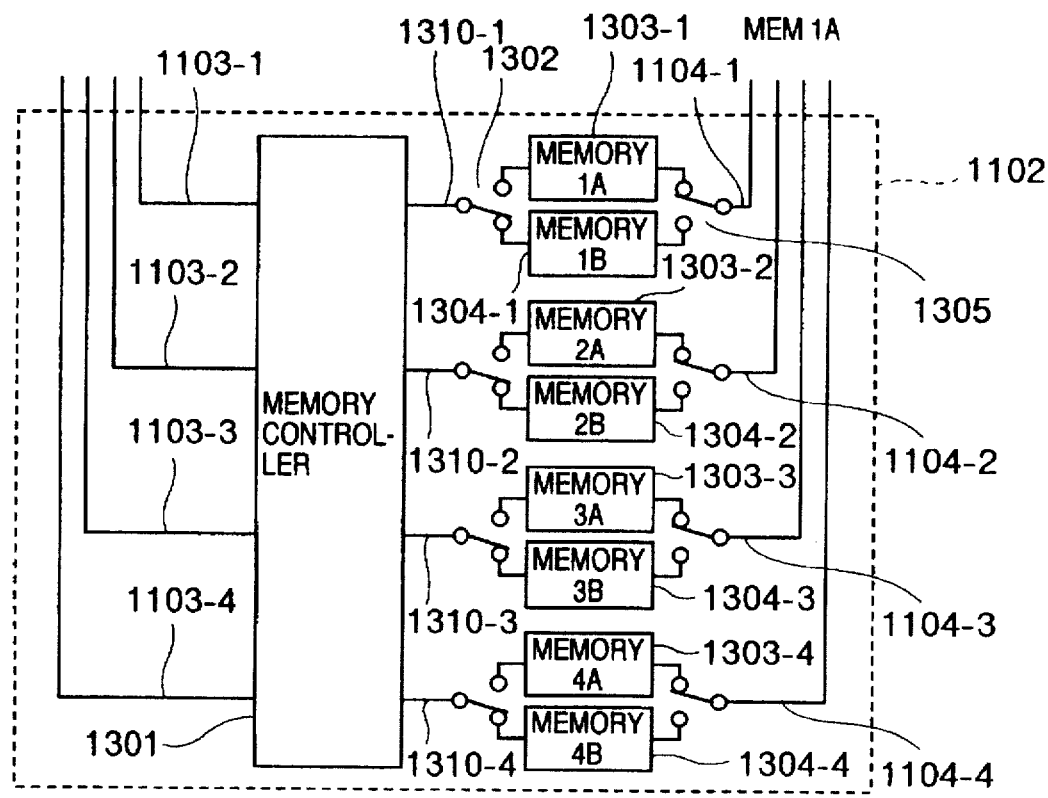
FIG. 13 is a diagram showing structure of a shared memory circuit according to the present invention.

FIG. 13 shows details of the shared memory circuit 1102. In write and read operations, the memory 1102 is directly accessed according to signals 1103-1 to 1103-4 and 1104-1 to 1104-4, respectively. The write signals 1103-1 to 1103-4 supplied from the respective sub-encoders 1101-1 to 1101-4 are fed to a memory control circuit 1301. The write signal 1103 is a signal string including a control signal for the memory 1102 and data. For example, there are sequentially transferred a write start address, an amount of write data, and a sequence of write data items. The amount of write data is appropriately set to 64 pixels (8 pixels by 8 lines; block data), 256 pixels (16 pixels by 16 lines; block data), or 384 pixels (6 sets of 8 pixels by 8 lines; macro-block data). The data in the two-dimensional form is first transformed into data of the one-dimensional form in a predetermined scanning method for transmission thereof. In this connection, the amount of write data may be specified as one-dimensional data including 8 or 16 pixels. Furthermore, there may be adopted a method in which a signal denoting the start of screen and a signal indicating the size of screen are first transferred at initiation of the encoding of the small screen sub-divided as described above and then data items are transmitted in an encoding sequence so as to write the data items in a preset address order. In the memory controller 1301, the pertinent memory is decided according to the write address such that each of the signals 1310-1 to 1310-4 is outputted to write data in the memory 1303-1 or 1304-1 to 1303-4 or 1304-4 respectively. The data write operation is carried out according to an address of the two-dimensional data attained by transforming the one-dimensional input data.

On the other hand, in the reading operation, the memory 1303 or 1304 is accessed according to the read signal 1104. The line of read signal 1104 includes a read address line and a data line and hence the read operation can be accomplished independently of the write operation.

Figure 14:
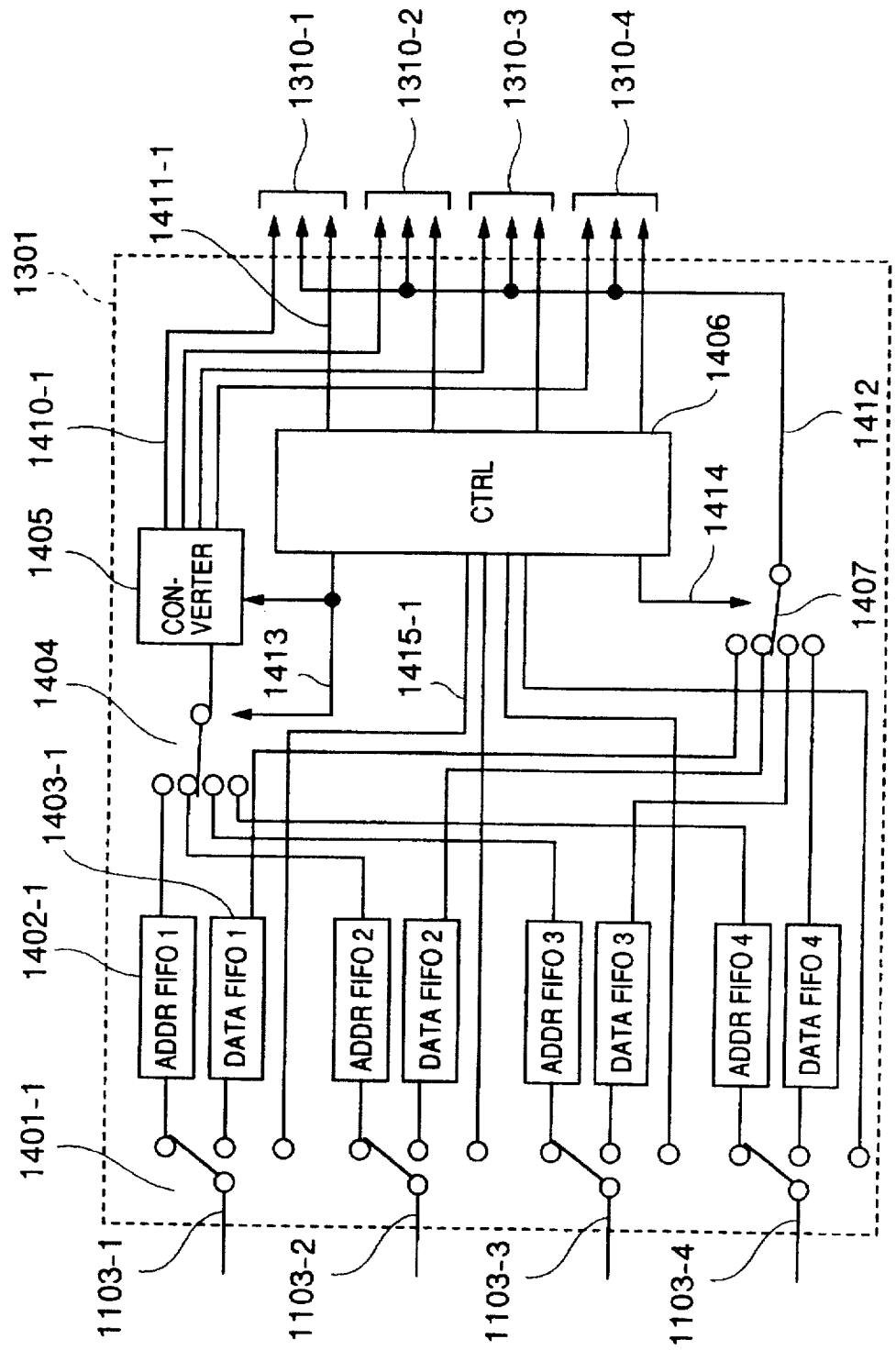
FIG. 14 is a diagram showing constitution of a memory control circuit according to the present invention.

FIG. 14 shows in detail the configuration of the memory controller 1301. Of the write signal 1103 supplied thereto, an address portion is fed via a switch 1401 to an address FIFO memory 1402 to be stored therein and a data portion is stored in a data FIFO memory 1403. The stored address and data are respectively selected by switches 1404 and 1407 to be simultaneously written in memories associated therewith. In this operation, the address data is converted by an address converting circuit 1405 into an address to be used by each sub-encoder. When write operations related to the write signals 1103-1 to 1103-4 are overlapped with each other, only one thereof is first executed such that the other write operations are delayed to be executed after the preceding write operation is finished. Incidentally, in case where there exists a fear of an event of overflow in any one of the FIFO memories, the condition is reported to the pertinent sub-encoder to interrupt the data input operation.

Figure 15A:
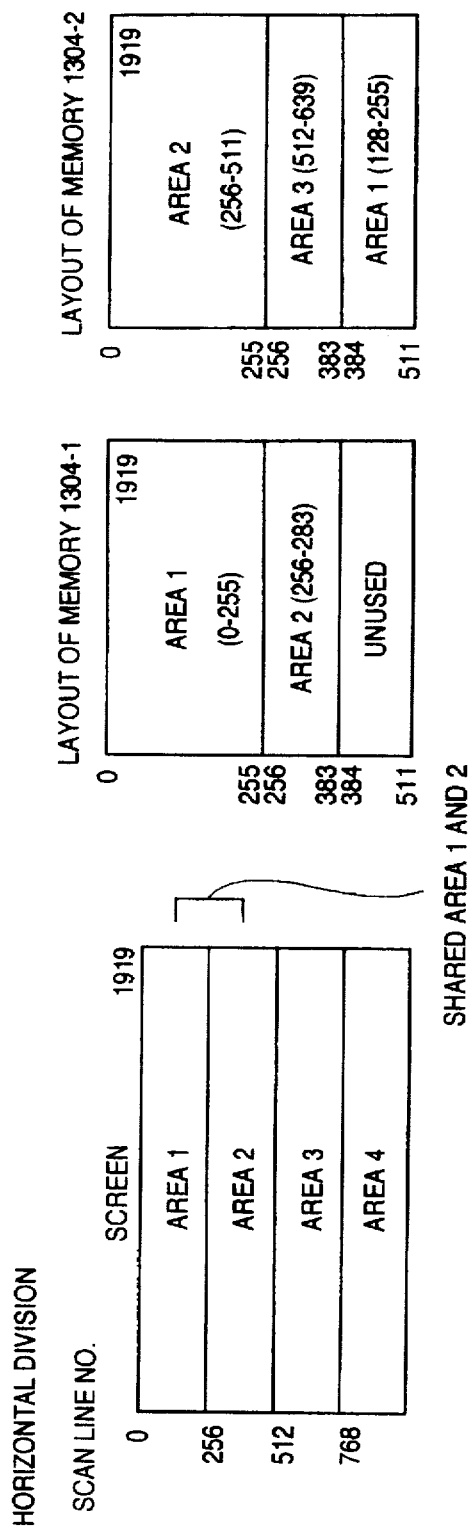
FIGS. 15A and 15B are diagrams for explaining a method of controlling memories according to the present invention.
Figure 15B:
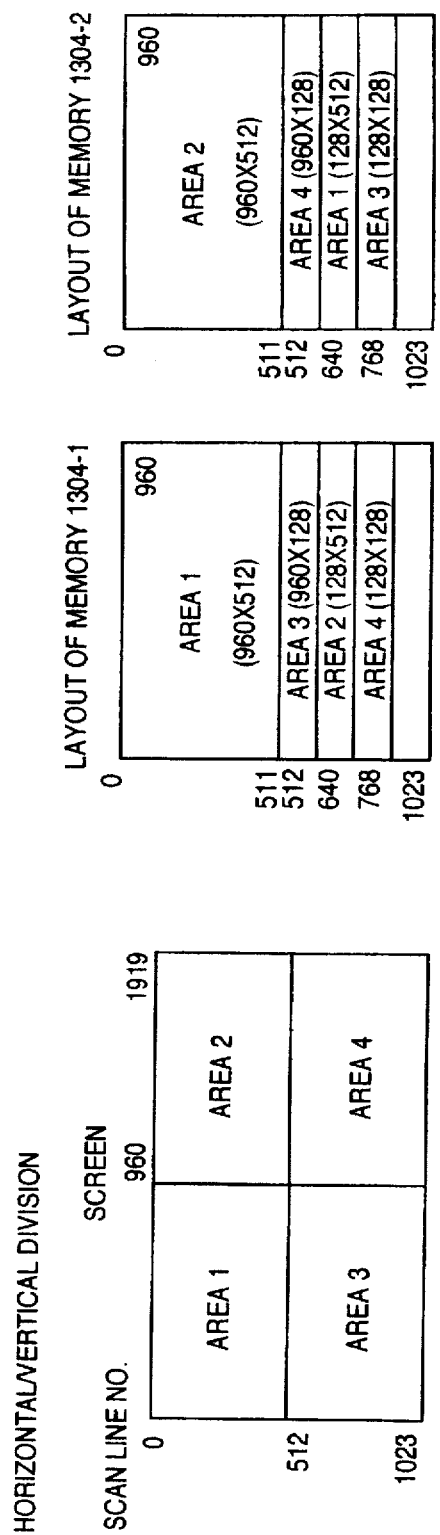

FIG. 15 shows an example of address conversion in the memory controller. In this example, a screen including 1920 horizontal pixels and 1024 vertical lines is partitioned into four portions or areas. In this connection, according to the image encoding method of MPEG or the like, the encoding operation is conducted for each group including 16 pixels by 16 lines of luminance signals and hence each area obtained by the division is preferably a rectangle having horizontal and vertical edges each being a multiple of 16. This however need not be necessarily applied to an area including the right-most or lower-most end of screen. Moreover, in an encoding apparatus in which two fields of interlaced images are combined with each other into a frame for each line to encode signals of the frame, the size of the vertical edge of the area in the frame image is desirably set to a multiple of 32 pixels. In the examples of division shown in FIGS. 15A and 15B, the screen is subdivided into four horizontal areas or areas and into four areas including the upper-right, upper-left, lower-right, and lower-left areas. In these examples, a shared region of 128 lines or 128 pixels exists between the adjacent areas. In the following description, the memory is assumed to be specified by a two-dimensional address and the vertical address is simply called an address unless otherwise specified.

In the example of screen division of FIG. 15A, the screen of the encoder is partitioned into four areas including 256 scan lines and a memory including 512 scan lines in the vertical direction is mounted as each of the memory areas 1303 and 1304. Each sub-encoder includes an area for the encoding of addresses 0 to 255 and a shared area assigned with addresses 256 to 511. In the first memory designated as, for example, 1304-1, scan lines 256 to 383 are stored in a region related to vertical addresses 256 to 383. In the memory 1304-2, scan lines 128 to 255 of area 1 are stored in a region related to vertical addresses 384 to 511 and scan lines 512 to 639 of area 3 are stored in a region associated with vertical addresses 256 to 383. Consequently, for example, data of scan line 240 is written in the memory 1304-1 at address 240 and in the memory 1304-2 at address 496 (240 +256) at the same time. Furthermore, data of scan line 300 is written in the memory 1304-2 at address 44 (300–256) and in the memory 1304-1 at address 300 (300–256+256) at the same time. Generally, in case where the screen image is subdivided into small areas each including P scan lines and data of Q scan lines is shared for one adjacent area between two areas adjacent to each other, it is necessary for each memory to have P+2Q vertical addresses. Assume that a slant (/) indicates a division in which the fractional portion of result of division is truncated and a percent sign (%) denotes a calculation for remainder. Under this condition, data of scan line Y is written in area n (=Y/P) at address y (=Y%P, $0 \leq y \leq P-1$). For y<Q, area (n−1) is used as the shared area and hence the data is stored in area (n−1) at address (y+P). For $y \geq P-Q$, area (n+1) is used as the shared area and hence the data is stored in area (n+1) at address (y−(P−Q) +P+Q=y+2Q). The calculation steps, which can be implemented through additions and subtractions of fixed values, are executed by the address converting circuit 1405. Particularly, in case where P=256 and Q=128, namely, P is a power of two and Q is half the value of P, the addition and subtraction can be achieved simply by operation of bits, which advantageously minimizes the circuit size. Moreover, like in the above case, when P is a power of two and Q is less than half the value of P, the calculation can be achieved only through the bit operation according to the address allocation in the same manner. In this situation, although there exists a area not to be accessed in the addressing scheme, it is unnecessary to allocate any actual memory device to the area.

In the example of screen division of FIG. 15B, the screen is partitioned into four small areas each including 960×512 pixels. In this case, data of the area to be encoded is stored in the memory at addresses 0 to 511 and data of the shared area is stored in the memory at address 512 and subsequent addresses. In the memory 1304-1, 960 pixels ×128 lines (scan lines 512 to 639) of area 3 are stored at addresses 512 to 639. At addresses 640 to 767, there is stored data obtained by exchanging the vertical addresses for the horizontal addresses for data of 128 pixels ×512 lines (scan lines 0 to 511) of area 2. Stored at addresses 768 to 960 are 128 pixels×128 lines (scan lines 512 to 639) of area 4. In the write operation, data of the portion, for example, shared among areas 1 to 4 is simultaneously stored in the memories 1304-1 to 1304-4. The address converting and scanning operation above is carried out by the address converting circuit 1405. When compared with the case in which the screen space is partitioned into horizontal areas, the configuration of the address converting circuit 1405 becomes slightly complicated in the case in which the screen area is subdivided into four aread in the vertical and horizontal directions. On the other hand, when there is disposed the same shared range (including the same number of pixels from the boundary), the capacity of each of the memories 1303 and 1304 is reduced. In the examples of FIG. 15A and 15B, the memory capacity is reduced to ¾ that of the original memory. Incidentally, description has been given according to luminance signals by way of illustration. However, the present invention is advantageously applicable to chrominance signals as well as luminance and chrominance signals.

In the description of FIGS. 11 to 14 and 15A and 15B, the screen region is partitioned into four areas. However, it is to be appreciated that the number of partitions may be set to any value other than four. When the number of partitions becomes greater, the amount of processing of each sub-encoder is decreased. Consequently, there may be employed a circuit having lower performance and/or an image of a larger area can be encoded by the same processing capacity. However, after completely encoding a screen image, the pertinent sub-encoder cannot immediately start encoding the subsequent screen image. Namely, the encoder is required to wait for termination of processing of the other sub-encoders related to the shared area. For example, in the example of screen division into horizontal areas, the processing start time is preferably shifted for each sub-encoder such that the encoder 1101-1 initiates processing when the signals of area 1 are completely inputted and the encoder 1101-2 starts processing when the signals of area 2 are completely inputted. This reduces the delay of processing and minimizes the buffer capacity for the delay correction. In the above method, the encoder 1101-1 is required to wait for termination of processing of the encoder 1101-2 before starting the encoding of subsequent data. Similarly, it is necessary for the encoders 1101-2 and 1101-3 to await termination of processing of the encoders 1101-3 and 1101-4. That is, the encoding process of an encoder is required to be completely finished prior to the input of a screen image to the preceding sub-encoder. As a result, the substantial period of time for each encoder to conduct the encoding operation is reduced to ¾ of the overall period of time. Assume that the overall processing amount is represented as one. The processing capacity of each encoder is represented as ⅓ (=¼*⁴⁄₃), not ¼. When the number of partitions is increased and hence the number of sub-encoders becomes greater, only after the processing is terminated in all pertinent encoders, the encoding operation can be initiated for the subsequent screen image. In consequence, even when the number of partitions is increased, it will be impossible to lower the processing capacity of each sub-encoder if there exists large shared areas. Since the processing unit of image encoding is 16×16 pixels for luminance signals and almost any motion can be compensated when the motion vector search range is from about −15 to about +15, the number of scan lines of the shared area is optimally set to 16 relative to the boundary (32 lines (upper 16 lines and lower 16 lines) of the boundary area shared between two areas). However, the correlations in and between screens are relatively weak. Consequently, even when the shared area is set to eight lines, the picture quality is rarely deteriorated. When the shared area includes about 16 lines or less, the influence of the encoding wait time is negligibly weak.

The correlations of screen images are generally strong in the horizontal direction and hence the encoding effectiveness is improved when all pixels are assumed to be in an identical area in the horizontal direction in the encoding operation. The number of sub-encoders need not be necessarily equal to that of divided partitions. In case where the system includes a small number of encoders, the encoder having finished an encoding process for a region of a screen will conduct the process again for another region thereof. When there are arranged a large number of encoders, the amount of processing is reduced for each of the encoders. However, only when the encoding operation is finished for a preceding screen, it is possible to commence the encoding of a screen succeeding thereto in actual cases. Consequently, in the example including the shared area of about 16 lines, the processing performance of the encoder is required to be 1/(R−1), where R indicates the number of partitions. However, when encoding a screen, for example, a screen of B picture which is not used for the predicted of another screen, the encoding operation can be achieved with the processing performance of 1/R.

The write operation of the shared memory leads to the following advantages. Since each sub-encoder 1101 is able to access the reference image of the sub-encoder adjacent thereto, the range of motion compensation can be set to be substantially the same as for the encoding operation of a single encoder. Namely, the disadvantage of the dividing and encoding method can be suppressed. Thanks to the simultaneous write operation in the shared areas, the number of write operations in the memory per unitary time becomes equal to that of memory write operations in the case of a single encoder. Consequently, the operation speeds respectively of the memory control circuit and memory need only be almost the same as for those used in the case of a single encoder. Namely, there can be used devices of an ordinary operation speed and circuits having a rather simple configuration.

Figure 2:
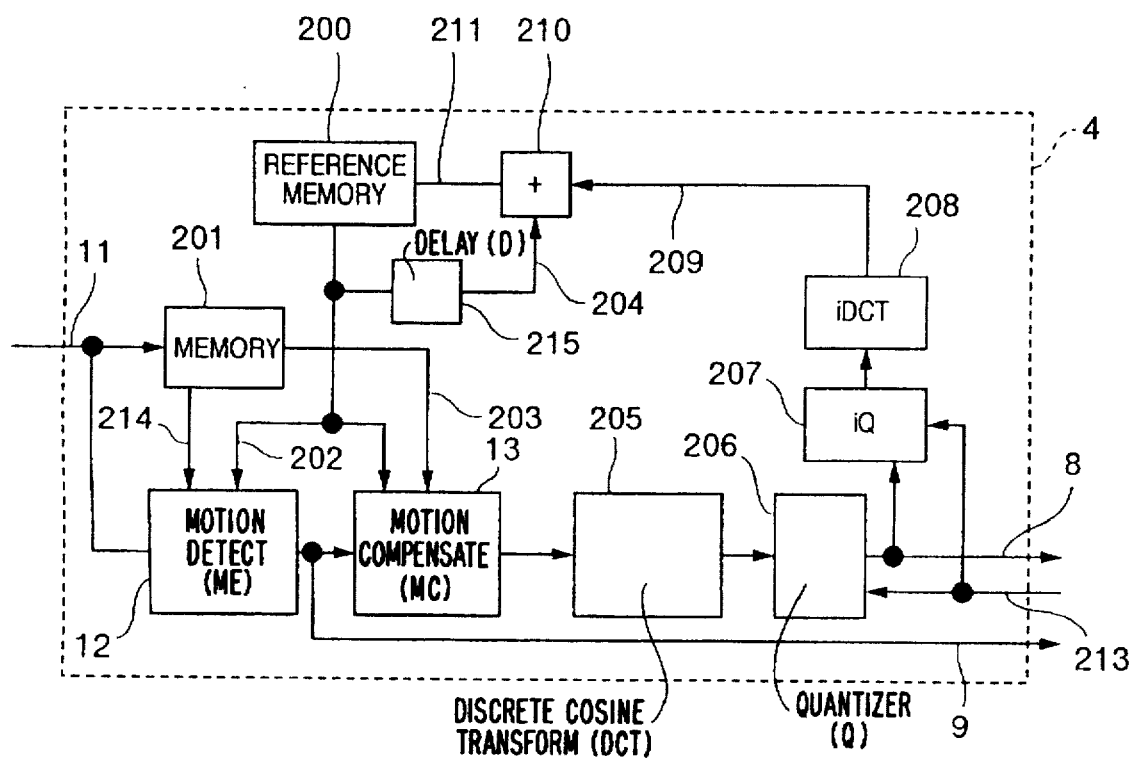
FIG. 2 is a circuit diagram showing details of an MC/DCT circuit of the prior art.
Figure 16:
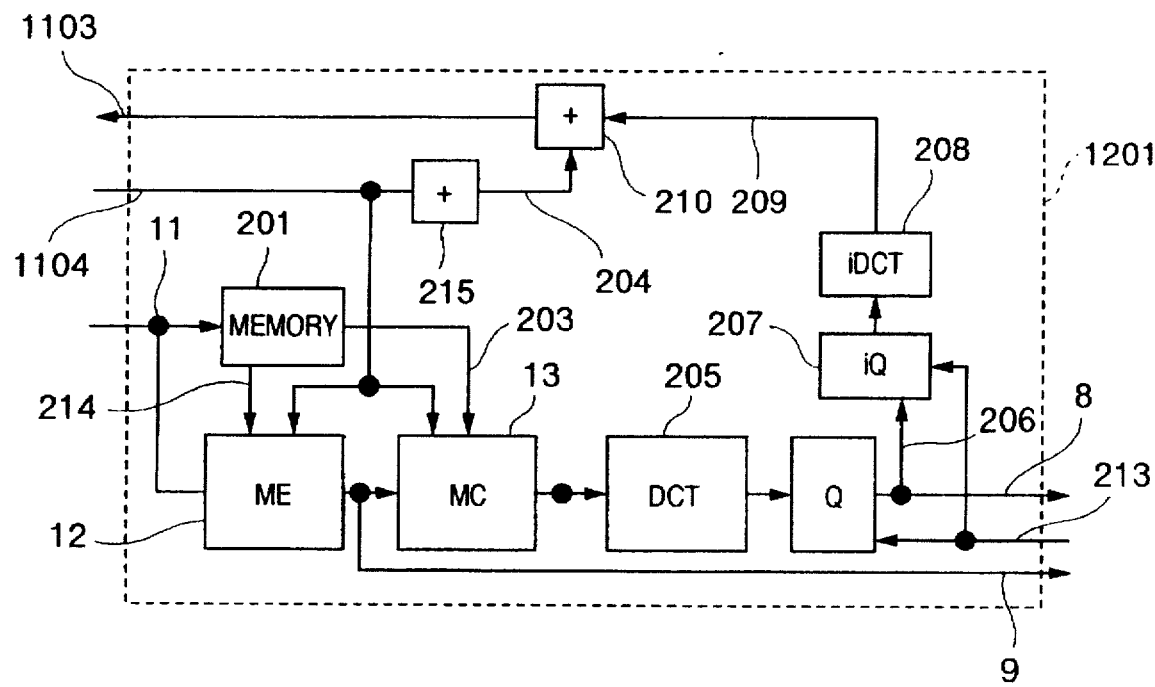
FIG. 16 is a diagram showing constitution of an MC/DCT circuit according to the present invention.

FIG. 16 shows details of the MC/DCT circuit 1201 of FIG. 12. The overall operation of the circuit 1201 is substantially the same as the conventional MC/DCT circuit 4 and hence description thereof will be unnecessary. In the MC/DCT circuit 1201 of FIG. 16, the portion equivalent to the reference image memory 200 of FIG. 2 is disposed in an external shared memory circuit 1102 (FIG. 13), which is an aspect related to the present invention. For this purpose, a write signal 1103 and a read signal 1104 are additionally arranged therein. The other constituent elements of the MC/DCT circuit 1201 are the same as those of the MC/DCT circuit 4.

In the image encoding apparatus 800 according to the present invention, while keeping the same encoding efficiency as that of a single encoder, the amount of processing of each sub-encoder is reduced to about ⅓ to about ¼ due to the screen division into four areas. This makes it possible to execute the encoding process only by low-speed devices. As a result, a low-speed and small-sized system or a low-speed and low-cost system can be realized, namely, the size and/or cost of overall image encoding apparatus can be decreased. The advantageous effect of the present invention is enhanced when the sub-encoder 1101 is implemented through software processing by a processor or the like. Ordinary television signals cannot be easily encoded by a single processor having the processing capability of the present stage of art. On the other hand, if the encoding operation can be accomplished through processing of a software system, the processing method can be improved and the encoding apparatus can easily cope with any new encoding method. Moreover, the period of time and human power required for the development and maintenance of encoding facilities will be minimized. Thanks to the application of the present invention, the encoding efficiency developed by a single hardware encoder can be obtained by the image encoding apparatus while taking advantage of software processing. In this situation, if each sub-encoder 1101 is assigned with a unique number such that an encode area, an address conversion method, and the like are specified according to the number, all sub-encoders can be configured in the same structure. When the encoding operation is to be conducted through hardware processing, the productivity as well as inspection efficiency of the substrate, large-scale integration chip, or the like of the apparatus will be improved. When the encoding operation is to be conducted through software processing, in addition to the improvement of productivity, there can be attained an advantage that the period of time and amount of labor necessary to deliver the execution software will be decreased.

Figure 17:
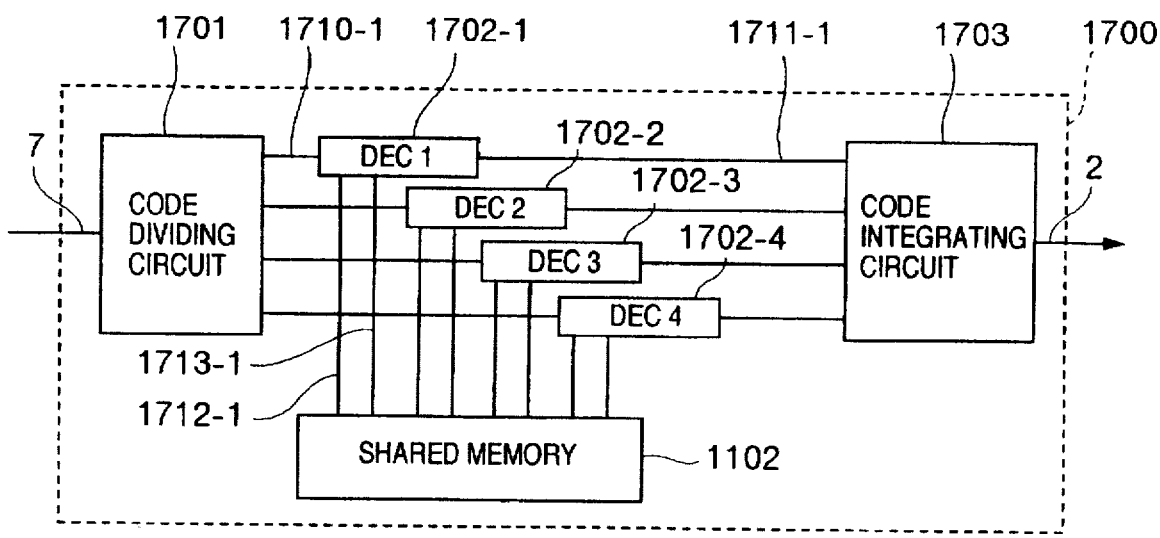
FIG. 17 is a diagram showing constitution of an image decoding apparatus according to the present invention.

FIG. 17 shows a second embodiment of the present invention. In the configuration of FIG. 17, the present invention is applied to an image decoding apparatus 1700. The decoding apparatus 1700 is a facility in which a code string created by the image encoding apparatus 1 or 800 is supplied to restore an original image therefrom. The code string 7 is fed to a code dividing or distributing circuit 1701 to be fed as codes 1701-1 to 1701-4 respectively corresponding to partitions beforehand subdivided. The code 1710 is supplied to a small decoder 1702 to be restored to an image. The restored images 1702-1 to 1702-4 are inputted to an image assembling circuit 1703 and are then combined with each other into an image 2.

Figure 18:
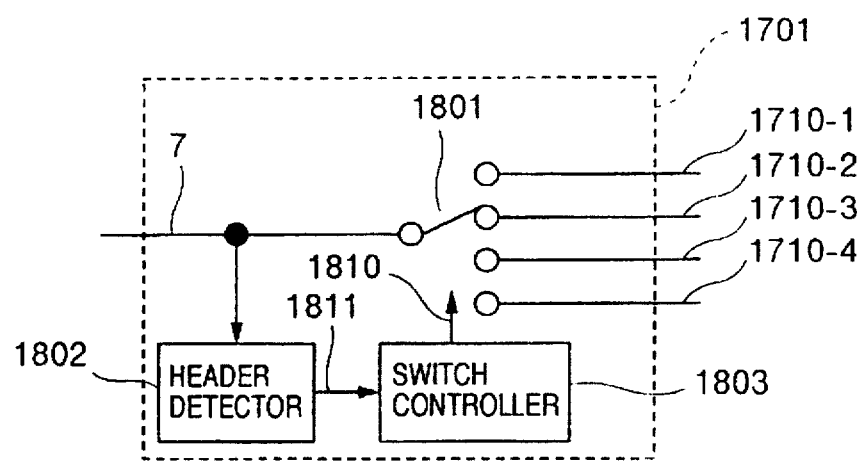
FIG. 18 is a diagram showing the configuration of a code dividing or distributing circuit according to the present invention.

FIG. 18 shows details of the code dividing circuit 1701. The input code 7 is fed to a header detecting circuit 1802 in which a header portion thereof is detected and analyzed to decide the encoding position of the screen image. The result of decision is outputted as a position information signal 1811. According to the signal 1811, a switch control circuit 1803 sets a switch 1901 to an appropriate position in response to a control signal 1810.

Figure 3:
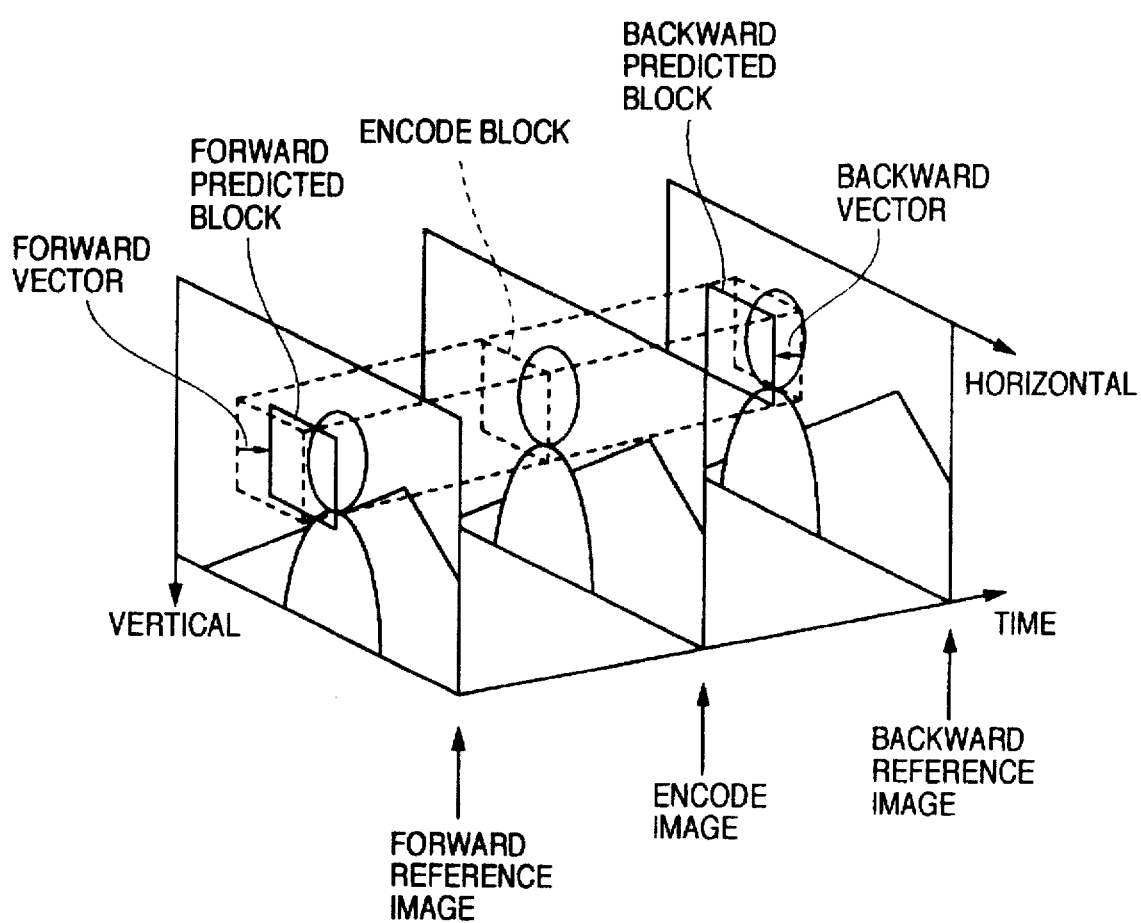
FIG. 3 is a diagram for explaining operation of predicted according to motion compensation between frames.
Figure 19:
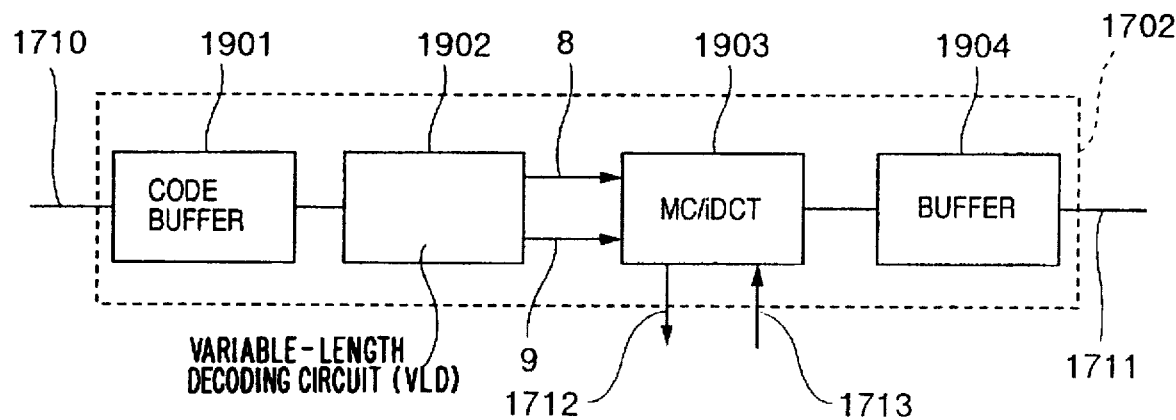
FIG. 19 is a diagram showing structure of a sub-encoder according to the present invention.

FIG. 19 shows in detail the configuration of a decoder circuit 1702. A signal 1710 inputted thereto is once stored in a code buffer 1901 to be later read therefrom into a variable-length decoding circuit 1902 for the decoding thereof. As a result of the decoding operation, decode information items such as a DCT coefficient 8 and a motion vector 9 of the difference image are delivered to an MC/iDCT circuit 1903. In the circuit 1903, the DCT coefficient 8 is inversely quantized to be subjected to an inverse DCT operation so as to reproduce the difference image. On the other hand, a predicted image indicated by information such as the motion vector 9 is generated from the reference image stored in a shared memory circuit 1102 according to a read signal 1713. The obtained predicted image is added to the restored difference image. This processing is the same as that ranging from the inverse quantization 207 to the storage in the reference image memory 200 of FIG. 3 as described above. Through the operation, there is produced a restored image, which is stored in an output buffer 1904. The image is read therefrom in synchronism with a display request to be presented on a television screen or the like. At the same time, the image is stored in a shared memory circuit 1102 via a write signal line 1712.

Figure 20:
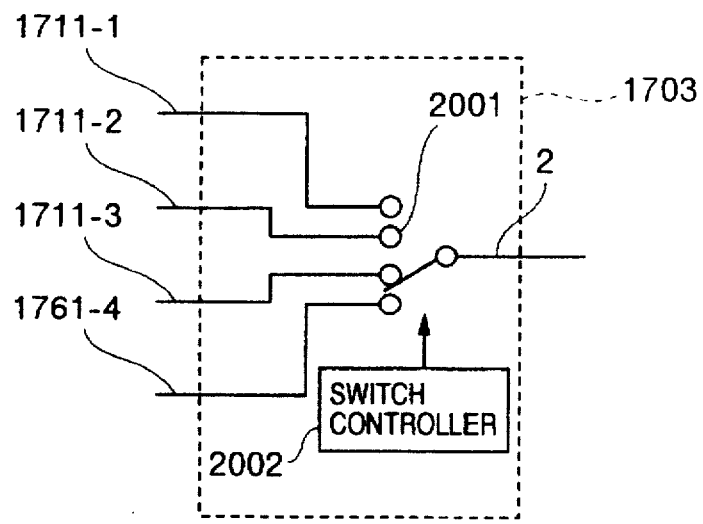
FIG. 20 is a diagram showing constitution of a code assembling or combining circuit according to the present invention.

FIG. 20 shows details of the image combining or synthesizing circuit 1703. In this configuration, a switch control circuit 2002 monitors a display timing point to select by a switch 2001 either one of the reproduced image signals 1711-1 to 1711-4 associated with a display portion so as to read pixel data from the related decoder 1702. The pixel data is transmitted as the output video signal 2.

As above, the present invention is applicable also to an image decoding apparatus as shown in FIG. 17. According to the conventional technology, when using a decoding apparatus conducting the screen division, the original image can be reproduced only from particular codes for which predicted according to another small area is inhibited. This restriction is removed thanks to the application of the present invention. Furthermore, there is obtained the advantage of reduction in the circuit size like in the case of the image encoding apparatus. In addition, the advantageous effect of the present invention is remarkably increased when the encoding operation is accomplished through software processing in the similar manner as for the image encoding apparatus. When subdividing the screen image into horizontal areas, the number of lines is limited to a multiple of 16 in the vertical direction. For interlaced images, the number is required to be a multiple of 32.

Next, description will be given of variations of circuits associated with the second embodiment. It is to be appreciated that the variations as well as combinations thereof are within the scope of the present invention.

Figure 21:
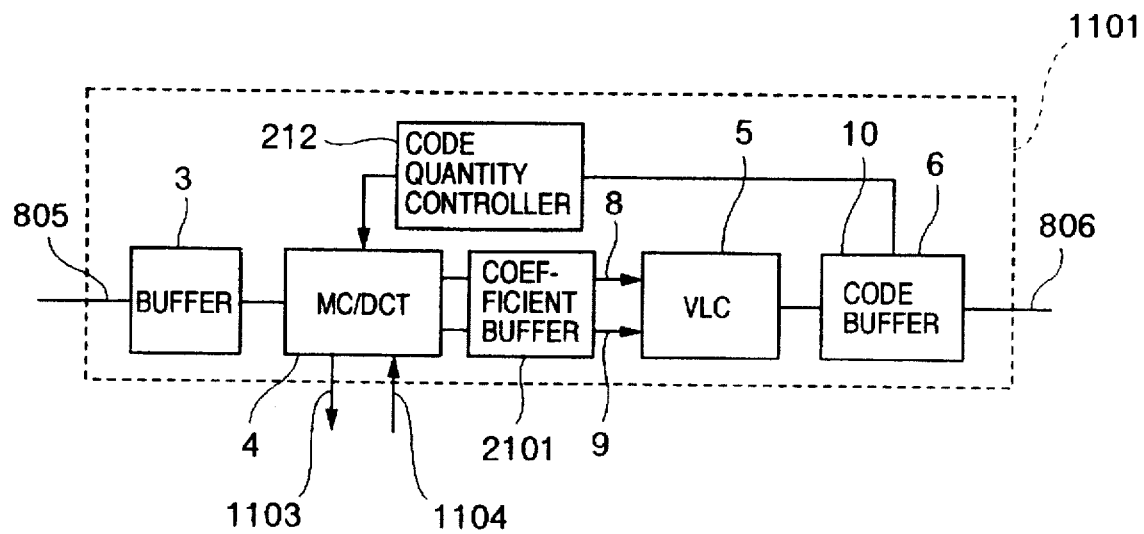
FIG. 21 is a diagram showing an alternative structure of the sub-encoder.

FIG. 21 shows a variation of the sub-encoder circuit 1101. The encoder 1101 of FIG. 21 has an aspect that a buffer 2102 for temporarily storing information items such as a DCT coefficient 8 and a motion vector 8 is arranged between an MC/DCT circuit 4 and a variable-length decoder circuit 5. The amount of processing of the MC/DCT circuit 4 is proportional to the number of objective pixels as described above. Consequently, for the implementation of hardware, it is desirable that one unit of processing (8×8 block processing or macro-block processing) is completely achieved during a fixedly predetermined period of time. On the other hand, the amount of processing of the variable-length decoder circuit 5 depends on the quantity of generated codes and varies between the processing units. In case where the two kinds of processes are executed in a pipeline processing procedure, there possibly arises a problem as follows. For example, if the processing period of time for variable-length codes exceeds that of the MC/DCT process, the process of the encoding of variable-length codes continues even when the processing unit of MC/DCT is terminated. Namely, the MC/DCT 4 is required to await the termination before initiating a subsequent operation. To cope with the difficulty, there have been known two methods. First, a higher-speed variable-length encoder circuit is employed for the variable-length encoder 5 to completely finish the pertinent processing within the period of one processing unit of the MC/DCT circuit 4. Second, the processing speed of the MC/DCT circuit 4 is increased so that the pertinent process can be achieved within the preset period of time even when there occurs the wait time for the variable-length encoding process. Each of the methods requires high-speed processing circuits and hence is unsuitable for the reduction of the production cost and system size. Thanks to provision of a buffer 2101 as shown in FIG. 21, imbalance of the amount of processing between the MC/DCT process and variable-length encoding process can be absorbed. As a result, the MC/DCT and variable-length encoder circuits can execute processing at a low speed. The storage capacity of the buffer 2101 is desirably set to the maximum of information of one screen, namely, information including DCT coefficients which are equal in number to the pixels of one screen and motion vector information. Actually, however, the storage capacity need only be about ½ to ¼ of the number of pixels of one screen. In the actual operation, when a predetermined number of DCT coefficients are completely inputted to the buffer 2101, the variable-length encoder 5 starts processing thereof. Incidentally, the circuit size can be considerably minimized when the above variation of the present invention is applied in combination with the embodiment of FIG. 11. However, the similar effect of reduction in the circuit size can be attained when the present invention is applied to an image encoding apparatus using a single sub-encoder circuit.

Figure 22:
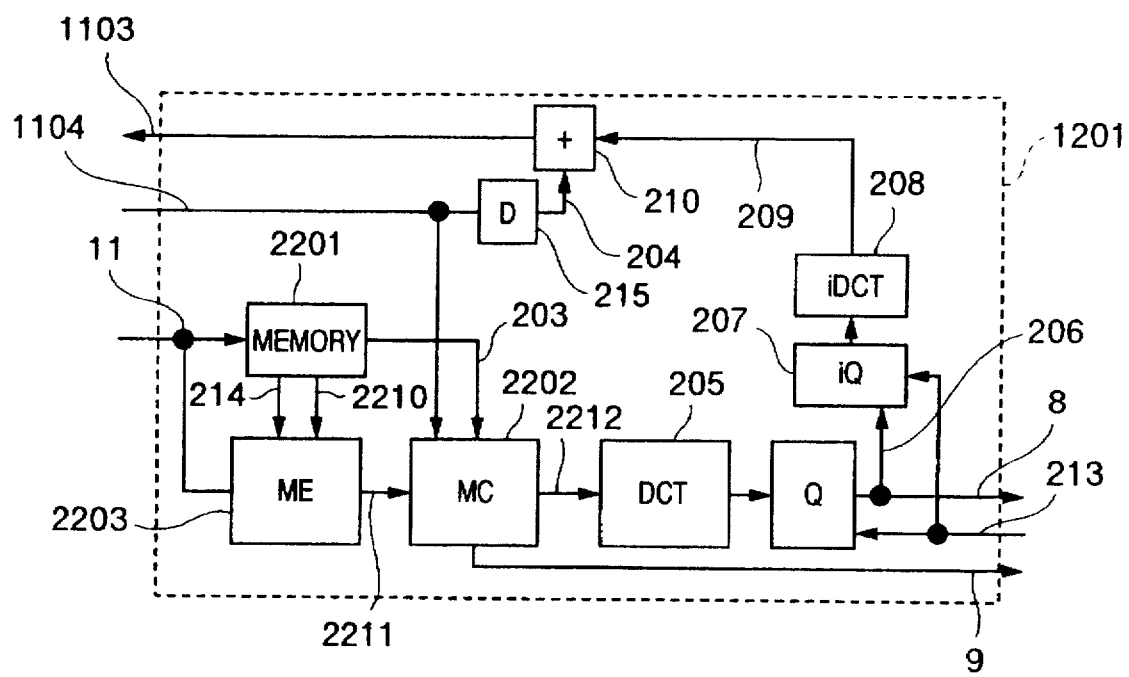
FIG. 22 is a diagram showing an alternative structure of the MC/DCT circuit.

FIG. 22 shows a variation of the MC/DCT circuit 1201 of FIG. 16. This circuit system differs from that of FIG. 16 as follows. In place of a reference image, an input image 2210 is supplied to a motion detecting circuit 2203. Ordinarily, since difference between a reference image and an input image corresponding thereto is small, the input image can be employed in place of the reference image 1104 for the motion detection. Namely, the motion detection is carried out according to a signal 2210 obtained by delaying the input image. In the embodiment of FIG. 22, to absorb discrepancy or an error detected between the result of detection using the reference image and that of detection utilizing the input image, the motion detection is conducted by the motion compensating circuit 2202 in a small range according to the reference image.

Figure 4:
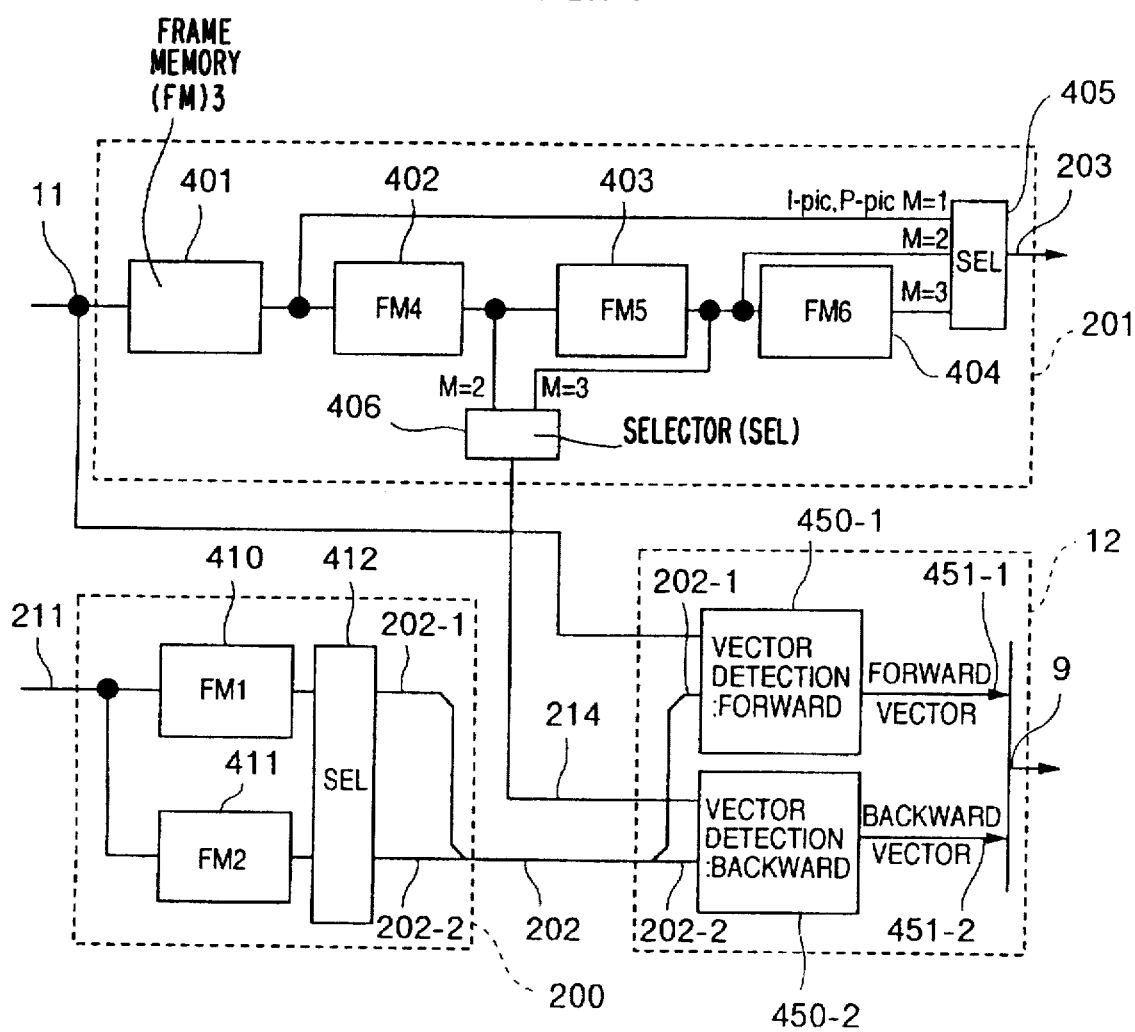
FIG. 4 is a block diagram showing structure of an image memory, a reference image memory, and a motion detecting circuit of the prior art.
Figure 5:
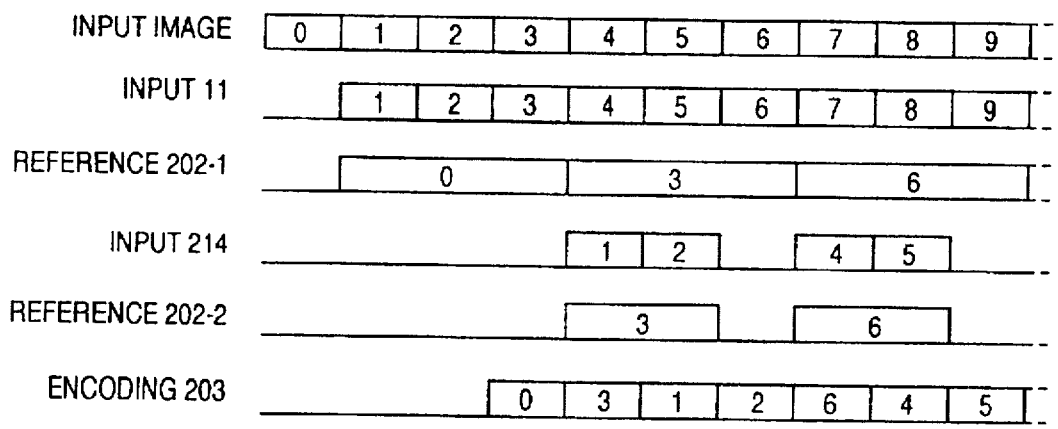
FIG. 5 is an operation timing chart of the motion detecting circuit of FIG. 4.
Figure 23:
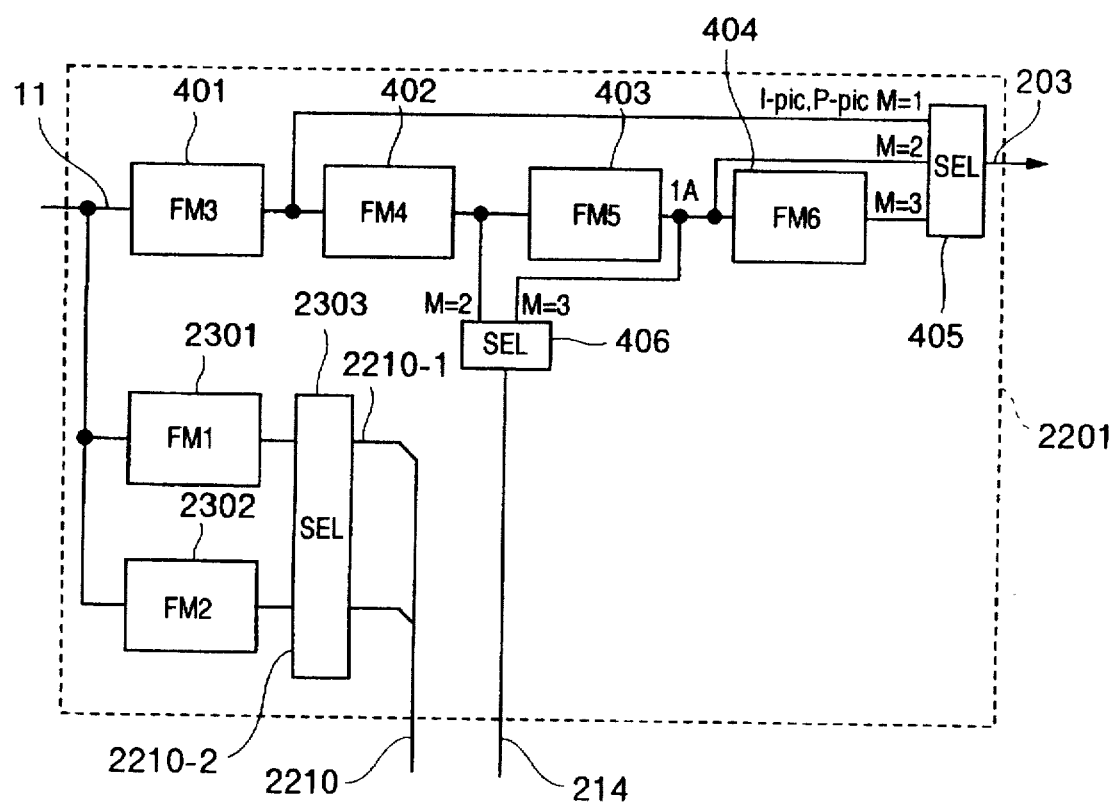
FIG. 23 is a diagram showing structure of the frame memory circuit of FIG. 22.

FIG. 23 shows in detail the frame memory circuit 2201 of FIG. 22. In place of the memories 410 and 411 to which the reference image is conventionally inputted as shown in FIG. 4, there are adopted memories 2301 and 2302 as storages of the input image 11. Each of the memories 2301 and 2302 is required to have the storage capacity equal to the size of each small area to which the shared area is added. The number of pixels stored therein is larger than that of any one of the other memories 401 to 404. This is achieved as follows. While video data of the entire screen is being supplied to the signal line 11, necessary portions of the video data are written in the memories 401, 2301, and 2302. In this connection, the data storing operation of the memory 2301 or 2302 is carried out only when the input image 11 is associated with an I picture or a P picture. Signals of the input image are chosen by a selector circuit 2303 to be rearranged into forward predicted signals 2210-1 and backward predicted signals 2210-2.

Through the processing of FIGS. 22 and 23, the number of reference image read operations is remarkably reduced in the motion detection according to the embodiment of FIG. 16. The reference image is required to be read from the storage to achieve the motion detection during a period of time from when the preceding image is encoded and a local decoding operation is finished to when the pertinent portion is encoded. For this purpose, it has been necessary that the read operation and transfer of a large amount of data are conducted at a high speed. Achieving the motion detection according to the input image in place of the reference image, the number of signal lines of the read signal 1104 can be decreased and the read operation speed of the shared memory 1102 and the operation speed of the memory devices 1303 and 1304 can be lowered, which leads to reduction of the circuit size and cost. Conventionally, the motion detection can be accomplished only after the reference image is completely written in the storage. However, the motion detection is allowed to be accomplished independently of the reference image write operation in this system. Consequently, the degree of freedom is increased in the circuit configuration and hence the circuit can be decreased in size and cost. Moreover, the frame memory 2201 and the motion detecting circuit 12 may be separated from the image encoding apparatus to achieve the processing in the separate fashion with respect to time and/or space. Image encoding apparatuses and image encoding methods associated with the above functions are also in the scope of the present invention. Specifically, the system may be implemented as follows. In an offline process, images are re-arranged and motion vectors are detected to be stored in a storage such that the stored images and data of motion vectors are inputted to the encoding apparatus via the signal lines 203 and 9 in relation to operation of the encoding apparatus. In this regard, it is to be understood that the variations above are applicable also to an image encoding apparatus employing a single encoder circuit. The advantageous effect of the present invention will be further improved when the variations are combined with the embodiment of FIG. 11. That is, the encoder portion of FIG. 11 operates at a processing rate obtained by dividing the pixel input rate by five or six. However, the shared memory circuit 1102 is required to operate at a processing rate proportional to the pixel rate of the input image. According to the application of the frame memory circuit of FIG. 22 of the present invention, a portion of the process associated with the high processing rate can be executed at a low speed in the sub-encoder. This makes it possible to minimize the overall circuit size.

Figure 24:
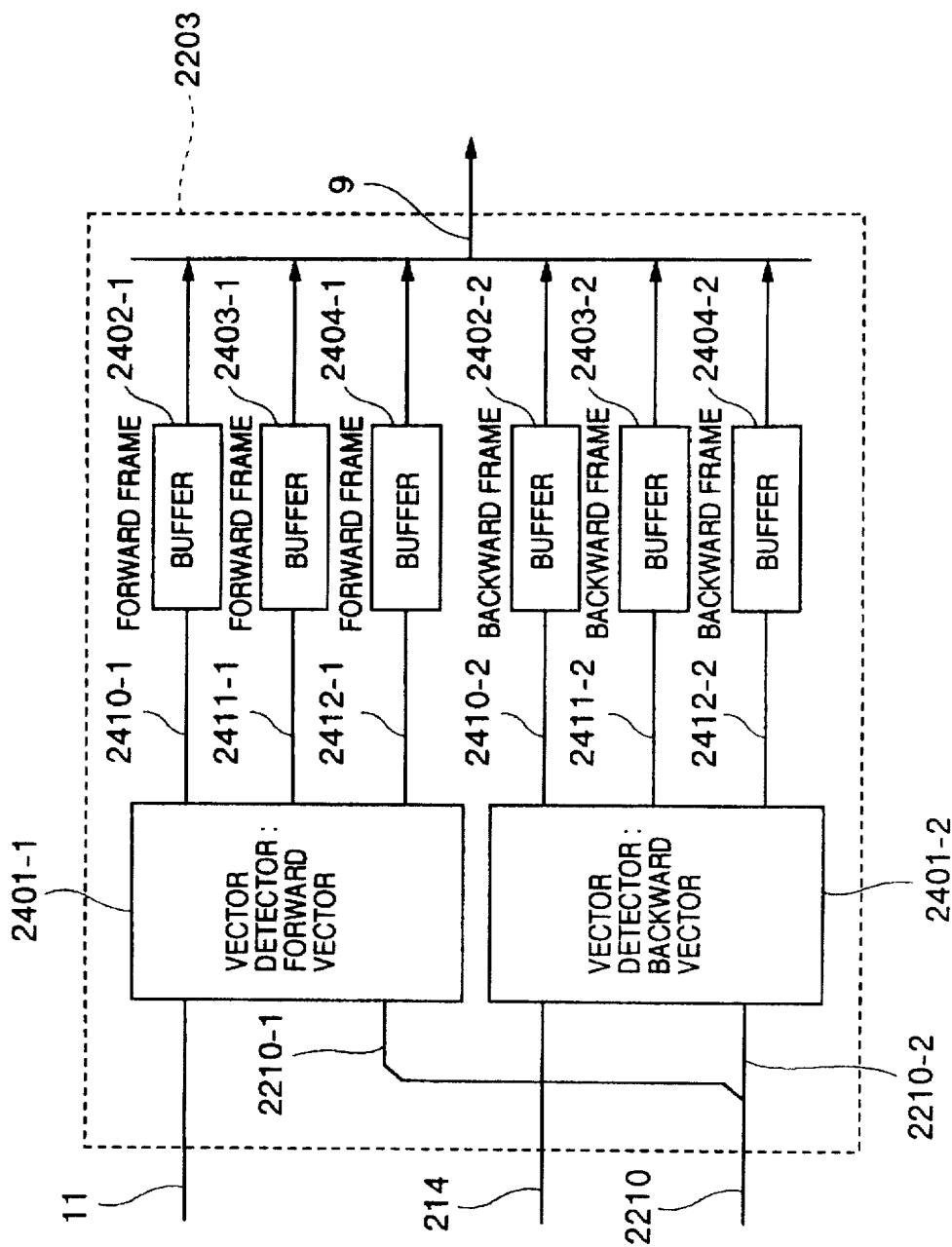
FIG. 24 is a diagram showing constitution of the motion detector of FIG. 22.

FIG. 24 shows details of the motion detecting circuit 203 of FIG. 22. This circuit is different from the circuit of FIG. 4 in that interlaced images are processed in the corresponding fashion. When an interlaced image is inputted to the circuit, three kinds of vectors are produced from one motion vector detector 2401. The vectors include a vector 2410 obtained by detecting the macro-block of 16 pixels ×16 lines in this format and vectors 2411 and 2412 detected from two separated groups of 16 pixels ×8 lines related to odd-numbered lines and 16 pixels ×8 lines associated with even-numbered lines, respectively. The resultant vectors are stored respectively in buffers 2402 to 2404 to be later read therefrom via a signal line 9. The motion detecting circuit 2203 includes a motion vector detection circuit for forward predicted 2401-1 and a motion vector detection circuit for backward predicted 2401-2. On the other hand, when a non-interlaced image such as a sequential scanning image including a field image is inputted to the system, there are obtained three kinds of vectors from one motion vector detecting circuit 2401. The vectors include a vector 2410 obtained by detecting the macro-block of 16 pixels ×16 lines and vectors 2411 and 2412 detected from two separated groups of 16 pixels ×8 lines of the upper-half of the macro-block and 16 pixels ×8 lines of the lower-half thereof, respectively. Thanks to the functions above, the predicted efficiency can be increased for images obtained by various scan operations in a limited circuit size.

Figure 25:
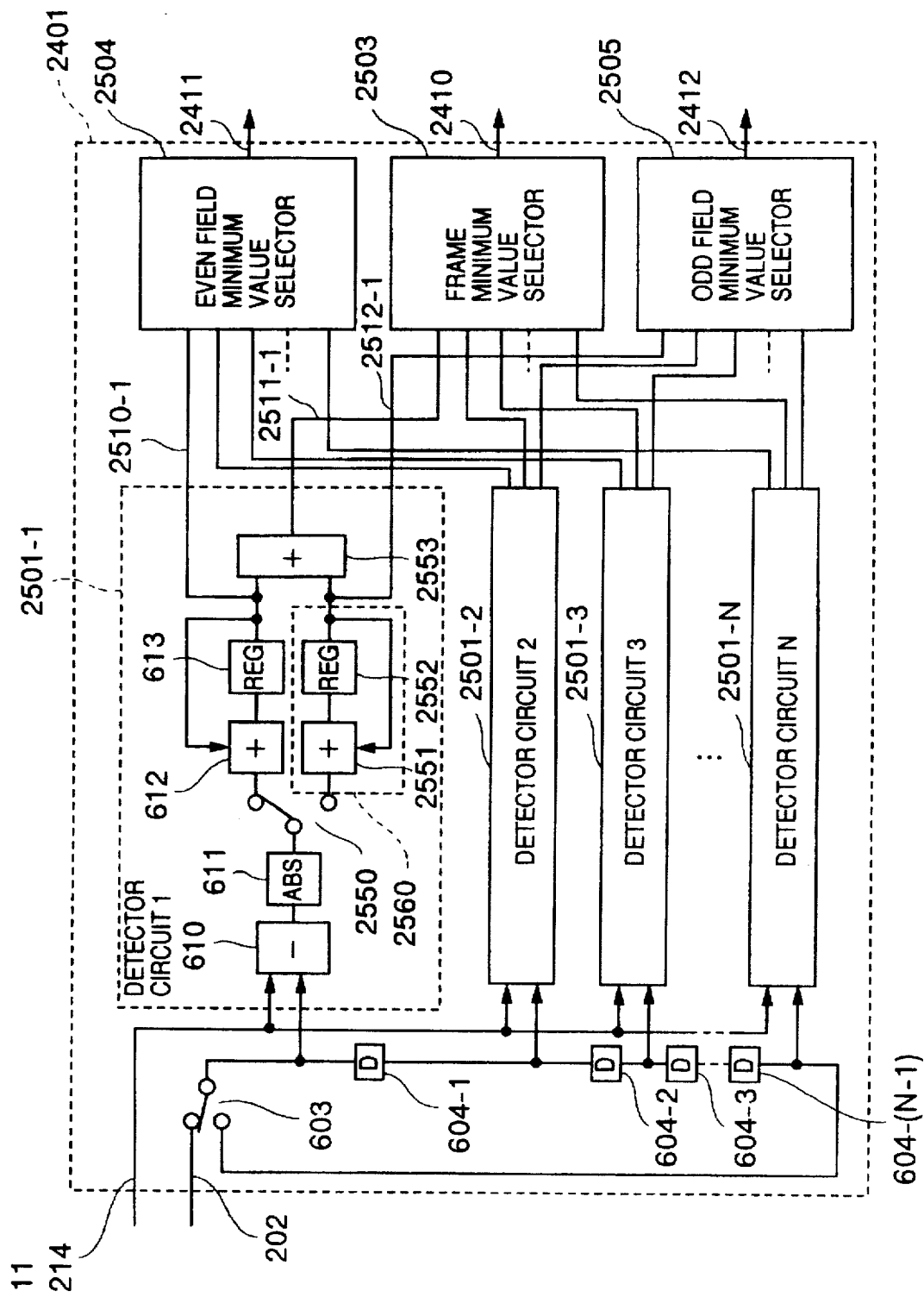
FIG. 25 is a diagram showing the construction of the motion vector detector of FIG. 24.

FIG. 25 shows in detail the motion vector detecting circuit 2401 of FIG. 24. The overall operation of this circuit is substantially the same as that of the circuits of FIGS. 6 and 7. Although the detection unit is set to 16×16 pixels, the number of motion vector detecting circuits varies depending on the search range as described in the conventional example and is set to N for general usages. The embodiment has an aspect that the signal process in each detector circuit 2501 is duplicated for two channels and there are disposed three units of minimum value selectors 2503 to 2506. In the detector 2501, there is calculated the total of absolute values of the difference between the respective pixels of the macro-block. The absolute value of difference from the absolute value circuit 611 is selected by a switch 2550 to be fed to the adder 612 or 2551. When this operation is accomplished according to the odd-numbered and even-numbered lines, the motion vectors are detected in association with the interlacing scanning signals. When the operation is carried out for the eight upper lines and eight lower lines, the motion vectors are detected for 16×8 pixels. Results of additions from the adders 612 and 2551 are stored in registers 613 and 2552, respectively. When the processing is finished for one macro-block including 256 pixels, a difference value 2510 related to the even-numbered lines or eight upper lines and a difference value 2512 associated with the odd-numbered lines or eight lower lines are stored in the registers 613 and 2552, respectively. These values of discrepancy are added to each other by an adder 2553 to obtain a difference value 2511 of the entire macro-block. Three difference values thus obtained are supplied respectively to the minimum value selector circuits 2503 to 2505 such that the minimum value is selected in each selector circuit in an independent fashion. As a result, when all processing steps above are finished, there are attained three vectors including a vector 2410 for the overall macro-block, a vector 2412 for the odd-numbered lines or eight upper lines, and a vector 2411 for the even-numbered lines or eight lower lines. In FIG. 25, other dividing methods, for example, a method in which the macro-block is equally partitioned into two horizontal areas can be easily achieved by changing the signal selecting procedure of the switch circuit 2550. In this connection, the operation above is independent of the search range and detection unit and is applicable to any variations of the detecting method described in relation to the conventional examples of the motion vector detecting circuit.

Figure 26A:
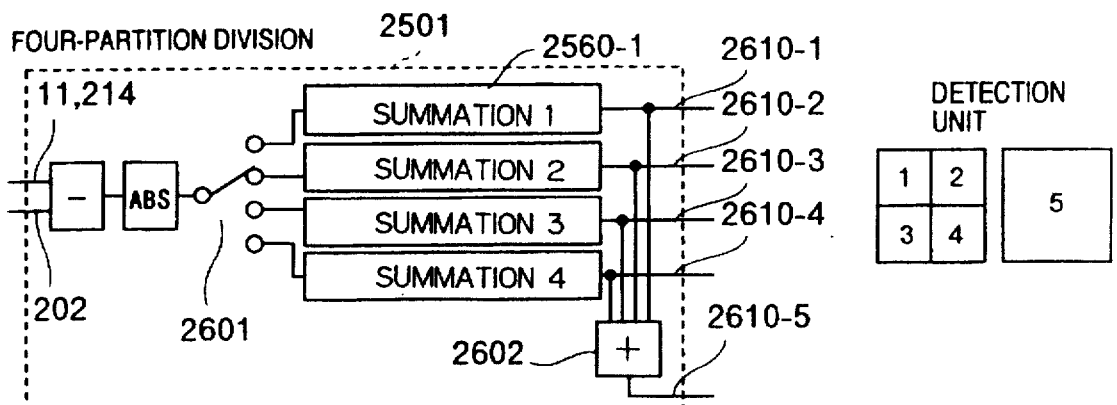
FIGS. 26A to 26C are diagrams showing alternative configurations of the motion vector detector of FIG. 25.
Figure 26B:
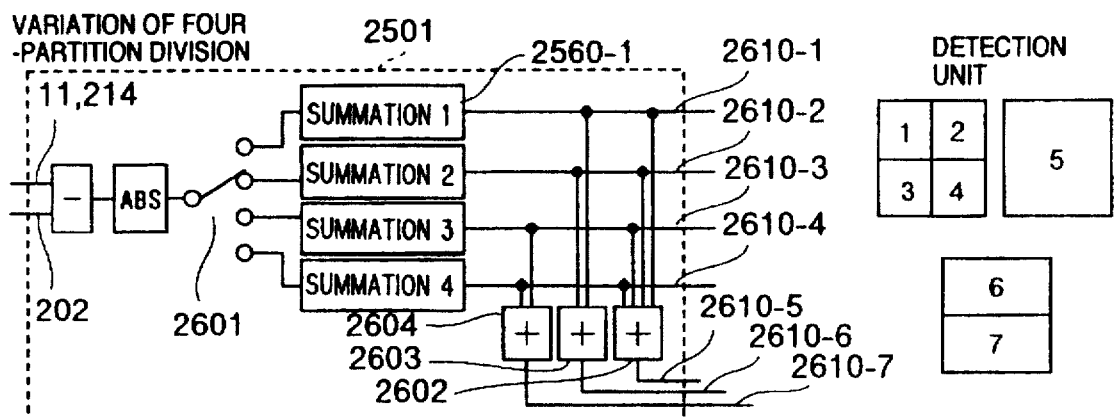
Figure 26C:
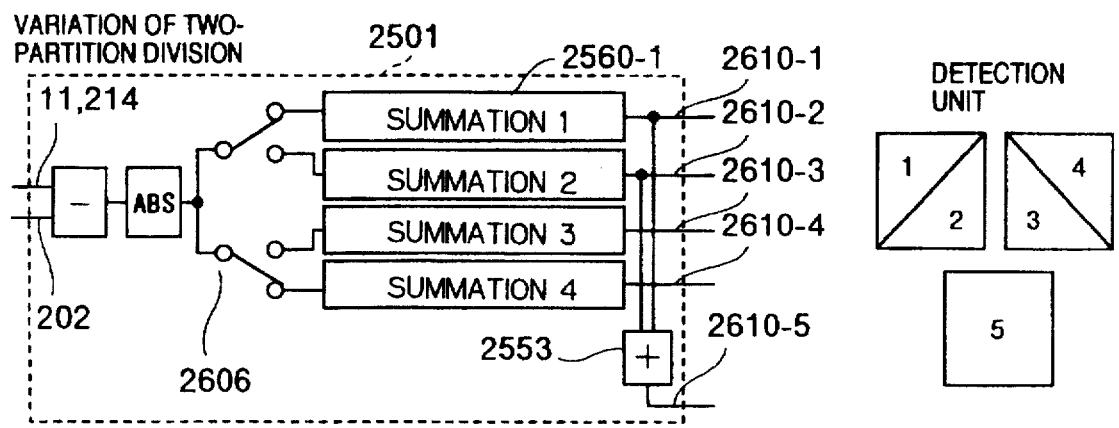

Furthermore, the number of partitions of one macro-block can be increased when the numbers respectively of signal processing channels and minimum value selector circuits are increased in the adder 2551 and register 2552 and there are employed the switch 2550 and adder 2553 associated therewith. For example, as shown in FIG. 26A, assume that the switch 2601 conducts a switching operation such that the error signal is distributed to four channels to feed the upper-left 8×8 pixels to a cumulative adder 2560-1, the upper-right 8×8 pixels to a cumulative adder 2560-2, the lower-left 8×8 pixels to a cumulative adder 2560-3, and the lower-right 8×8 pixels to a cumulative adder 2560-4. As shown in the right-hand portion of the diagram, there can be detected by one circuit a total of five vectors including four vectors in the block unit of 8×8 pixels of the macro-block and one vector of 16×16 pixels. In addition, as can be seen from FIG. 26B, when there are arranged, for example, an adder 2603 for adding the cumulative results 2610-1 and 2610-2 to each other and an adder 2604 for adding the accumulated results 2610-3 and 2610-4 to each other so as to obtain the respective results 2610-6 and 2610-7, it is possible to attain motion vectors for the upper-half and lower-half portions of the macro-block in addition to those obtained in the example of FIG. 26A. FIG. 26C shows an example in which switches 2605 and 2606 are adopted to divide error signals. Changing the method of switching operations of the switches 2605 and 2606, the vector detection can be achieved, for example, in the detection units obtained according to two different dividing methods as indicated in the left-hand portion of FIG. 26C. In this configuration, when the sum of minimum values respectively of the accumulation signals 2610-1 and 2610-2 is compared with that of minimum values respectively of the accumulation signals 2610-3 and 2610-4, the optimal one of the partitioning methods can be appropriately select. According to these variations, motion vectors can be detected in a plurality of dividing methods only by slightly increasing the circuit size; moreover, the image predicted efficiency can be increased. In FIGS. 26A to 26C, the number of outputs from the switch 2601 may be set to Ns equal to 3 or equal to or more than 5 to dispose Ns cumulative adder circuits 2560 so as to achieve the vector detection in the unit of Ns areas. The encoding methods and apparatuses of this type are similarly in the scope of the present invention. Also included in the scope of the present invention are encoding methods and apparatuses in which at least one switch is arranged in addition to the switches 2605 and 2606 such that the total of Ms switches are operated in mutually different switching manners to detect motion vectors according to the Ms partitioning procedures. Moreover, an optimal partitioning method can be determined according to the configuration. In addition, When these methods and/or apparatuses may be combined with each other, there can be provided a method of partitioning the screen into Ns areas as well as a method and an apparatus for detecting motion vectors for Ms partitioning methods and for deciding the optimal one of the partitioning methods. The encoding methods and apparatuses of this kind are also within the scope of the present invention. Incidentally, in relation to the Ms dividing methods, the number of resultant partitions need not be necessarily equal to each other.

Figure 27:
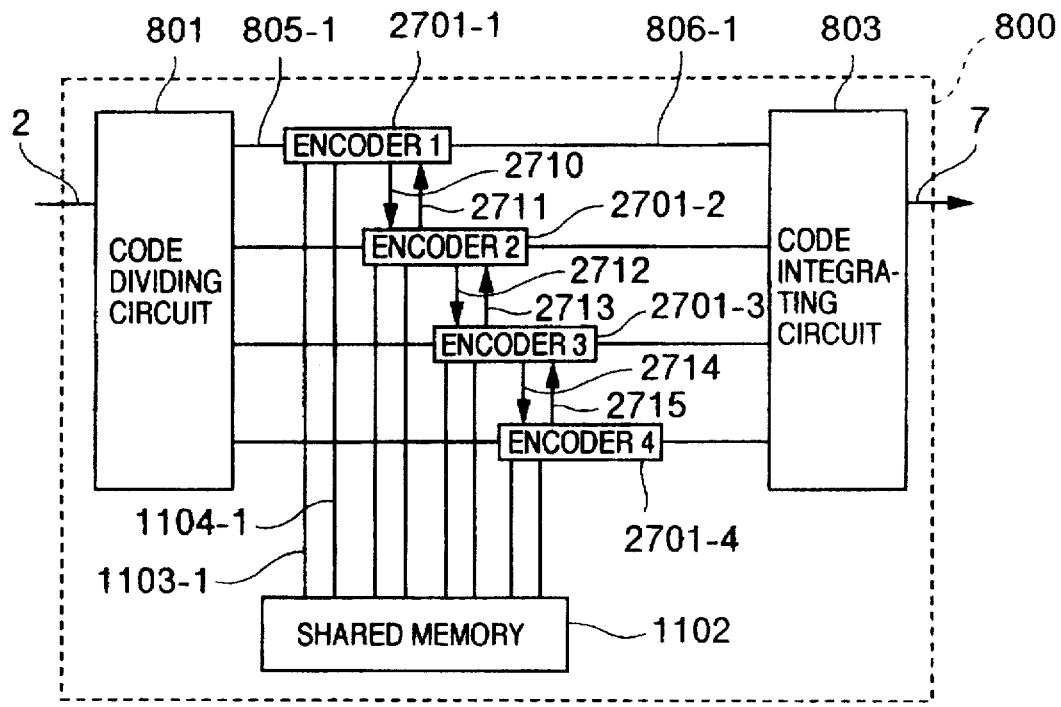
FIG. 27 is a diagram showing an alternative structure of the image encoding apparatus of FIG. 11.

FIG. 27 shows a variation of the encoding circuit 800 of FIG. 11. The modified example differs from the encoder 800 in that signal lines 2710 to 2715 are additionally disposed between the respective sub-encoder circuits 2701-1 to 2701-4 to notify information for controlling quantities of codes. According to control information of quantity of codes obtained via the pertinent signal line of each sub-encoder, there is achieved a control operation of the quantity of processed codes. This prevents the conventional disadvantage in which due to a large quantity of codes transiently generated in the system, only the picture encoded by one of the sub-encoders is considerably deteriorated. Conversely, it is possible to suppress the disadvantageous phenomenon in which due to a smaller number of codes generated in a passing phenomenon, the picture quality is conspicuously improved for an area as compared with that of peripheral areas thereof. For combinations of notifications between the sub-encoders, there can be considered a maximum of C*(C−1) signal lines, where C stands for the number of sub-encoders. However, since the difference in picture quality is conspicuous in a boundary area between two areas, the control information of quantity of codes need only be communicated between the sub-encoder circuits responsible for the boundary areas. In this case, the system requires a reduced number of signal lines and hence the circuit size is minimized. According to the example of horizontal partitions, the number of sub-encoders is represented as C and there are required only 2*(C−1) signal lines to achieve an advantageous effect substantially equal to that the system including C*(C−1) signal lines. In addition, the same advantageous feature is attainable when the control information of quantity of codes is communicated only between the sub-encoder circuits handling areas apart from each other by a predetermined distance or less on the screen.

Figure 28:
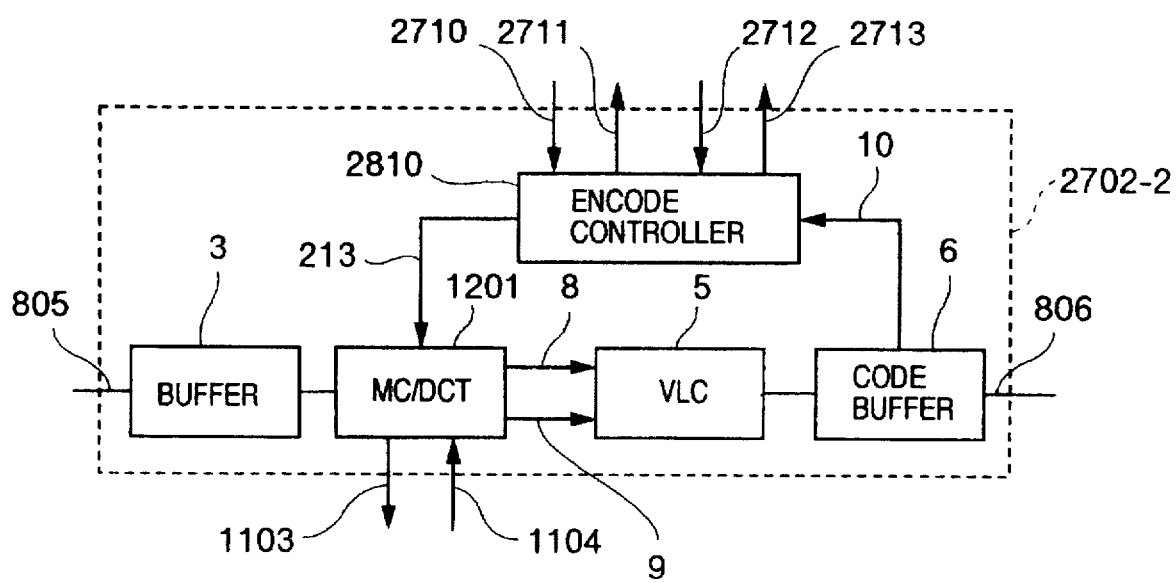
FIG. 28 is a diagram showing an alternative configuration of the sub-encoder apparatus of FIG. 27.

FIG. 28 shows details of the encoder circuit 2701-2 of FIG. 27. The encoder circuits 2701-1 to 2704 conduct almost the same operation. The quantity of codes of a screen currently being encoded is supplied via a signal line 10 to the encode controller 2801. In the controller 2801, the quantity of generated codes is compared with a predetermined value. If the former is larger, the controller 2801 achieves a control operation to minimize the quantity of codes. Otherwise, the control operation is carried out to increase the quantity of codes. That is, a value associated with discrepancy between the preset value and the quantity of generated codes is fed as code quantity control information via signal lines 2711 and 2713 to the adjacent sub-encoders. On the other hand, code quantity control information items respectively received from the adjacent sub-encoders are added to the quantity of codes 10 described above such that the control operation is conducted according to the result of addition.

Figure 29:
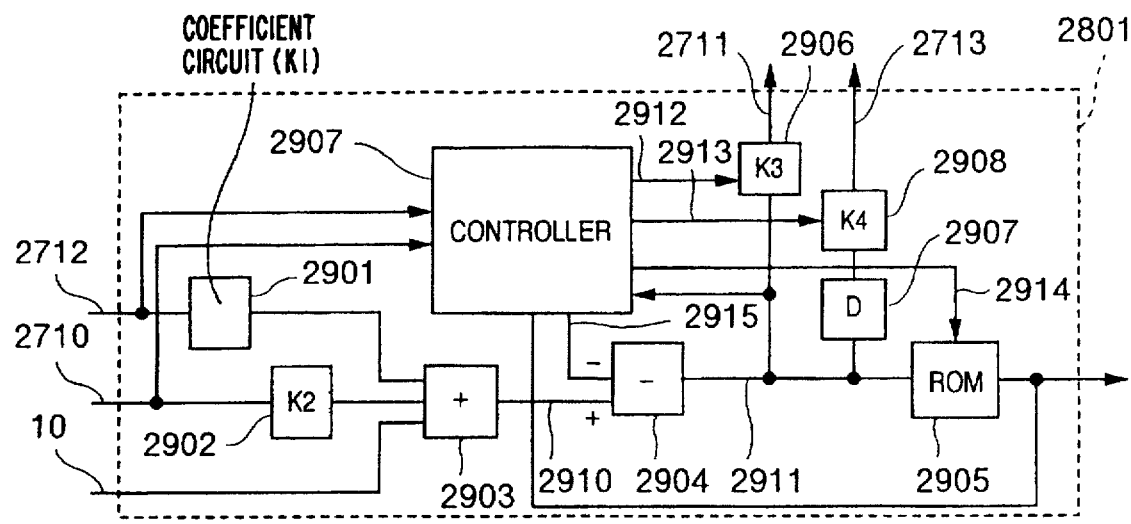
FIG. 29 is a block diagram showing structure of the code quantity controller of FIG. 28.

FIG. 29 shows in detail the encode control circuit 2801. The control information items of quantity of codes 2710 and 2712 notified from the adjacent sub-encoder circuits are multiplied by k2 and k1 in coefficient circuits 2902 and 2901, respectively. The resultant signals are added to the quantity of codes 10 of the current screen to obtained a resultant signal 2910. The signal 2910 is subtracted from a predetermined quantity of codes 2915 to determine a difference value 2911. When the absolute value of the discrepancy is equal to or more than a fixed value, a control operation is achieved by a controller 2907 to supervise coefficients k3 and k4 respectively of coefficient circuits 2906 and 2908 such that values obtained by respectively multiplying the difference value 2911 by k3 and k4 are delivered as code quantity control information items 2711 and 2713, respectively. On the other hand, the difference information 2911 is combined with control information 2914 calculated according to the current quantization step size, coefficients k3 and k4, and information of positions in the screen to acquire a quantization step size 213 in a predetermined calculation method. In the operation, it is desirable that each of the values of k1 to k4 is at least 0 and at most 1 and the value of k3+k4 is also at least 0 and at most 1. Moreover, the values of k3 and k4 are controlled as follows. In order to prevent control information of quantity of code from being reciprocally communicated or oscillated between two adjacent sub-encoder circuits, the following operations are conducted. When the signal 2701 takes a large positive value, the signal 2713 does not take a large value. Similarly, when the signal 2710 is a negative value having a large absolute value, the signal 2711 does not take a negative value having a large absolute value. When the signal 2712 is a negative value having a large absolute value, the signal 2713 does not take a negative value having a large absolute value. Specifically, the values of k1 to k4 are favorably selected, for example, as follows: k1=1, k2=1, and k3+k4=0.25.

The output signal 2713 is delayed by a delay circuit 2907 to absorb the difference in processing start time between the sub-encoder circuits 2702-2 and 2702-3, thereby achieving the control operation at substantially the same horizontal position on the screen. Conversely, when the signal 2711 is received, since the encoding operation at the pertinent horizontal position is already finished in the encoder 2701-1, the position of the control operation is shifted toward an upper-right direction.

Figure 30:
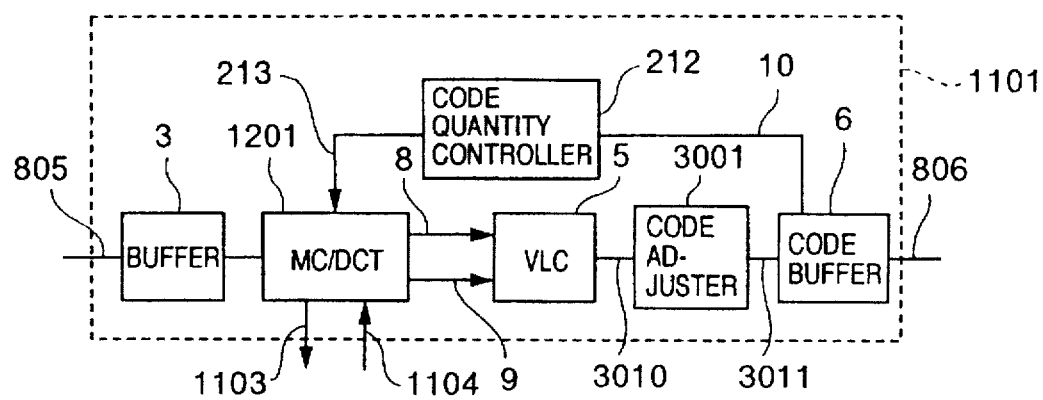
FIG. 30 is a diagram showing the configuration of the sub-encoder including a code quantity adjuster.
Figure 31:
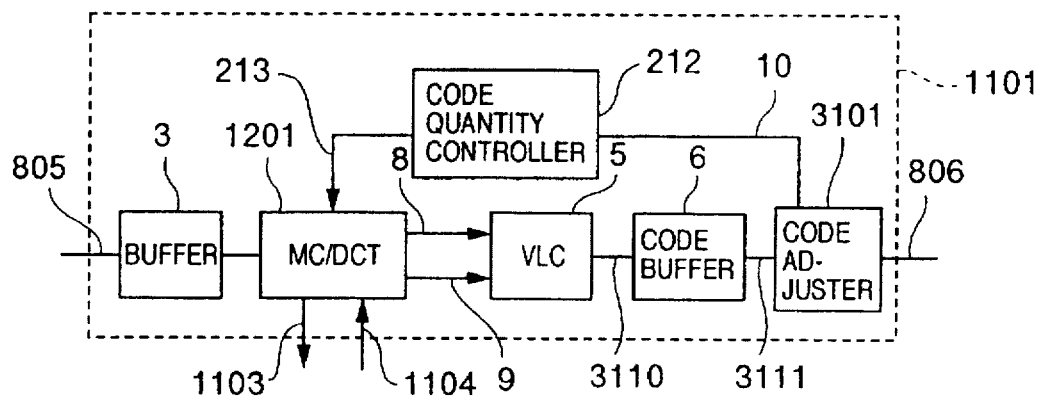
FIG. 31 is a diagram showing an alternative construction of the sub-encoder including a code quantity adjuster.

FIG. 30 shows a variation of the encoder circuit 1101. This circuit is different from that of FIG. 12 in that a code quantity control circuit 3001 is disposed therein. Moreover, FIG. 31 shows an alternative variation of the encoder 1101. The configuration of FIG. 31 varies from that of FIG. 30 in that a code quantity controller 3101 is arranged therein. Each of the code quantity controllers 2001 and 3101 respectively of FIGS. 30 and 31 has a function to receive a code 3010 from the variable-length encoder 5 to obtain a predetermined amount of codes. The quantity of codes is set from an device outside the encoding apparatus to, for example, the maximum number of codes in one frame or a number of codes between a frame to another frame. The amount of codes is adjusted primarily by the code quantity controller 212 and the like as described above. However, the operation is attended with difficulty and hence there occurs an adjusting error to a certain extent. The error is further regulated by the code adjusting circuits 3001 and 3101 for a higher precision of the quantity of codes.

Figure 32:
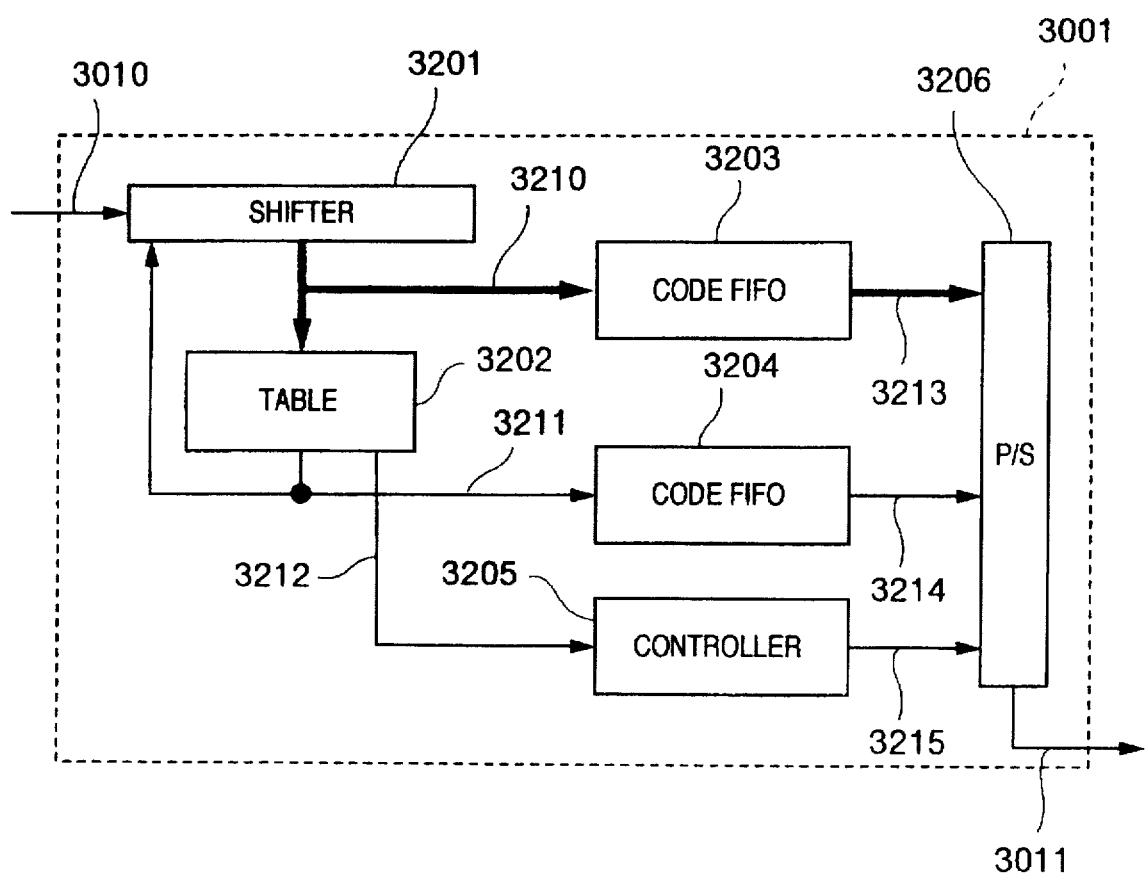
FIG. 32 is a diagram showing structure of the code quantity adjuster of FIG. 30.

FIG. 32 shows details of the code quantity regulator 3001. A code 3010 inputted thereto is sequentially fed to a shift circuit 3201. In this circuit, when a predetermined number of bits are received, the input signal is outputted as a parallel code data 3210. In a table 3202, a termination point is decided for the variable-length data of the parallel code 3210 so as to produce a signal 3211 indicating the number of bits and a signal 3212 denoting a termination code of the data. For the contents of table 3210, it is assumed that the variable-length code string takes on six kinds of data including 10, 11, 010, 011, 0010, and 0011, the termination code (z) is represented as 0001, the input value includes four bits, and the output values are set for the input values in advance as follows.

Setting example 1 of table 3202

| Symbol | Input value | Output value (no. of bits) | Output value (code termination) |
|---|---|---|---|
| A | 10xx | 2 | 0 |
| B | 11xx | 2 | 0 |
| C | 010x | 3 | 0 |
| D | 011x | 3 | 0 |
| E | 0010 | 4 | 0 |
| F | 0011 | 4 | 0 |
| z | 0001 | 3 | 1 |
|   | 0000 | 1 | 1 (unused) |

In this table, the input values are expressed in binary notation and the letter x designates that the value takes either one of 0 and 1. For example, input value 01x indicates that the pertinent value is 010 or 011. In addition, "1" in the position of the output value of termination flag means that the code is used as the termination code. In this example, the input code 3010 is set in the input value beginning at the upper-most (left-most) position. The bit count signal 3211 from the table 3202 is fed to the shift circuit 3201 such that the data is shifted by the number of bits indicated by the signal 3211. On this occasion, the code 3010 is inputted thereto if necessary. On the other hand, the parallel code signal 3210 and the bit count signal 3211 corresponding thereto are respectively supplied to FIFO storages 3203 and 3204 to be stored therein. All bits of the parallel code signal 3210, namely, four bits in this example are stored in the FIFO circuit 3203 regardless of the actual code length (indicated by the bit count signal 3211). On the other side, when the objective code is the demarcation code, the condition is notified via the signal line 3212 indicating the demarcation code to a control circuit 3205. In an ordinary case, the signals stored respectively in the FIFO circuits 3203 and 3204 are delivered respectively via signals lines 3213 and 3214 to a parallel-to-serial converting circuit 3206. In the converter 3206, a variable-length code string 3011 is reproduced from the received code signal 3213 and code-length signal 3214. In the operation, the controller 3205 supervises the parallel-to-serial converter 3206 according to the position of the demarcation signal to add or to delete codes so as to obtain the predetermined amount of codes. An example of code quantity adjustment will be next described.

When information "AEADzAABz" is generated, the input code 3010 includes 25 bits, i.e., "10 0010 10 011 0001 10 10 11 0001". The bits of the code string are transmitted beginning at the left-most bit. Although blank letters are inserted at demarcation points for convenience, the bits of the code string are successively inputted to the system. In operation, the codes are separated according to the table 3202 below such that data items are sequentially supplied to the code FIFO circuit 3203 and code-length FIFO circuit 3204, respectively.

|   | Code FIFO | Code length (Symbol) | Terminal flag |
|---|---|---|---|
| 1 | 1011 | 2 (A) | 0 |
| 2 | 0010 | 4 (E) | 0 |
| 3 | 1001 | 2 (A) | 0 |
| 4 | 0110 | 3 (D) | 0 |
| 5 | 0001 | 4 (z) | 1 |
| 6 | 1010 | 2 (A) | 0 |
| 7 | 1011 | 2 (A) | 0 |
| 8 | 1100 | 2 (B) | 0 |
| 9 | 0001 | 4 (z) | 1 |

To minimize the quantity of codes, a code immediately preceding the demarcation code is deleted. Namely, the fourth information D and eighth information B are deleted. As a result, there is produced a variable-length code string 3011 including 20 bits "10 0010 10 0001 10 10 0001". In general, when some codes are deleted as above, the signal reproduced therefrom is attended with deterioration. Furthermore, when the deteriorated image is adopted as a predicted image, the deterioration is propagated to subsequent screen images since the predicted image of the encoder is slightly different from that of the decoder due to the deterioration. In consequence, the visual image deterioration can be possibly minimized by deleting codes preferentially in the cases associated with the following items: (1) DCT coefficient of B picture, (2) DCT coefficient (i.e., +1 or −1) of small amplitude, and (3) high-frequency DCT coefficient.

The similar advantage can be obtained without deleting codes, namely, by replacing a code with a code having a reduced code length. This is achieved by, for example, reducing by one level the amplitude of the high-frequency DCT coefficient of direct-current components.

To increase the quantity of codes, it is only necessary for the parallel-to-serial converter 3206 to insert stuffing codes which are ignored in the decoding operation by the decoder. For example, there can be used in the MPEG a method in which a multiple of 8 of bit "0" are inserted in a position immediately before the start code indicating code synchronization. The similar effect is also obtained by replacing a code by a code having a longer code length and indicating the same information. For example, in the MPEG, although variable-length codes having a length in a range from two bits to 17 bits are assigned to some DCT coefficients, there are also assigned fixed-length codes having a length of 20 or 28 bits. In consequence, the amount of codes can be increased by replacing a DCT coefficient to be ordinarily encoded as a variable-length code including at most 17 bits with a fixed-length code of 20 or 28 bits. The code increasing operation is not directly related to deterioration of the picture quality.

Fine adjustment of the predetermined quantity of codes can be carried out by appropriately combining the code quantity regulating operations with each other. The operations of the code adjusters 3001 and 3101 may be executed during the encoding operation in the variable-length encoding circuit 5. Moreover, each of the code FIFO circuit 3203 and code-length FIFO circuit 3204 may be implemented by a shift register, a buffer circuit, or a ring buffer.

The configuration of the code adjuster 3101 of FIG. 31 is substantially the same as that of the code adjusting circuit 3001 of FIG. 30. In FIG. 31, the function of the code buffer 6 of FIG. 30 to notify the quantity of generated codes 10 is added to the circuit 3101. Since the quantity of codes is adjusted after output operation of the code buffer, the code quantity adjustment can be accomplished after one screen image is completely encoded and the encoded codes are entirely stored in the buffer 6, namely, after the quantity of generated codes becomes known. In consequence, the quantity of codes can be regulated with a high precision in a relatively large unit such as the unit of one screen.

Thanks to the highly accurate adjustment of the quantity of codes, it is possible to substitute a portion of a code string for other codes. Namely, in a television digital signal broadcast, a commercial, a special newscast, and the like can be inserted in images of a running program. In such a signal replacement, when the quantity of codes varies between the original image portion and the replacing image portion, an overflow or underflow occurs in a buffer temporarily storing the codes in the decoder. This leads to a considerable deterioration in the picture quality. According to the high-precision code amount adjustment of the present invention, the deterioration of picture quality can be prevented or possibility thereof can be minimized to a satisfiable extent.

The data amount of the table 3202 described above can be reduced according to the following variation thereof. That is, in the input operation, the parallel code signal 3201 is separated into a portion including the leading "0's" and a portion including the first "1" and subsequent bits. In the example above, the number of leading "0's" is at most three and the length of codes following the first "1" is at most one bit. Consequently, the number of data types can be reduced to eight (represented by three bits) which is half that of the preceding example (four bits for 16 kinds of table data items). In this case, however, a circuit to count the number of leading "0's" is required to be disposed in the shift circuit. In the variation, the contents of the table 3202 are set as follows. In the input value, two left-most bits indicate the number of successive 0's in binary notation and one right-most bit denotes the number of codes subsequent to the first "1".

Setting example 2 of table 3202

| Symbol | Input value | Output value (no. of bits) | Output value (termination flag) |
| --- | --- | --- | --- |
| A | 10 0 (10xx) | 2 | 0 |
| B | 00 1 (11xx) | 2 | 0 |
| C | 01 0 (010x) | 3 | 0 |
| D | 01 0 (011x) | 3 | 0 |
| E | 10 0 (0010) | 4 | 0 |
| F | 10 1 (0011) | 4 | 0 |
| z | 11 X 0001) | 3 | 1 |
| (— — 0000) | 1 | 1 (unused) | |

In the table setting example, to decode a code string "0000", it is necessary to additionally provide one bit representing the number of successive "0's". However, in the MPEG and the like, a code string including only "0's" is ordinarily inhibited because of a fear that the string is mistaken for the synchronizing signal. Consequently, the operation above does not cause any problem in the MPEG. In this example, when the number of leading "0's" is increased in the code string, there is enhanced the advantageous effect of minimizing the data in the table. For example, since the variable-length code of the DCT coefficient in the MPEG is at most 16 bits excepting the last code bit, the number of necessary table data items is $2^{16}=65536$. However, the number of leading "0's" is at most 11 (represented by four bits) and the length of code subsequent to the first "1" is at most five bits. Consequently, a total of nine bits are required and hence $2^9=512$ data items need only be stored in the table. Namely, the table size can be reduced to $1/128$ of the size of the original table. When the system is produced in a large scale integration (LSI) circuit, the chip size can be minimized and hence the production cost thereof is reduced and the table access speed is increased. As a result, using a circuit size substantially equal to that of the conventional apparatus, a higher-speed processing can be accomplished. Moreover, keeping the processing speed at a level similar to that of the conventional apparatus, there can be configured the smaller-sized circuit at a lower cost.

The configurations respectively of the shift circuit 3201 and table 3203 of FIG. 32 are also applicable to the variable-length encoder circuit of the signal encoding apparatus. In this case, the table 3203 may be configured as shown in either one of the preceding examples. When the setting example 2 is employed, there is obtained an advantageous effect similar to that described in conjunction with the code quantity adjusting circuit. The variable-length encoder circuit according to the present invention may be applied to an encoding apparatus including a plurality of sub-encoder circuits as well as an encoder apparatus including a single encoder circuit.

Figure 6:
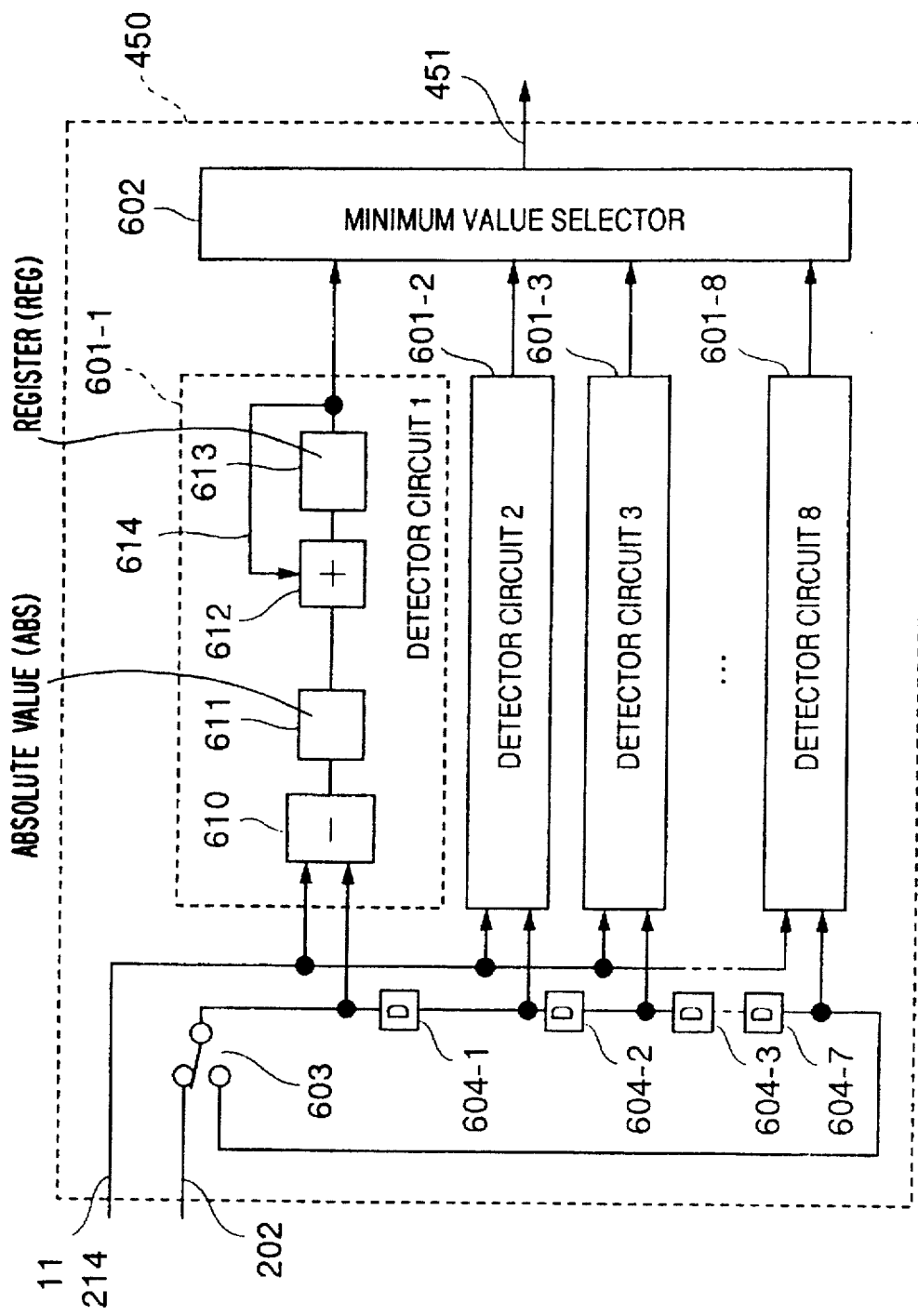
FIG. 6 is a block circuit diagram showing constitution of the conventional vector detector.
Figure 7:
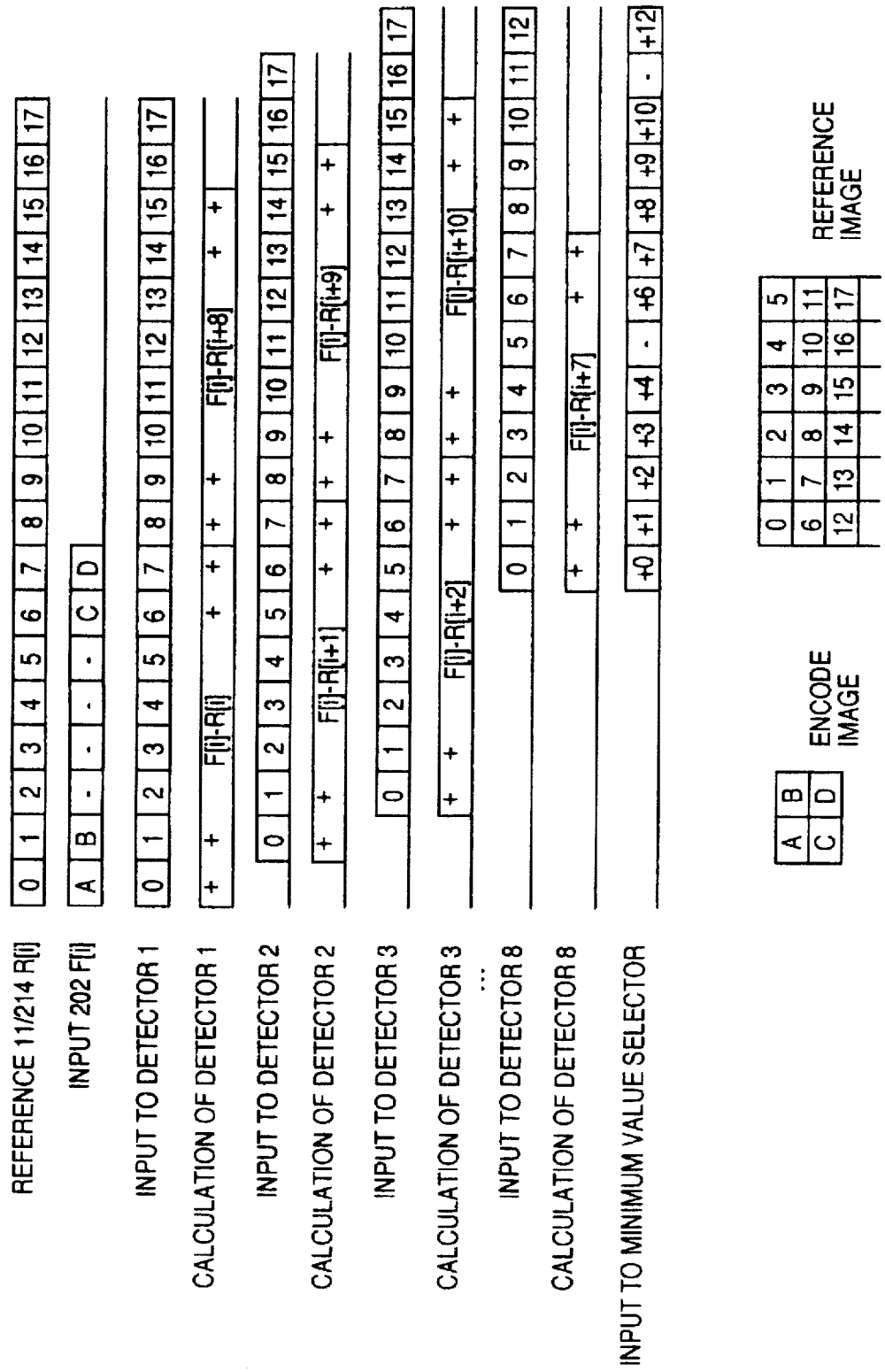
FIG. 7 is an operation timing chart of the vector detector of FIG. 6.
Figure 33:
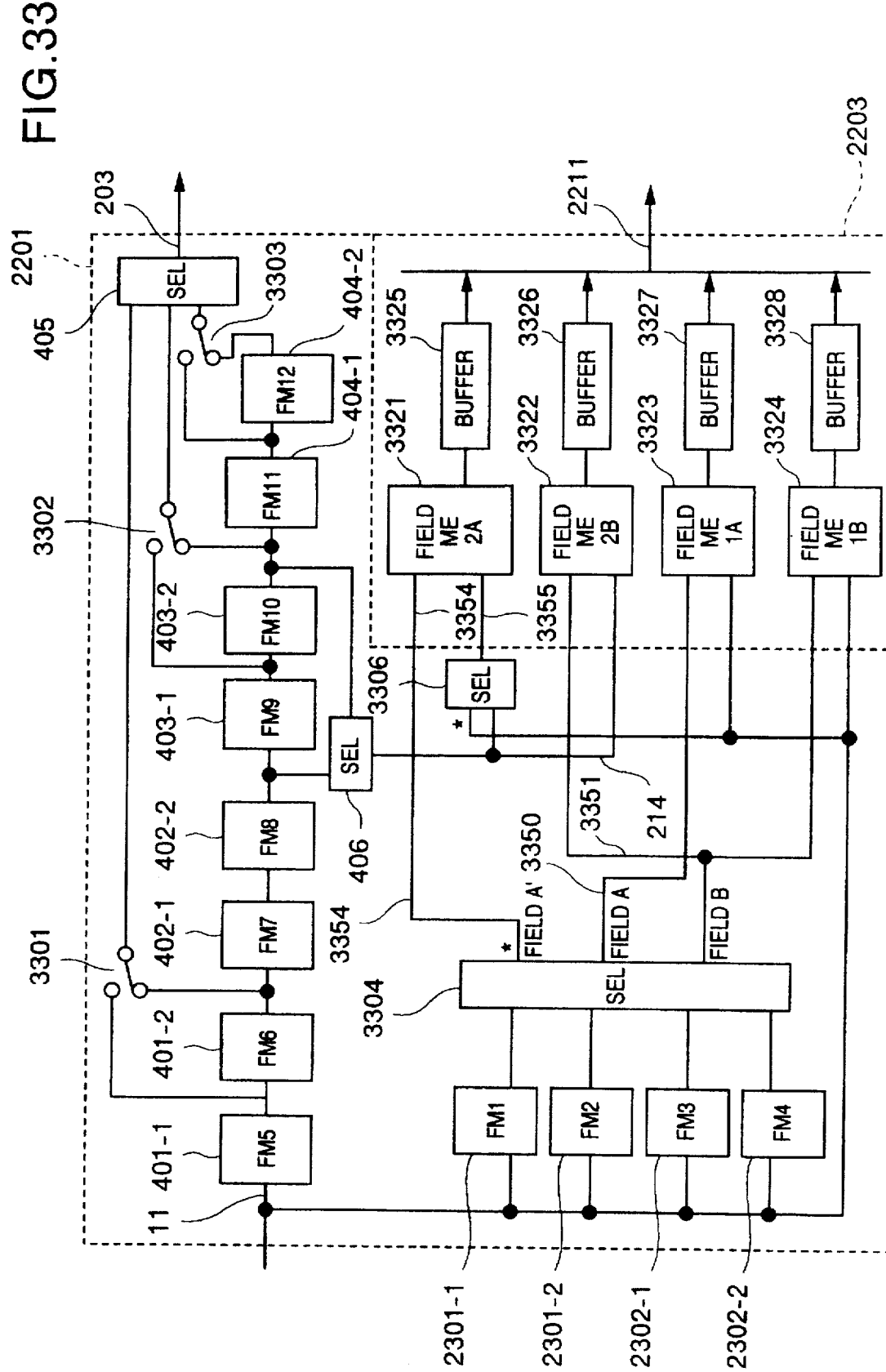
FIG. 33 is a block diagram showing an alternative constitution of the frame memory and motion detector respectively of FIGS. 23 and 24.

FIG. 33 shows a variation of the frame memory circuit 2201 of FIG. 23 and the motion detecting circuit 2203 of FIG. 24. According to an aspect of this example, the frame memory circuit 2201 of FIG. 23 and the motion detecting circuit 2203 of FIG. 24 are modified to store therein images in the field unit. In contrast with the system of FIG. 23 which copes with only the frame-unit encoding operation, the circuit configuration of FIG. 33 achieves the field-unit encoding operation in addition thereto. Specifically, the predicted process can be accomplished between two fields constituting one frame. As a result, when encoding images representing a large motion, there is attained an encoding efficiency similar to that developed in the encoding of ordinary images. In case where the motion detector 2203 is combined with a motion compensating circuit 2202 of FIG. 35, which will be described later, motion vectors can be detected in the field or frame unit by the conventional motion vector detecting circuit as shown in FIG. 6. Namely, it is possible to dispense with the configuration of, for example, the motion vector detecting circuit of FIG. 25 including both of the circuit for detecting the vector in the field unit and the circuit for detecting the vector in the frame unit. Furthermore, since the motion detecting process is carried out for each field, the detection of motion is achieved in the unit of 16×8 pixels. Namely, the number of pixels per unit is half that of the motion detection in the frame unit. Consequently, the number of detecting circuits in the motion vector detector 450 can be reduced to half that of those used in the original system, namely, to N/2 and hence the circuit size of the detector 450 is minimized to about half that of the original configuration.

Figure 34:
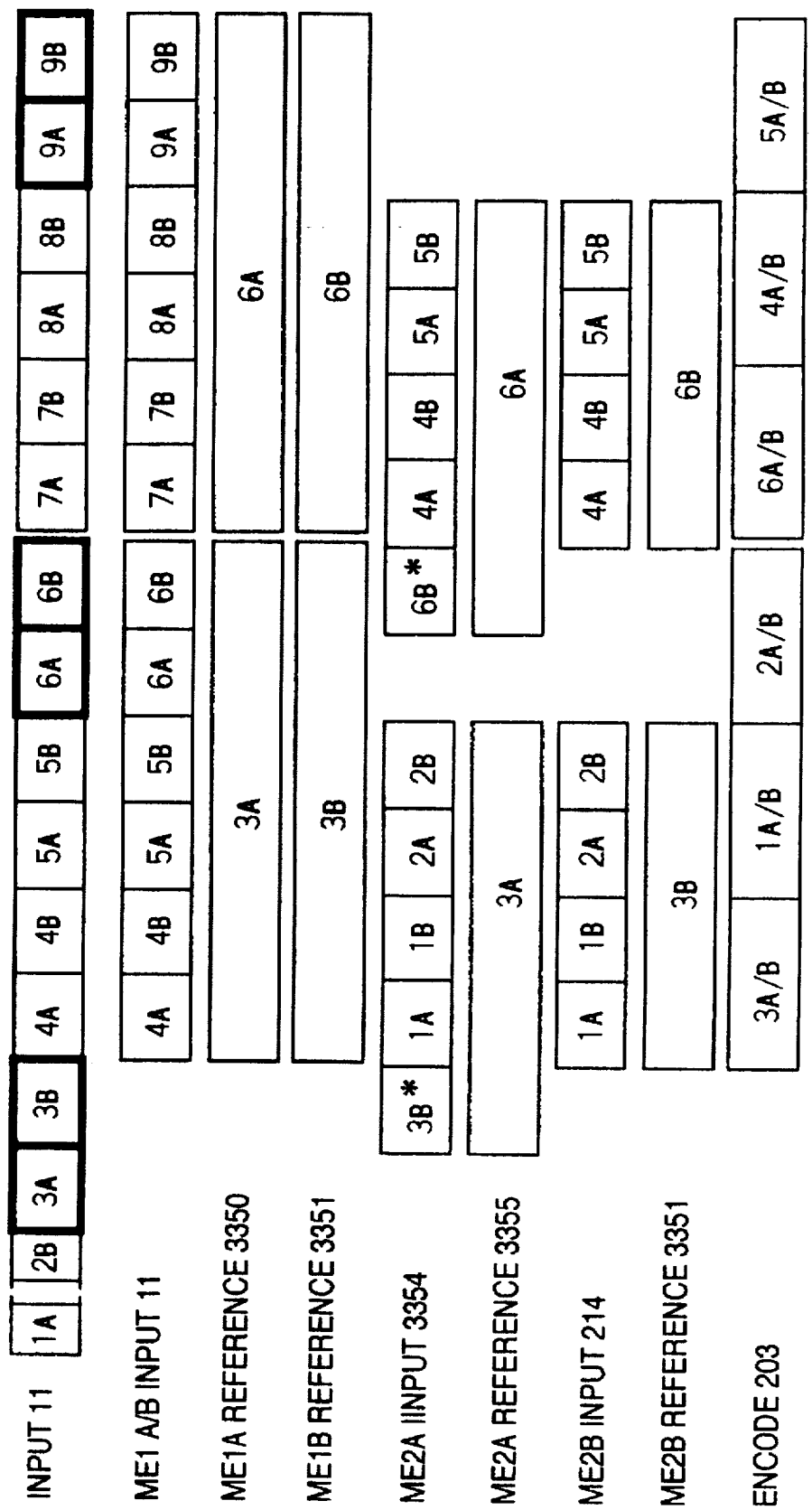
FIG. 34 is an operation timing chart for the frame memory and motion detector of FIG. 33.

The variation of FIG. 33 operates almost in the same fashion as that of FIG. 23. In FIG. 33, each of the memories 401 to 404 and reference image memories 2301 and 2302 of FIG. 23 is subdivided into two partitions such that a field image having half portion of the original data volume is stored in each partition. The image to be encoded is selected by the selecting circuit 405 in the same manner as for the system of FIG. 23. One of the fields of frame is chosen by either one of the switches 3301, 3302, and 3303. When encoding images in the frame unit, a change-over operation is conducted by these switches for each line. When encoding images in the field unit, the respective switches are set to the lower side (output sides of memories 401-2, 403-2, and 404-2). On the other side, the reference image is stored in the memories 2301 and 2302 to control a selecting circuit 3304 at timing shown in FIG. 34 by way of illustration. A reference image of one of the fields of frame which is advanced in time, namely, field A is delivered via signal lines 3350 and 3354. A reference image of the subsequent one of the fields, i.e., field B is sent via a signal line 3351. These reference images are changed over at points of timing shown in FIG. 34. Namely, the change-over takes place when the I or P picture (image related to input signals enclosed by bold lines in FIG. 34) is completely inputted to the system. However, for the signal line 3350, the change-over is achieved when a delay period equivalent to one field elapses after the input operation is terminated. Motion vectors are detected by the motion detecting circuit 2203 according to the reference signals. In this configuration, a motion vector detector 3321 detects a backward predicted vector primarily according to the reference image of field A, a motion vector detector 3322 detects a backward predicted vector mainly according to the reference image of field B, a motion vector detector 3323 detects a forward predicted vector primarily according to the reference image of field A, and a motion vector detector 3324 detects a forward predicted vector primarily according to the reference image of field B. In this connection, the signal to the detector 3321 is temporarily changed by a selector 3306 in the frame memory 2201 so as to achieve predicted between fields of P picture, namely, to detect a forward predicted vector according to fields 6A and 6B respectively as the reference and input images (indicated by an asterisk in FIG. 34). Detected vectors are respectively stored in buffers 3325 to 3328 to be thereafter read therefrom as a provisional motion vector 2211 by a subsequent motion compensating circuit.

Figure 35:
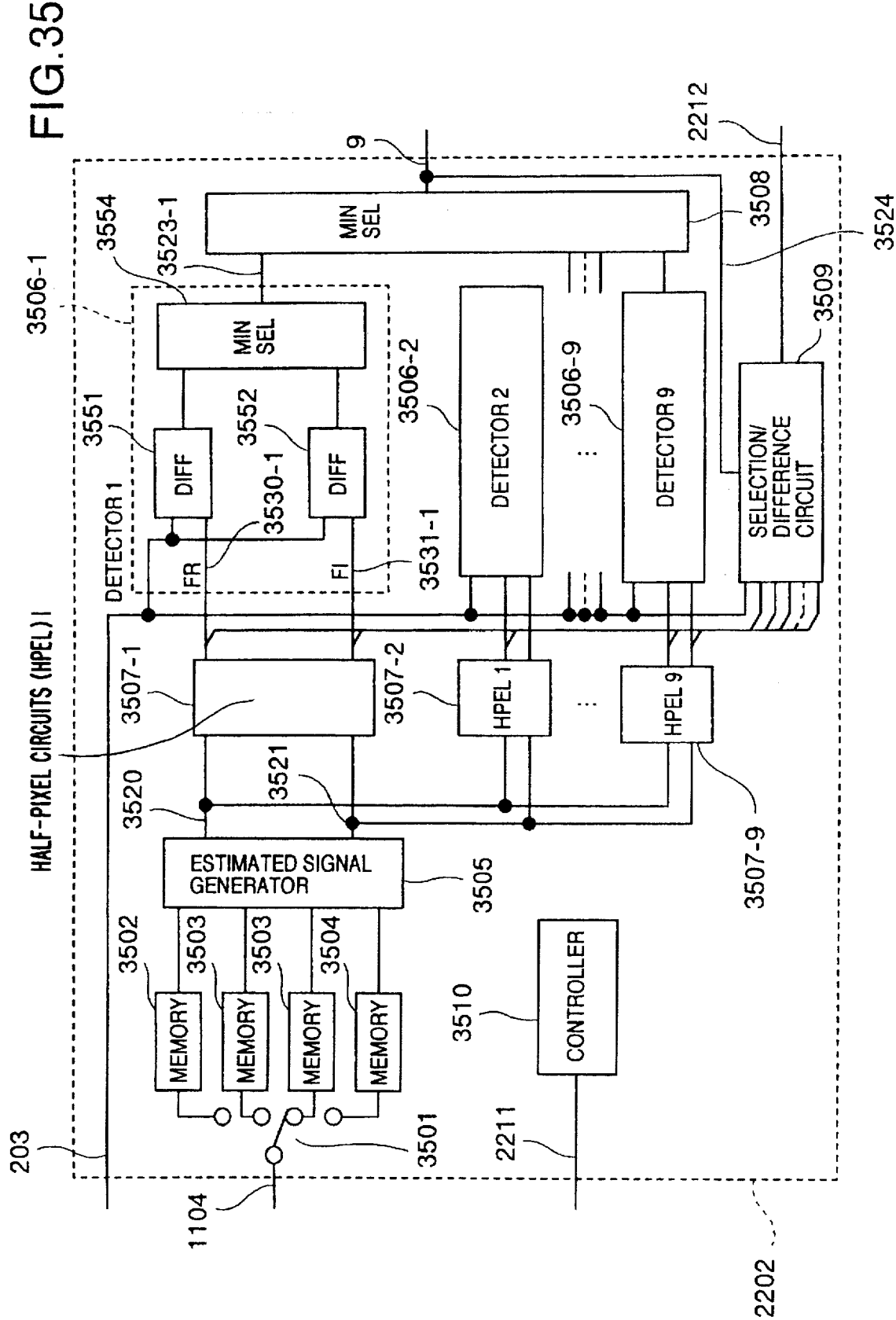
FIG. 35 is a diagram showing structure of the motion compensating circuit of FIG. 22.

FIG. 35 shows details of the motion compensating circuit 2202 of FIG. 22. In this circuit, using the provisional motion vector 2211 detected by the motion detector 2203, an optimal predicted method (frame or field predicted method) and optimal vector 9 are determined and a difference image signal 2212 is outputted therefrom. At the same time, there is detected a motion vector with a half-pixel precision. Description will next be given of an example of decision of the optimal predicted method by referring to FIGS. 36A to 36C.

FIG. 36A shows a method of selecting the predicted method when the encoding operation is conducted in the field unit. In the diagram, a small circle represents a scan line (a string of pixels in the horizontal direction). The vertical and horizontal directions of the diagram respectively correspond to the direction perpendicular to the screen and the time axis. This diagram shows only four lines contained in one macro-block of the field. Since the data is configured in the interlaced structure, the first field is shifted relative to the second field by a half line in the perpendicular direction. In the images of four fields shown in FIG. 36A, two left-most fields are related to reference images (A and B) and two right-most fields are associated with images (codes A and B) to be encoded. Although the two fields on the right side and those on the left sides are respectively successive in time, the reference field is not necessarily successive to the encode field. In this diagram, however, the field between the reference field and the encode field is omitted. An arrow in the diagram denotes a vertical component of the motion vector obtained by the motion detecting circuit of FIG. 33. Although the arrow is to be actually drawn between all corresponding scan lines (specifically, 2 to 3 arrows for each code scan line, i.e., 16 to 24 arrows in total), only the representative arrows are selectively drawn at appropriate positions for easy understanding thereof. In consequence, for example, although a predicted vector designated as fA0 in FIG. 36A is drawn from the first scan line of the field specified as reference A to the first scan line of the field denoted as code A, an arrow having the same direction and length is actually drawn also respectively between the second to fourth lines. These three arrows are omitted in the diagram, In a three-letter symbol specified for each arrow, the first letter indicates a forward predicted vector (f) or backward predicted vector (b), the second letter represents the first reference field (A) or second reference field (B), and the third numeric character stands for a type of predicted, i.e., reference->code A: 0, reference>code B: 1, or code A->code B: 2. In short, four combinations expressed by two leading letters correspond to the motion vector buffers 3325 to 3328 and the last numeral designates the buffer storage sequence. In the field-unit encoding operation, when encoding the field of code A, predicted is conducted for the reference A field according to vector fA0 and for the reference B field according to vector fB0 to select one of the predicted results having a smaller predicted error. Similarly, when encoding the field of code B, predicted is achieved for the reference A field (the code A field is used as a new reference field when the encoding operation is finished for the code A field in the field-unit encoding) according to vector fA2 and for the reference B field according to vector fB1 to select one of the predicted results which has a smaller predicted error. The processing above also applies to the B picture in the field-unit encoding. However, in the forward predicted of B picture, it is impossible to conduct predicted of "code A->code B", vector fA1 is employed in place of vector fA2. For the backward predicted, the similar processing can be achieved only be replacing letter f by letter b for the vectors used in the forward predicted. These field-unit encoding operations are accomplished on the basis of predicted in the unit of 16×8 pixels. Namely, the macro-block of 16×16 pixels is subdivided into two horizontal areas and hence two motion vectors are necessary for each macro-block. When these vectors take the same value, the predicted can be replaced with the predicted in the unit of 16×16 pixels. In the following description of the diagrams, a predicted image created from the reference A field according to vector fA0 is designated as R(A, fA0) herebelow.

When encoding signals in the frame unit, there are primarily conducted the frame-unit predicted and the predicted for two fields prepared by dividing the frame. In ordinary images, there is included a large still portion and the horizontal motion appears more frequently than the vertical motion. In the diagrams, there frequently occur horizontal vectors as "reference A->code A" and "reference B->code B". These vectors are included in the frame-unit predicted. On the other hand, for the other motions, the predicted is primarily conducted on the basis of a field nearby in time, namely, predicted from reference B takes precedence. The predicted is included in the field-unit predicted. Consequently, most motions can be covered by the predicted in the frame unit and predicted from reference B. Vectors fA0 or FB1 are used for the forward predicted (of P and B pictures) in frame unit. In quite a favorable case, these vectors are equal to each other. However, there actually exists discrepancy therebetween in most cases. In consequence, there are produced frame predicted signals for vectors fA0 and fB1 to select one of these signals having a smaller predicted error. After the signal is selected, a check is made for a predicted error for a field predicted signal obtained from reference B to resultantly chose the most suitable signal from three predicted signals. The backward predicted in the frame unit can be similarly described by replacing letter f with letter b for the vectors used in the forward predicted. However, in the field-unit predicted, the predicted signals are created for the reference A field according to vectors bA0 and bA1.

Returning to FIG. 35, when receiving the vector 2211 (fA0 or the like), the control circuit 3510 stores the reference image signals shown in the central fields of the tables of FIGS. 36A to 36C in the memories 3502 to 3504 according to the received signal 2211. In this operation, there are stored a portion of 16×8 pixels indicated by the motion vector and additional pixels (one pixel on each of the right and left sides of each line and two pixels on each of the upper-most and lower-most sides for each column), namely, a total of 18×12 pixels. In the diagrams, there are contained items linked by "or" with each other. In this case, the system selects one of these items having a smaller error in the vector detection. In FIG. 36B, error signals obtained at vector detecting operations are beforehand stored in the buffer 3327 and the like together with the associated vector values. When the error of vector fA0 is less than that of vector fB1, R(B,fA0) is stored in the memory 3502. When the error of vector fB1 is less than that of vector fA0, vector R(A,fB1) is stored therein. There-after, the memories 3502 to 3504 are accessed to read therefrom signals necessary for predicted. The signals are then processed by the predicted signal circuit 3505 to resultantly generate two kinds of predicted signals 3520 and 3521. The signal 3520 is a frame predicted signal (first or second predicted signal in the predicted signal frame of FIGS. 36A to 36C), whereas the signal 3521 is a field predicted signal (third predicted signal in the predicted signal frame of FIGS. 36A to 36C). The predicted signals 3520 and 3521 are fed to half-pixel circuits 3507-1 to 3507-9 to generate half-pixel predicted signals 3530-1 to 3530-9 and 3531-1 to 3531-9 represented in the unit of ±0.5 of one pixel. These signals are respectively fed to detectors 3506-1 to 3506-9 such that there is obtained a difference signal between the inputted signals and the encode image signal 203 for each pixel so as to calculate an error power represented by each of the signals 3551 and 3552 for the 16×8 pixels. A minimum value selector circuit 3554 chooses the smaller one of these error power signals 3551 and 3552 and sends selection information and the error power signal to a signal line 3523-1. A minimum value selector circuit 3508 then conducts comparison between the error power signals 3523-1 to 3523-9 from the respective detectors 3506-1 to 3506-9 to select the smallest one of the error power signals. Results of selection including the predicted mode and half-pixel motion vector is delivered to a signal line 9. On the other hand, the half-pixel predicted signals 3530-1 to 3530-9 and 3531-1 to 3531-9 and the encode image signal 203 are stored in a selection/difference circuit 3509. From the circuit 3509, one of the predicted signals for which the error takes the smallest value is selected and is then outputted as a difference video signal 2212 for each pixel.

In operation of the predicted signal generator 3505, a set of predicted signals shown on the right-most part of FIGS. 36B and 36C (a set of signals separated by a vertical line therebetween) is sequentially read from the memories 3502 to 3504 to output the signals for each line (including 18 pixels). In this connection, the first and second sets of predicted signals above represent frame predicted signals and the third set thereof stands for a field predicted signal. As already described, only one of the first and second sets of predicted signals is utilized according to the magnitude of the error obtained at the motion vector detection.

Figure 37:
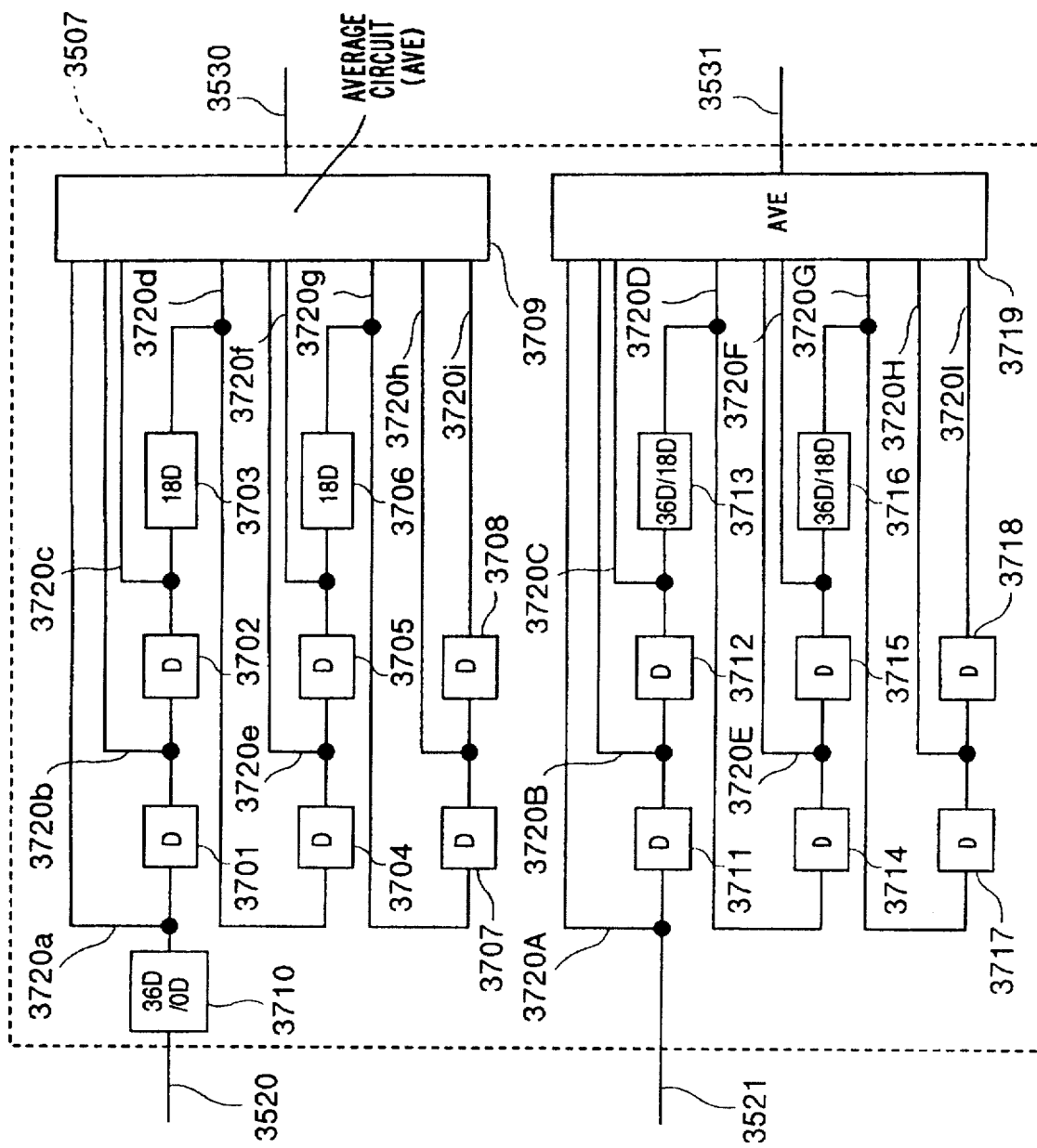
FIG. 37 is a diagram showing structure of the half-pixel circuit of FIG. 35.

FIG. 37 shows details of the half-pixel circuit 3507. The frame predicted signal 3520 supplied thereto is delayed by a predetermined period of time by delay circuits 3710 and 3701 to 3708 to be fed to an average circuit 3709. In the circuit 3709, a portion of the delayed signal is processed to obtain a mean value thereof so as to resultantly produce the half-pixel frame predicted signal 3530. When 75 pixels are completely inputted thereto, there is formed the following positional relationship between the blocks and signal lines 3720a to 3720i and 3720A to 3720I.

| Frame estimate signal | | | | | Field estimation signal | | | | |
|---|---|---|---|---|---|---|---|---|---|
| z | z | z | z...z | | I | H | G | x...x | |
| i | h | g | x...x | | x | x | x | x...x | |
| f | e | d | x...x | | F | E | D | x...x | |
| c | b | a | x...x | | x | x | x | x...x | |
| x | x | x | | | C | B | A | | |

In this list, letters a to i and A to I indicate that the signals lines 3720a to 3720i and 3720A to 3720I keep pixels at the pertinent positions. Letter x denotes that the pixel is kept in the delay circuit and letter z means that the pixel has already been discarded. When 75 pixels are entirely inputted to the system, the encode image signal 202 is supplied to the vector detector. That is, according to the preceding vector, the first pixel of the encode image signal 202 corresponds to that at the position indicated as e or E. When generating half-pixel signals, a predicted signal value corresponding to the first pixel of the encode image signal 202 takes a value as follows. When the half-pixel vector is (−0.5,−0.5), there are obtained (i+h+f+e+2)/4 and (I+H+F+E+2)/4 respectively in the frame predicted and field predicted. When the half-pixel vector is (0,+0.5), there are attained (i+h+f+e+2)/4 and (I+H+F+E+2)/4 respectively in the frame predicted and field predicted. When the half-pixel vector is (0,0), there are obtained e and E respectively in the frame predicted and field predicted. In the expressions above, a slant indicates a division in which the remainder is truncated to obtain an integer. Moreover, letters a to i and A to I indicate values of signal lines 3720a to 3720i and 3720A to 3720I, respectively. The operation to calculate the mean value in the mean value circuits 3709 and 3719 varies for each of the circuits 3507-1 to 3507-9. For example, the following calculations are accomplished in the mean value circuit 3709.

| Detector circuit | Corresponding vector | Calculation |
|---|---|---|
| 3507-1 | (−0.5, −0.5) | (i + h + f + e + 2)/4 |
| 3507-2 | (−0.5, 0 ) | (h + e + 1)/2 |
| 3507-3 | (−0.5, +0.5) | (g + h + d + e + 2)/4 |
| 3507-4 | ( 0, −0.5) | (f + e + 1)/2 |
| 3507-5 | ( 0, 0 ) | e |
| 3507-6 | ( 0.5, −0.5) | (e + d + 1)/2 |
| 3507-7 | (+0.5, −0.5) | (c + b + f + e + 2)/4 |
| 3507-8 | (+0.5, 0 ) | (e + b + 1)/2 |
| 3507-9 | (+0.5, +0.5) | (e + d + b + a + 2)/4 |

The field predicted signal is also delayed by a predetermined period of time by delay circuits 3711 to 3718. A portion of the delayed signals is processed by a mean value circuit 3719 to obtain a mean value thereof so as to produce a half-pixel frame predicted signal 3531. The procedure to calculate the mean value varies between the respective circuits 3507-1 to 3507-9. In this example, the delay circuits 3713 and provide a delay period of 36 pixels and the delay circuits 3703, 3706, and 3710 produces a delay period of 18 pixels. The other delay circuits are used for a delay period of one pixel. The description above applies to the frame-unit encoding. When conducting the predicted in the field-unit encoding operation, two field predicted signals are respectively fed to the input lines 3520 and 3521 to achieve a calculation similar to that used in the frame predicted. In the operation, the delay circuits 3710, 3713, and 3716 are externally set respectively to provide periods of delay equivalent to 0, 18, and 18 pixels so that the upper-half of the half-pixel circuit 3507 carries out the same operation as the and lower-half sections thereof.

Figure 38:
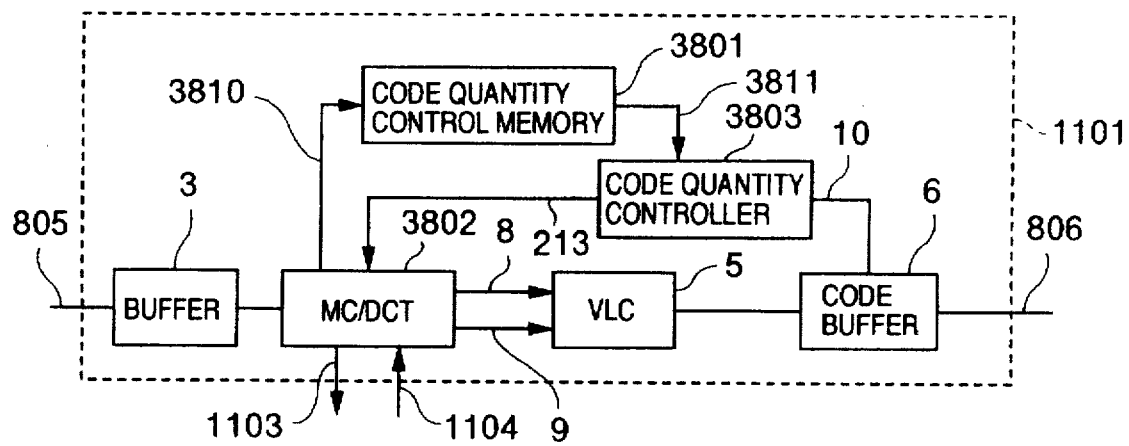
FIG. 38 is a diagram showing the configuration of the sub-encoder circuit including a code quantity controller.

FIG. 38 shows an alternative embodiment of the code quantity controller. This circuit is different from the conventional code quantity controller in that the error signal 3810 conventionally used in the motion vector detection is accumulated in a code quantity memory 3801 to be later employed in the controlling of the quantity of codes. As already described, the motion vector detection is accomplished prior to the encoding of codes. The quantity of codes can be controlled at a higher precision by predicting fluctuation of the amount of information generated in the screen according to the magnitude of error appearing in each portion during the motion vector detection. Moreover, it is possible to assign a larger number of codes to a position at which the amount of information is increased, which leads to an advantage of a uniform picture quality in the screen. Specifically, codes are allocated to each small area or sub-area in proportion to a total of difference related thereto. Assume that the i-th sub-area has an error value Er(i), an accumulated error value up to the i-th sub-area is denoted as SEr(i), and the quantity of codes assigned to one screen is B. The ratio of the sum of error values up to the pertinent portion to be encoded to the total SER(n) of error values of the overall screen, namely, SEr(i)/SEr(n) is notified via a signal line 3811 to a code quantity controller 3803. In the controller, the quantity of actually generated codes is compared with B*SEr(i)/SEr(n). When the quantity of generated codes is larger than B*SEr(i)/SEr(n), the picture quality is lowered for a coerce image. Otherwise, the picture quality is improved for a finer picture. The quantity of assigned codes is controlled according to the operation above. In the description of code allocation, there has been used a method of allocating codes to sub-areas of the screen by way of illustration. However, this is also applicable to a method of allocating codes to several screens (e.g., one P picture and B pictures successively preceding thereto). When the total of error values of the overall screen is equal to or more than a fixed value, there may be conducted a control operation to encode the pertinent screen as an I picture, which is also within the scope of the present invention. In the above description, the sum of absolute values of difference obtained for the respective pixels in the motion vector detection is adopted as the error value. However, there may also be employed an evaluation value representing another degree of similarity obtained in the motion vector detection, for example, the square sum of difference for each pixel or the total of absolute values of signals obtained by achieving an orthogonal transform such as the Hadamard transform or DCT for difference signals. These evaluation values are more similar to those of actually generated codes and hence the code quantity can be controlled with a higher precision. Moreover, the advantageous effect of the higher precision of control operation can be obtained also when there is employed the total of absolute values of difference for the respective pixels or a value obtained by converting either one of the evaluation values above, for example, the square or a logarithmic value thereof. In this connection, the operation above is applicable to an encoding apparatus in which a screen image is subdivided into partitions and an encoding apparatus including a single encoder circuit.

Figure 39:
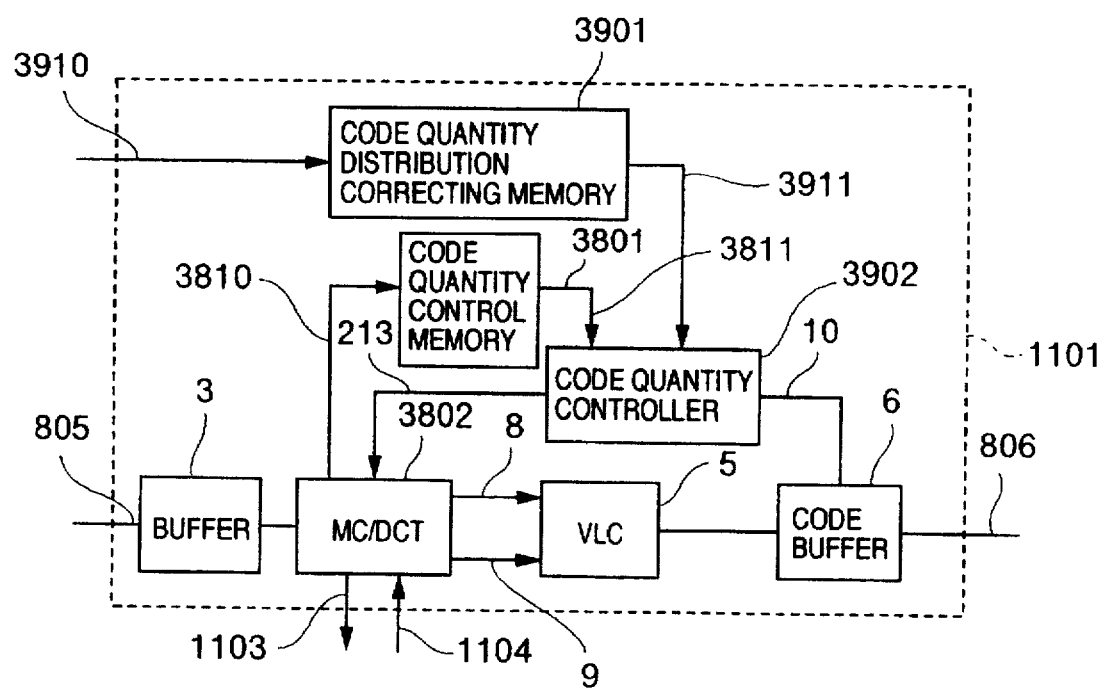
FIG. 39 is a diagram showing an alternative configuration of the sub-encoder circuit including a code quantity controller of FIG. 38.

FIG. 39 shows a variation of the code quantity controller of FIG. 38. This circuit is different from that of FIG. 38 in that the memory to control the code quantity includes two sides such that either one thereof can be externally set according to an image inputted thereto. In the embodiment of FIG. 38, the control operation is accomplished to uniform the picture quality in the screen. Actually, however, there exists a case in which the picture quality is visually favorable when a portion thereof has a higher picture quality or the user may desire to improve the picture quality in a portion of the screen image in some cases. On such an occasion, a weight coefficient 3910 related to distribution of codes is fed to a code distribution correcting memory 3901 such that a code quantity control circuit 3902 decides the quantization step size in consideration of the coefficient 3911 read from the memory 3901. When a screen area is partitioned into several sub-areas, weight coefficients of code distribution for the respective sub-areas are stored in the memory 3901. For example, when eight bits can be assigned to each sub-area in the memory and value W (0 to 255) is stored therein, the quantization value is temporarily multiplied by W/128.

The input value of the weight coefficient 3911 for code distribution may be set at initiation of the encoding operation or for each screen. The precision of correction for code distribution is improved when the coefficient 3911 is specified for each screen. However, this increases the quantity of information of the weight coefficient 3911 to be inputted to the system. For example, when an 8-bit coefficient is inputted for 16×16 pixels in the encoding of an image of 1920 pixels ×1024 lines ×30 Hz, the bit transfer rate is about 1.8 Mbps. To lower the transfer rate of the weight coefficient for code distribution, there is provided the following variation according to the present invention.

(1) The area associated with the weight coefficient of code distribution is enlarged. Alternatively, the number of bits assigned to the coefficient is decreased. For example, when a four-bit coefficient is used for a screen of 64×16 pixels, the transfer rate is lowered to ⅛ of the original rate. Although the sub-area may have an arbitrary contour, the macro-block size is favorably allocated in the sub-area block unit for an appropriate correction. When there is used a contour including L macro-blocks to be successively processed (i.e., (horizontal) 16×L pixels, (vertical) 16 pixels), the code distribution correcting memory 3901 need not be randomly accessed and hence the memory address circuit for the random access can be dispensed with. Moreover, when the operation is applied to an encoding apparatus in which the screen is subdivided into horizontal partitions, the excessive code distribution correcting memory is unnecessary.

(2) The weight coefficient is inputted for each group including a predetermined number (Nw) of frames. This reduces the transfer rate to 1/Nw.

(3) The weight coefficient is encoded to be transferred to the code distribution correcting memory 3901. The coefficient is decoded and then stored in the memory 3901. For example, when an identical weight coefficient is repetitiously used in a successive manner, the coefficient and the number of repetitions thereof need only be transferred. When the number is limited to 255 (associated with eight bits), 16-bit information is generated each time the coefficient value is altered. If there exist ten change points on average in each macro-block line (1920×16 pixels in the example), the transfer rate is 300 kbps which is ⅙ of the original value. When the number of repetitions is represented by a variable-length data of the Huffman code or the like and the difference between changes of the coefficient value is encoded into a variable-length code, the transfer rate can be much more lowered. In this variation, however, since the weight coefficient for each screen includes a variable number of codes, there is required a control operation to notify the start and end of transmission of the codes.

(4) There are transmitted codes indicating description of the distribution of weight coefficients of several frames. When outputting data from the code distribution correcting memory 3901, the codes are developed to attain a desired coefficient value. For example, the codes describing the distribution are as follows. In this example, an identical coefficient value is successively used for three frames. There-after, since the screen is shifted toward the right, the coefficient value is also shifted toward the right. The item enclosed by parentheses indicates codes corresponding to the processing described therein.

(transfer of coefficient values of one screen) (first coefficient value) (second coefficient value) . . . (last coefficient value) (use same coefficient as for previous screen) (use same coefficient as for previous screen) (use coefficient on the left side of previous screen) (first coefficient value on left-most portion of screen) (second coefficient value on left-most portion of screen) . . . (last coefficient value on left-most portion of screen)

When the above encoding operation is combined with the variation of item (3), the transfer rate can be further decreased. On the other hand, although the code analyzing process becomes complicated, when a micro-processor, a digital signal processor, or the like is employed to execute the encoding process, the operation described above can be achieved while minimizing the additional hardware. In this regard, the variations above are applicable to an encoding apparatus in which an image is partitioned into areas as well as to an encoding apparatus including a single encoder circuit.

Figure 40:
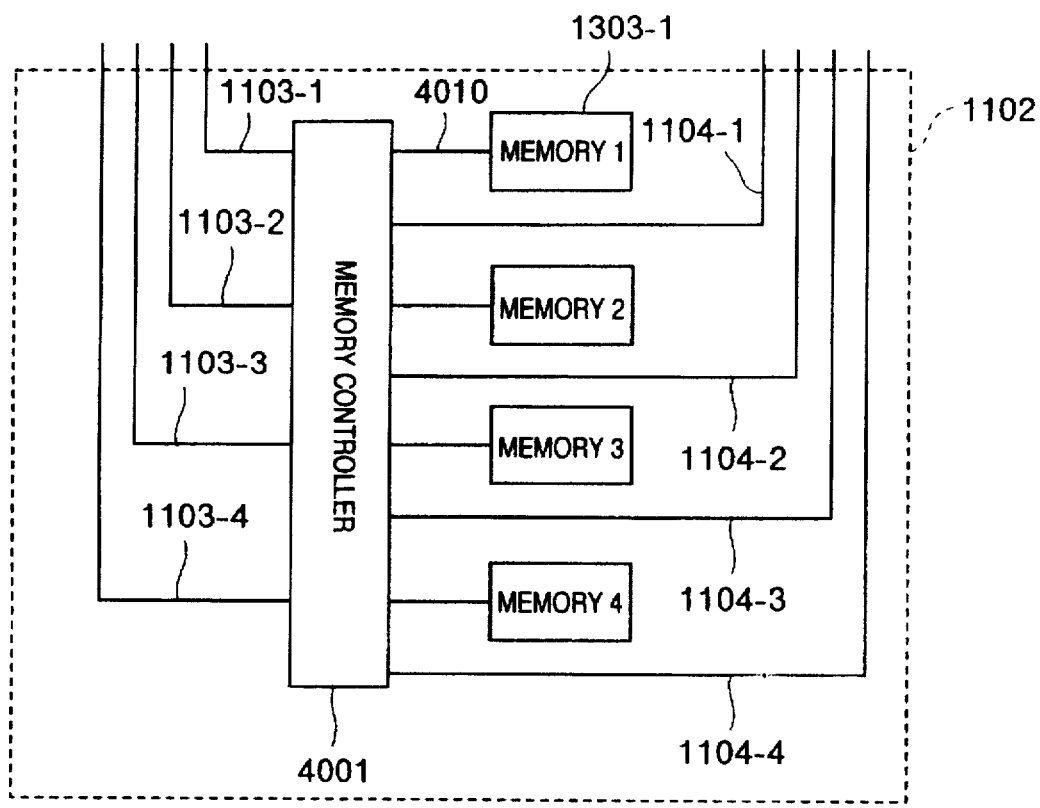
FIG. 40 is a diagram showing an alternative construction of the shared memory of FIG. 11.

FIG. 40 shows a variation of the shared memory circuit 1102 of FIG. 13. In contrast with the configuration of FIG. 13 in which two memory sides are disposed respectively for the reading and writing operations in each smaller encoder or the decoding apparatus, the system of FIG. 40 includes one memory 1303 for the read and write operations. Thanks to the processing associated therewith, although the circuit size of a memory control circuit 4001 is increased, the number of memories 1303 is reduced to half that of FIG. 13. Due to the amazing development of integration technology for memory devices, when one screen image is substantially divided into four partitions, images respectively of two partitions thereof (each partition including 1920 pixels ×256 lines ×8 bits+pertinent color signals=about 6 megabits) can be easily stored in one memory device, thereby reducing the circuit size.

A memory read function is additionally disposed in the memory controller 4001. In the memory read process, like in the memory write process, an address or the like of the first pixel of a block to be read therefrom is set by the signal line 1104 such that the desired pixels are continuously or continually outputted therefrom onto the data line of the signal line 1104. When setting the read address, there may be set, in place of the first pixel address, a number assigned to a macro-block, a block number in the macro-block, and a motion vector of the macro-block.

Since the number of memory accesses to the shared memory circuit is duplicated and a slight delay of time exists between when the read request is set and when pixel data is outputted therefrom, this variation is particularly advantageous when applied to an encoder circuit (FIG. 17) in which the memory is accessed less frequently.

Figure 41:
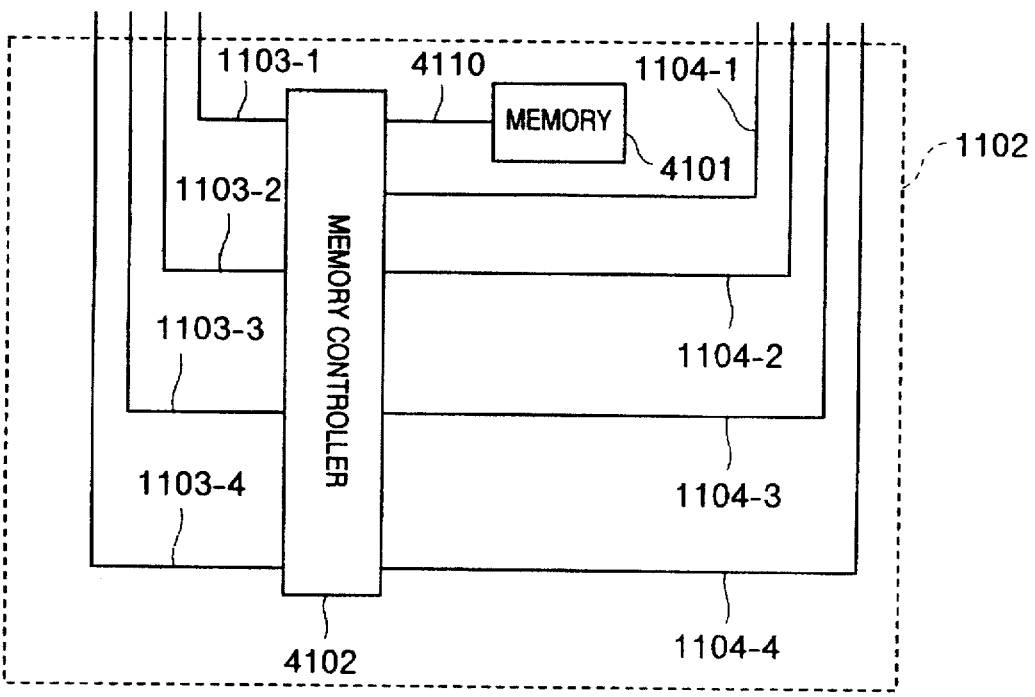
FIG. 41 is a diagram showing still an alternative construction of the shared memory of FIG. 11.

FIG. 41 shows a variation of the memory circuit of FIG. 40. The memories 1301-1 to 1301-4 are collectively constructed as a memory 4101. In consequence, a memory control circuit 4102 conducts the memory access operations for all sub-encoder circuits or the encoder circuit via one bus 4110. In the controller 4102, an FIFO or buffer memory is connected to each address input line. When an address is set thereto, there is achieved an access to the pertinent address in the memory 4101. When several addresses are set as above substantially at the same time, the memory access operations are accomplished in the address setting sequence. The access sequence may be conducted in an order of the ascending order of setting time values. Alternatively, the setting operations of the FIFO or buffer memories are confirmed in advance in a predetermined order to execute the memory access thus confirmed. This procedure is advantageous in that the access priority levels can be arbitrarily specified. However, when processing a memory access having a lower priority level, a long wait period of time is necessary in some cases from when the access address is set to when the data is actually processed.

In the decoding apparatus employing the variations of FIGS. 40 and 41, the memory access speed is decided on the basis of a case in which the memory is most frequently accessed. For example, in the MPEG described above, the memory access rate is increased when the interpolation predicted is conducted for B picture, namely, four memory accesses per pixel (two predicted image read operations, one reproduced image write operation, and one display read operation). In addition, although description has been omitted, the dual prime predicted adopted in the MPEG2 also requires four memory accesses per pixel like in the predicted of B picture. When processing an image including 1920×256 ×30 Hz×1.5 pixels (for chrominance signals), the pixel rate is about 22 megapixels per second, which necessitates an access speed of 88 megapixels per second. Since the access speed of a large-capacity memory is from about 30 nanosecond (ns) to about 40 ns in the present stage of art, a memory access of 88 megapixels per second can be accomplished by handling two pixels (16 bits) in each access operation. In this case, however, since the access overhead is required to be suppressed to the possible extent, the circuit configuration is complicated and the circuit size is increased. Moreover, since it rarely occurs that only the interpolation predicted and/or dual prime predicted are/is executed in one screen, the number of memory accesses is further reduced on average. Consequently, in the designing of the circuit, the number of memory accesses is decoded in consideration of the pixel rate of 88 megapixels per second. There is additionally disposed a circuit which executes a simplified process in place of the interpolation or dual prime predicted when the number of accesses exceeds the preset value in an actual operation or when there exists a fear of the above case. With this provision, the circuit size of the sub-encoder circuit as well as the overall encoding apparatus can be minimized. The simplified process of the interpolation or dual prime predicted is conducted as shown in FIG. 42 in which the predicted value conventionally represented as a mean value of two pixels is replaced by a value of either one of the pixels. In the operation, the memory is accessed three times per pixel. Part (1) of FIG. 42 shows an interpolation process in the conventional interpolation or dual prime predicted, whereas parts (2) to (4) present simplified processes thereof. Only the pixels indicated by a white circle or a black circle are read from the memory. The picture quality of the image reproduced according to the simplified processes is slightly lowered. However, in these predicted procedures, a mean value of similar images is employed for the predicted image and the number of blocks subjected to the simplified process is quite small on the basis of probability. Consequently, the degree of deterioration in the picture quality is almost negligible in ordinary cases. On the other hand, thanks to the simplified predicted processes, the circuits described above can be reduced in size. Alternatively, a lower-speed memory can be employed in a circuit configuration of the prior art. Using such a low-speed memory, the circuit production cost is reduced and a large-capacity memory of the most advanced technology (having an access speed lower than the highest memory speed in general) can be utilized, which hence advantageously minimizes the circuit size. According to simplified predicted 1 shown in part (2) of FIG. 42, when the decoding mode in which only one of the predicted images can be used is forcibly changed from the interpolation predicted to the forward predicted, the increase in the change of circuit constitution can be reduced to the possible extent. On the other hand, in simplified process 2 of part (3), a change-over operation is accomplished between two kinds of predicted images for each line such that features of two predicted images can be reflected in the obtained predicted image. In general, the two predicted images are substantially equal to each other. However, an arbitrary combination of images is allowed according to the standardized procedure. In simplified process 2, even when two images are different from each other, the deterioration of the picture quality due to the simplified process can be decreased to the minimum degree. Simplified process 2 also includes a method in which the screen is subdivided into vertical partitions. Simplified process 3 of part (4) is obtained by adding a sub-process for change in the horizontal direction to simplified process 2. Since frequency components of errors due to the simplified process are high-frequency components in the vertical and horizontal directions, the errors become visually weak and are less sensed by humans and hence the picture deterioration is advantageously reduced. In addition, simplified process 4 of part (5) is based on simplified process 2. Namely, in a sub-process thereof in which pixels of predicted image 2 are used, peripheral pixels of predicted image 1 are spatially interpolated to attain interpolated pixels. An averaging process is conducted between the interpolated pixels and pixels of predicted image 2 to resultantly produce a predicted image. In this case, although the circuit configuration of the predicted image generator is slightly complicated, the access frequency which primarily gives influence upon the processing speed becomes substantially the same as that of the other simplified processes. The deterioration of picture quality due to the simplified process is smaller when compared with the other simplified processes. In the diagram showing simplified process 4, in the process 4 of creating spatially interpolated pixels, spatially interpolated pixels are not used for pixels in the both of the upper and lower boundary regions. However, a method of generating spatially interpolated pixels according to pixels outside the block and a method in which pixels spatially in the vicinity of each other in the block are adopted as spatially interpolated pixels are also within the scope of the present invention. Furthermore, although simplified process 4 is implemented on the basis of simplified process 2, the similar advantage is obtained by applying the method of spatial pixel interpolation to simplified process 3.

Incidentally, the present invention is applicable to images each having the number of pixels other than that described above so as to advantageously minimize the circuit size. In addition, the present invention can be applied to a decoding apparatus in which an image is subdivided into partitions as well as an image decoding apparatus including a single decoder circuit, thereby attaining the similar advantageous effect.

The circuit configuration and control method shown in FIGS. 40 and 41 are applicable to the image encoding apparatus.

Figure 43:
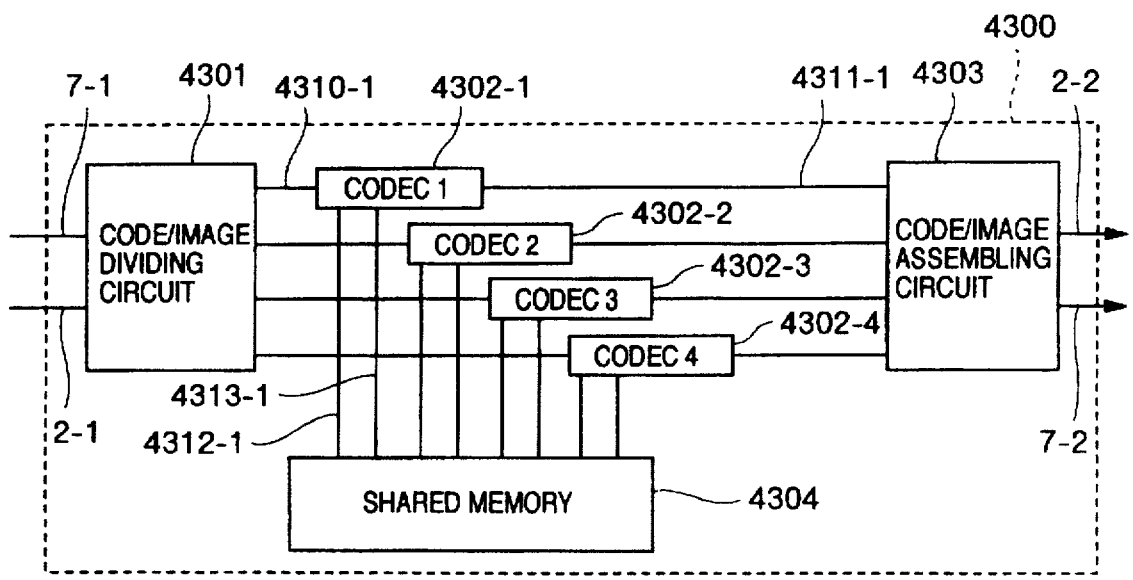
FIG. 43 is a diagram for explaining an image encoding and decoding apparatus according to the present invention.

FIG. 43 shows an embodiment of an image encoding and decoding apparatus to which the present invention is applied. Video signals and code signals are classified to be distributed according to positions on the screen associated therewith for the encoding and decoding thereof. Input video signals 2-1 and input code signals 7-1 are partitioned into four groups by a code/image dividing circuit 4301 at respectively independent points of timing of video signals and code signals and are then fed via signal lines 4310-1 to 4310-4 to small encoding and decoding circuits 4301-1 to 4301-4. In the signal lines 4310-1 to 4310-4, the image signals and code signals are spatially multiplexed. In the encoding and decoding circuits 4301-1 to 4301-4, the received video signals are encoded and the inputted code signals are decoded. The processing is the same as that of the sub-encoder 1101 and the small decoder 1702 described above. The encoded or decoded signals are assembled with each other by an image/code assembling circuit 4303 at points of timing respectively of encode signals and reproduction signals so as to resultantly produce output codes 7-2 and reproduction video signals 2-2, respectively.

In the encoding and decoding operation, reference images are stored in a shared memory 4304 which is accessed according to an access signal 4312 and a read signal 4313. In this connection, the access signal and read signal of the sub-encoder circuit and those of the small decoder circuit may be multiplexed with respect to space or time. The shared memory 4304 may include constituent memories as follows, i.e., one memory for each of the sub-encoders and decoders, namely, eight independent memories in total; one memory for each set of a sub-encoder and a small decoder corresponding thereto, i.e., four independent memories in total; alternatively, one memory for the sub-encoders and one memory for the sub-encoders, i.e., two independent memories in total. Moreover, the shared memory 4304 may be configured in a one-memory structure. The circuit size becomes smaller as the number of independent memories is decreased. Conversely, however, the speed of access to one sub-encoder or decoder is lowered. To overcome this difficulty, there will be required a memory device having quite a high operation speed. The memory configurations and methods of multiplexing access signals are independent of each other and hence any combination therebetween is possible.

Figure 44:
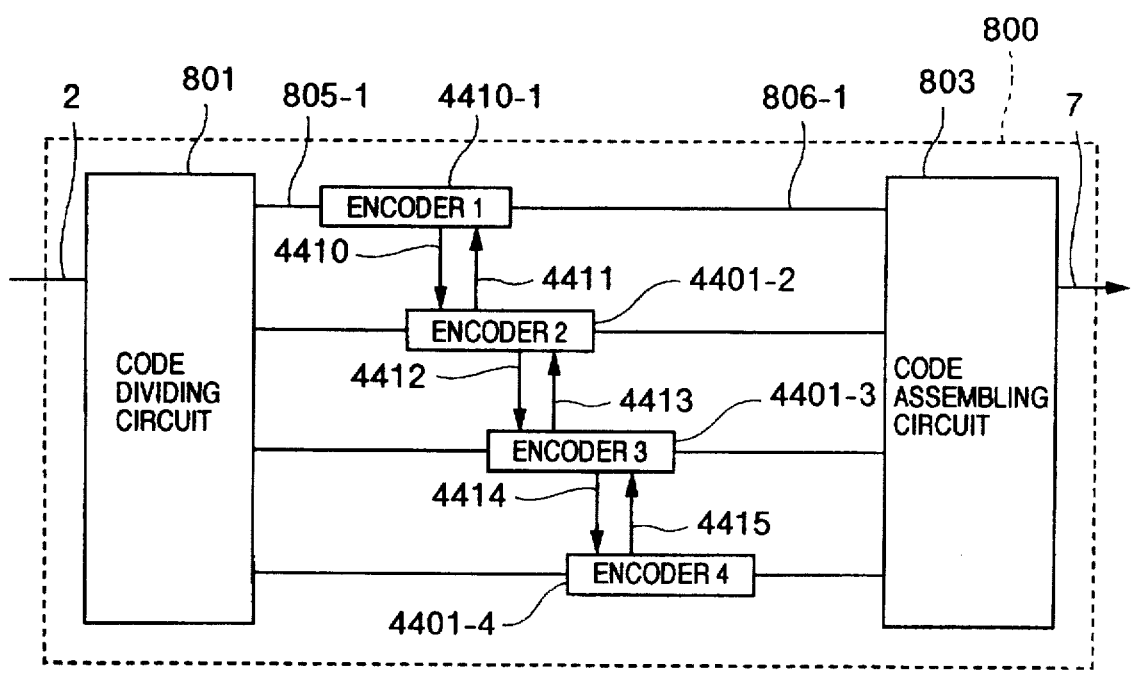
FIG. 44 is a diagram showing an alternative construction of the sub-encoder of FIG. 11.

FIG. 44 shows a variation of the image encoding apparatus shown in FIG. 11. This example is applicable to a decoding apparatus and an encoding and decoding apparatus in addition to the encoding apparatus.

The shared memory circuit 1102 of FIG. 11 is distributively disposed in each sub-encoder circuit 4401 in FIG. 44. Consequently, image information of a shared portion is transferred via signal lines 4410 to 4415 to be stored in the shared memory of the respective encoder circuit 4401. In the example of FIG. 44, shared information is specified only between the small encoding circuits 4401-1 and 4401-2, 4401-2 and 4401-3, and 4401-3 and 4401-4.

Figure 45:
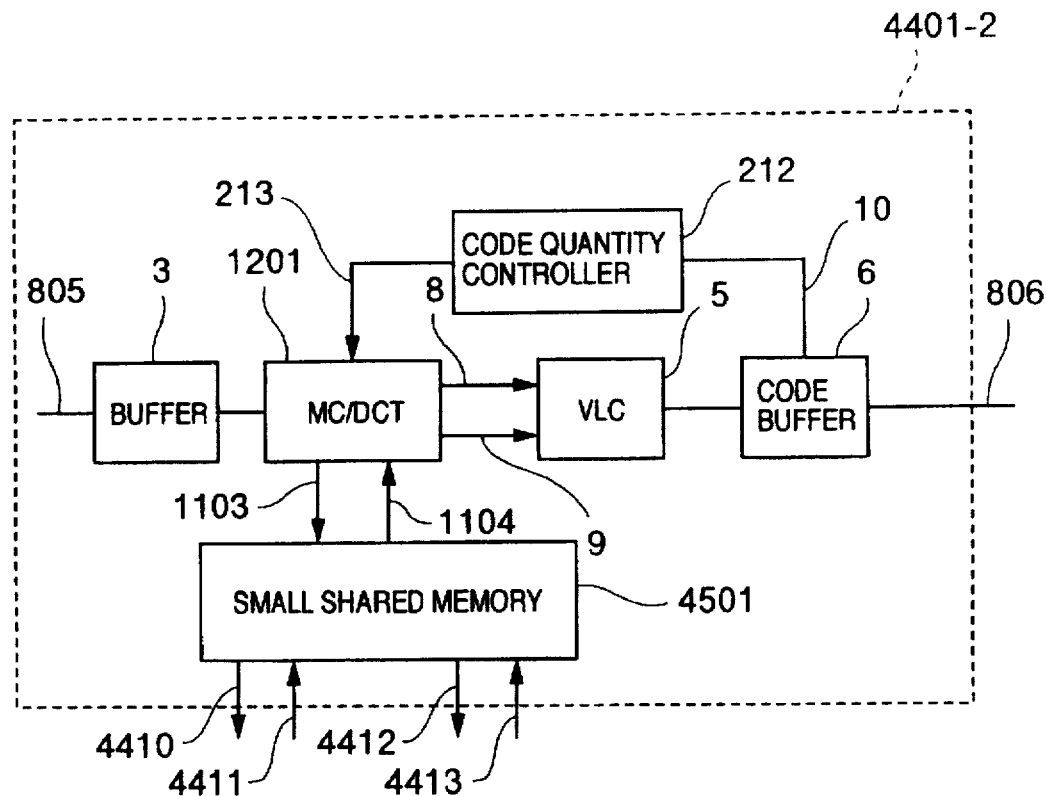
FIG. 45 is a diagram showing an alternative construction of the small encoding circuit of FIG. 44.

FIG. 45 shows details of the small encoding circuits 4401-2. This circuit achieves the same operation as the small encoding circuit 1101 of FIG. 12 excepting that a small shared memory circuit 4501 is disposed in the sub-encoder 4401-2. The small shared memory 4501 keeps a reference image locally reproduced by the pertinent sub-encoder 4401. Moreover, the memory circuit 4501 receives shared video signals 4411 and 4413 from other sub-encoders 4401 handling images in a shared fashion to keep the received signals therein. On the other hand, of the reference image signals 1103, those employed as shared images in other sub-encoders 4401 are delivered as shared video signals 4410 or 4412. In this regard, the sub-encoder circuit 4401-3 is configured in almost the same structure as the sub-encoder circuit 4401-2 excepting that shared video signals 4410 to 4413 are connected to signal lines different from those used in the encoder circuit 4401-2. Moreover, in the encoder circuits 4401-1 and 4401-4, the number of shared video signals is reduced from four to two.

Figure 46:
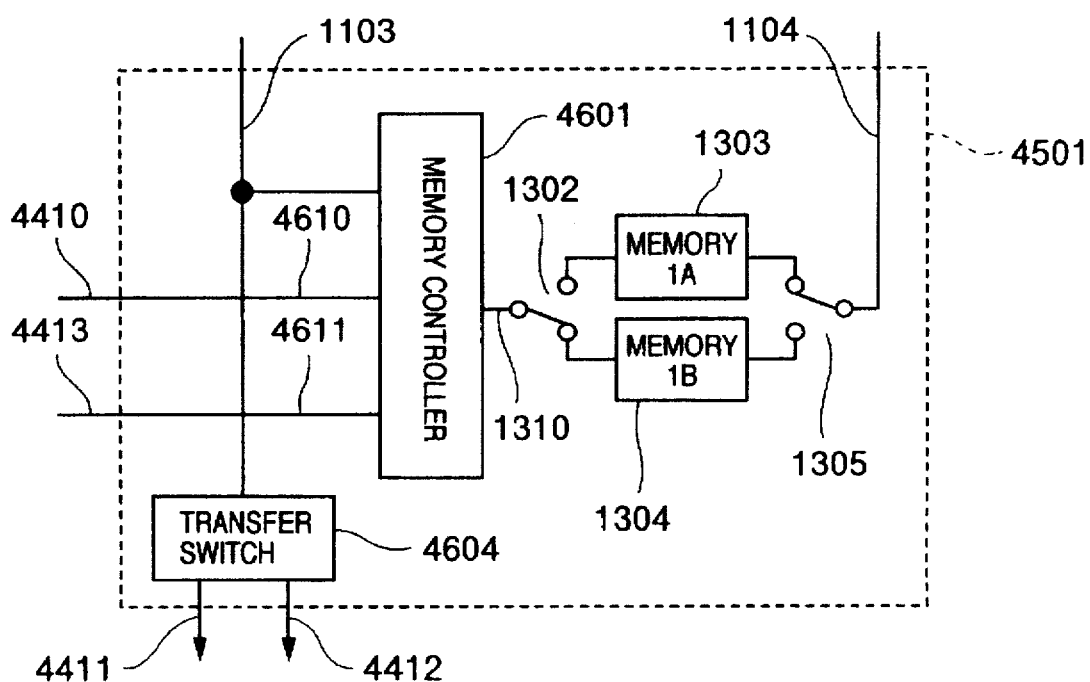
FIG. 46 is a diagram showing constitution of a shared small memory of FIG. 45.

FIG. 46 shows in detail the small shared memory 4501 of FIG. 45. The reference video signal 1103 and shared video signals 4410 and 4413 are supplied to a memory control circuit 4601 to be kept in a buffer or FIFO memory in the memory controller 4601. When data is written in the buffer or FIFO memory, the memory controller 4601 writes the data in a memory 1303 or 1304 at a pertinent address. On the other hand, data is read from the memory 1303 or 1304 via a signal line 1104 in the same manner as for the shared memory circuit of FIG. 13.

The reference video signal 1103 is fed also to a transfer switch 4604. When the received signal is related to the shared portion, the switch 4604 outputs the signal as the shared video signal 4410 or 4412, thereby transferring the signal to the sub-encoder associated therewith.

According to the variations shown in FIGS. 44 to 46, the signal encoding can be achieved with the same encoding efficiency and at the same encoding speed as the circuit of FIG. 11. Furthermore, the signal lines concentrated onto the shared memory 1102 in FIG. 11 are distributively arranged an hence the total number of signal lines can be reduced. For example, when there are disposed in each sub-encoder circuit the access signal line 1103 including eight data lines and two control signal lines and the read signal line 1104 including eight data lines, ten address lines, and four control signal lines, the number of input signal lines to the shared memory circuit 1102 is 128. On the other hand, according to the variation of FIG. 44, when each of the shared video signal lines 4410 to 4413 includes eight data lines and two control lines, the number of input signal lines is 60 in total, namely, less than half that of input signal lines of the original configuration. In addition, the degree of concentration of signal lines is also reduced, namely, 128 lines concentrated onto the shared memory 1102 of FIG. 11 are minimized to 40 lines in the variations above. When the image encoding apparatus 800 is manufactured in an LSI chip while decreasing the degree of concentration of signal lines, the layout of signal lines is facilitated and the chip size is decreased. When the small image encoder circuit and shared memory circuit are fabricated respectively in LSI chips, there is particularly obtained an advantageous effect in the shared memory circuit. Namely, it is possible to prevent the increase in the production cost which will be caused by the increase in the number of pins of LSI chip. Moreover, when the small image encoder circuit and shared memory circuit are produced respectively as substrates to be connected to each other via connectors, cables, or the like, the numbers respectively of connectors and cables can be minimized. In this regard, the advantage of reduction in the number of the signal lines is particularly remarkable according to the variation when the screen image is subdivided into horizontal partitions. Furthermore, the reduction in the number of signal lines is more effective when the number of partitions is increased.

Figure 47:
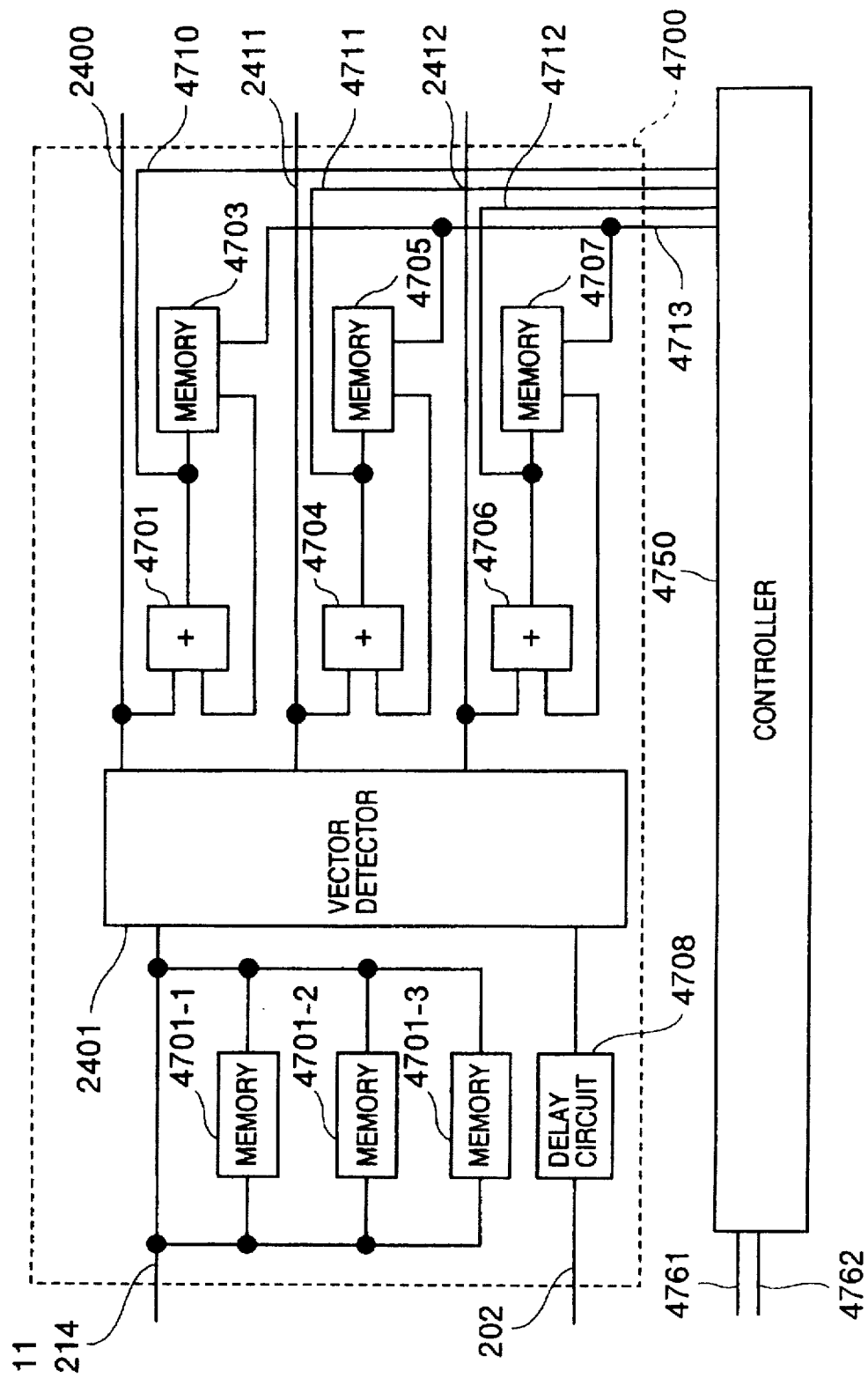
FIG. 47 is a diagram showing an alternative construction of the motion vector detector of FIG. 25.

FIG. 47 shows a variation of the motion vector detecting circuit 2401 of FIG. 25. The range of motion vector detection is expanded by arranging peripheral circuits centered on the motion vector detector 2401. Description will be given of an outline 3of operation of this circuit with reference to FIGS. 48A to 48C. Detailed operation of the detector 2401 of FIG. 47 will be described later. FIGS. 48A to 48C show orders and positions of macro-blocks used in the motion detection. In the example of FIG. 48A, a sequence of macro-blocks of encode images and a string of macro-blocks of reference images are shown in the upper and lower portions, respectively. One rectangle corresponds to one macro-block (i.e., 16×16 pixels) and hence includes 256 pixels. These blocks are sequentially supplied to the system beginning at the left-most block for the processing thereof. In the description of the motion vector detector of FIG. 25, the pixels are assumed to be scanned in the horizontal direction beginning at the upper-most pixel. In this variation, however, the pixels are scanned in the vertical direction beginning at the left-most pixel. Namely, the operation is identical to that of the circuit of FIG. 25 when the vertical addresses (positions) are interchanged with the horizontal addresses (positions).

In the example of FIG. 48A, reference macro-blocks 1A, 1B, and 1C are fed to the system in association with the input of code macro-block 1 such that a search is conducted for a motion vector of code macro-block 1 according to reference macro-blocks 1A to 1C and 2A to 2C. Similarly, reference macro-blocks 1A to 1C, 2A to 2C, and 3A to 3C are employed to obtain a motion vector of code macro-block 2. In this operation, reference macro-blocks 1A to 1C and 2A to 2C received in the previous process of code macro-block 1 are kept retained such that only reference macro-blocks 1A to 1C are required to be additionally inputted to the circuit. Code macro-block 2 is positionally associated with reference macro-block 1B, namely, a search operation is carried out in a range of ±16 pixels (0th pixel to +16th pixel only for the first macro-block) centered on the pertinent position respectively in the vertical and horizontal directions. Ordinarily, when similarity between the pertinent pixel and a pixel at the position of reference macro-block 2B takes a largest value, there is assumed motion vector (0,0). However, a fixed offset value may be added to the address for the reading of the reference pixel to set the center of search to a point other than point (0,0). For example, an offset value (8,1) is added respectively to the horizontal and vertical addresses, the search operation is conducted in a range from −8th pixel to +24th pixel in the horizontal direction and from −15th pixel to +17th pixel in the vertical direction. In the example of FIG. 48A, the order of macro-blocks of reference images match with the positions of macro-blocks on the screen.

FIG. 48B shows an example in which the offset value is altered for each macro-block. For example, reference macro-blocks 1A', 1B', 2A', 2B', 2C', 3A, 3B, and 3C are adopted for encode macro-block 2. These macro-blocks are at positions other than those of macro-blocks 1A, 1B, 1C, 2A, 2B, and 2C and hence are required to be read again from the memory in general. As a result, when the read speed of reference images is the same as that used in the example of FIG. 48A, the processing speed is lowered to one third of that of FIG. 48A.

In the example of FIG. 48C, the offset value is varied for every four macro-blocks. This example is associated with the circuit of FIG. 47. The processing performance in terms of processed signals of this example is two thirds of that of FIG. 48A. However, when the offset value is altered for every eight macro-blocks and every 16 macro-blocks, the performance is eight tens and sixteen eighteenths of the original value, respectively. Namely, the processing performance of FIG. 48C gradually approaches that of FIG. 48A.

Returning to FIG. 47, the input reference image 11 or 214 (e.g., 3A to 3C of FIG. 48C) supplied to the vector detector circuit 2401 is simultaneously stored in either one of the memories 4701-1 to 4701-3 (for example, the memory 4701-1). On the other hand, at the same time, pixel data items (e.g., 1A to 1C and 2A to 2C of FIG. 48C) are read from the memories 4701-2 and 4701-3 to be simultaneously inputted to the vector detector 2401 together with the input reference image 11 or 214 (e.g., 3A to 3C of FIG. 48C). The encode image 202 (e.g., macro-block 2 of FIG. 48C) is delayed by a delay circuit 4708 by a predetermined period of time (one macro-block in FIG. 48C) and is then delivered to the vector detector 2401 for the calculation of vectors. Three resultant vectors 2410 to 2412 (respectively related to frames, odd-numbered fields, and even-numbered fields) are immediately supplied to adders 4702, 4704, and 4706, respectively. In these adders, the horizontal and vertical components of the respective vectors 2410 to 2412 are respectively added to those of accumulated vectors 4714 to 4716 of other macro-blocks of the same code screen obtained from the memories 4703, 4705, and 4707, respectively. The calculated vectors are again stored respectively in these memories. Incidentally, the macro-blocks of one screen are classified into several groups by a controller 4750. Areas of each of memories 4703, 4705, and 4707 are allocated to the respective groups such that the results of addition of the respective vector values are stored respectively in the allocated groups. When a macro-block being currently processed belongs to one of the groups, a memory address 4713 related to the group is outputted from the controller 4750. Resultantly, the horizontal and vertical components of the vectors of all macro-blocks of the group are respectively added to each other. The results of addition 4710 to 4712 are immediately read by the controller 4750 from the memories 4703, 4705, and 4707 when the pertinent processing is finished for the final macro-block of the group. Dividing the obtained value by the number of macro-blocks of the group, there is attained a mean vector of each group.

When a search operation is carried out for vectors of the same encode image according to a subsequent screen, the mean vectors are set as offset values of the respective groups. This operation can be achieved by the controller 4750 as follows. In the operation to generate the reference image address 4761, the mean vector of the pertinent group is added as the offset value to the value of the address. In this connection, an encode image address 4762 is generated to sequentially obtain macro-blocks of an encode image from the memory in a manner similar to that used in ordinary cases.

As above, in the operation to calculate vectors of the same encode image according to screen successively subsequent thereto, the mean vectors are employed as offset values of the respective groups. In consequence, even when the vector search range is narrowed for one screen, there can be attained vectors in a wide range. Specifically, when encoding I, B, B, and P pictures in this order, vectors of the first B picture are obtained according to the first I picture. Next, using as the offset value the mean vector of each group calculated from the obtained vectors, vectors of the second B picture are attained from I picture. The offset value obtained from the vectors of the second B picture are then used to calculate vectors of P picture according to I picture. As a result, the vector search range for P picture is three times that of one vector search operation in the vertical and horizontal directions.

The contour of each group can be arbitrarily specified in the screen and may be dispersed therein. However, as described in conjunction with the example of FIG. 48C, the group favorably includes several consecutive macro-blocks in the horizontal direction. Concretely, the number of horizontally successive macro-blocks is at least eight and takes a value obtained by dividing the number of horizontal macro-blocks of screen (44 or 45) by an integer or a power of two. For the circuit configuration and memory read speed, it is particularly desirable to employ either one of the following combinations, namely, the number of horizontally successive macro-blocks is 8, 9, 11, or 16 and the number of vertically continuous macro-blocks is one, two, three, or four.

When the number of macro-blocks of the group is represented by a power of two, the mean vector can be calculated through bit shifting operations and hence the circuit configuration is advantageously simplified. In case where the number of macro-blocks is other than a power of two, when calculating mean vectors, the number may be divided by a power of two having a value larger than that of the number of macro-blocks. For example, when one group includes 24 macro-blocks, i.e., eight horizontal macro-blocks and three vertical macro-blocks, the value "24" may be divided by 32. The mean vector obtained through this operation takes a value which is three fourth that of the appropriate mean vector. Moreover, the search range is also minimized to three fourth the inherent range (3*¾=2.25 for P picture in the preceding example). However, thanks to the above operation, it is possible to advantageously reduce influence of vectors due to irregular motions in the group and hence the quantity of motion vector codes is actually decreased in the encoding operation, leading to a higher picture quality depending on cases.

In the description, it has been assumed that the groups are not overlapped with each other. However, this restriction may be removed. In this case, it is necessary to beforehand determine one of the groups to obtain therefrom the mean value of vectors to be used as the offset value. The overlapped situation occurs, for example, when each group using the same offset value is eight macro-blocks in the horizontal direction and one macro-block in the vertical direction and a group employed for the mean value calculation is horizontally eight macro-blocks and vertically three macro-blocks (one macro-block over and below the pertinent macro-block). Thanks to the overlapped state of groups, the precision of the vector used as the offset value is improved and hence the encoding efficiency is increased. In this connection, a weighted mean value may be employed in the mean vector computation. In the example of overlapped groups, the weight value for the vectors respectively of the upper and lower macro-blocks may be set to ½ that of the other vectors in the mean value calculation. When processing the overlapped blocks, the read speed of the memories 4703, 4705, and 4707 and the processing speed of the adders 4702, 4704, and 4706 are required to be three times that of FIGS. 48A to 48C.

According to the present invention, since the operation speed of constituent components of the circuit configuration can be lowered without deteriorating the image encoding efficiency, it is possible to minimize the size and cost of the image encoding apparatus, image decoding apparatus, and/or image encoding and decoding apparatus.

The invention has been described with reference to the preferred and alternative embodiments. Obviously, modifications and alternations will occur to those of ordinary skill in the art upon reading and understanding the present invention. It is intended that the invention be construed as including all such modifications and alternations in so far they come with the scope of the appended claims or the equivalent thereof.

I claim:

1. An image encoding apparatus in which an input image supplied thereto is subdivided into a plurality of blocks, a predicted image of each block is created according to an image reproduced from previously encoded signals, a difference image is produced between the input image and the predicted image, and the difference image is encoded, comprising:

means for dividing the input image into N (N≧2) sub-images of which boundary areas are overlapped with each other;

N encoding units respectively provided for the sub-images for achieving the predicted image creation, the encoding operation, and the image reproduction;

a shared information processing unit for distributing the image reproduced by the encoding unit to the other encoding sections related thereto; and a code assembling unit for converting code strings produced respectively by the encoding units into N or less encoded code strings.

2. An image encoding apparatus according to claim 1, wherein each of said encoding unit includes:

means for notifying a quantity of codes generated by the encoding unit to the other encoding units; and means for controlling the quantity of codes generated by the encoding section according to the quantity of code notified from the other encoding units.

3. An image encoding apparatus according to claim 1, wherein the apparatus input an image having an interlacing scanning structure, the apparatus further including means for generating a frame-unit motion vector from a motion compensation vector detected in field unit, when achieving a predicted image creation in which a predicted image obtained by a motion compensation in a field unit is replaced with a predicted image obtained by a motion compensation in a frame unit.

4. An image encoding apparatus according to claim 1, further including:

means for inputting two points of time and a quantity of codes to be generated between the two points of time;

means for measuring a quantity of codes generated during a predetermined period of time; and means for increasing or decreasing a quantity of codes when a quantity of codes measured by the measuring means is unequal to a predetermined quantity of codes.

5. An image encoding apparatus according to claim 1, wherein the encoding unit includes:

means for inputting a weight coefficient of a screen;

means for determining allocation distribution of a quantity of codes in the screen in accordance with the weight coefficient; and means for controlling the quantity of generated codes to obtain allocated quantity of codes.

6. An image decoding apparatus in which input codes are decoded to produce a difference image, a predicted image is created from an image decoded in accordance with an information separately specified by the input codes, and the difference image is added to the predicted image to produce a new decode image, comprising:

means for dividing the input codes into M (M≧2) sets of codes of which decoded image have boundary areas overlapping with ones of adjacent images;

M decoding units respectively provided for the sets of codes for achieving a predicted image creation and a decoding operation;

a shared decode information processing unit for distributing the image decoded by said decoding unit to the other encoding units related thereto; and an image assembling unit for synthesizing a single image from images decoded by said respective decoding units.

7. An image decoding apparatus according to claim 6, wherein each of the decoding units includes:

means for calculating an amount of progress in a decoding process;

means for comparing the calculated amount of progress with a reference amount of progress; and means for simplifying the decoding process when the calculated amount of progress is less than the reference amount of progress.

8. An image encoding and decoding apparatus in which an input image is divided into a plurality of blocks, a predicted image of each block is created in accordance with an image reproduced from previously encoded signals, a difference image is produced between the input image and the predicted image, and the difference image is encoded and in which input codes are decoded to produce a difference image, a predicted image is created from an image decoded in accordance with information separately specified by the input codes, the difference image is added to the predicted image to produce a new decode image, comprising:

N processing means having a function of dividing the input image into N (N≧2) sub-images of which boundary areas are overlapped with each other and a function of achieving for each of the sub-images a predicted image creation, an encoding operation, and an image reproduction;

a shared information processing unit for distributing the image reproduced by the processing means to the other processing means related thereto; and a code assembling section for converting code strings produced respectively by the processing units into N or less encoded code strings.

9. An image encoding and decoding apparatus in which an input image is divided into a plurality of blocks, a predicted image of each block is created in accordance with an image reproduced from previously encoded signals, a difference image is produced between the input image and the predicted image, and the difference image is encoded and in which input codes are decoded to produce a difference image, a predicted image is created from an image decoded in accordance with information separately specified by the input codes, the difference image is added to the predicted image to produce a new decode image, comprising:

M processing means having a function of dividing the input codes into M (M≧2) sets of codes of which decoded image have boundary areas overlapping with ones of adjacent images and a function of achieving for each of the sets of codes the predicted image creation and the decoding operation;

a shared decode information processing unit for distributing the image decoded by the processing means to the other processing means related thereto; and an image assembling section for synthesizing a single image from images decoded by said respective processing means.

* * * * *